United States Patent
Piva et al.

(10) Patent No.: US 10,195,551 B2
(45) Date of Patent: *Feb. 5, 2019

(54) LIQUID FILTER ASSEMBLIES; FEATURES; COMPONENTS; AND, METHODS

(71) Applicant: Donaldson Company, Inc., Minneapolis, MN (US)

(72) Inventors: Luca Piva, Mantova (IT); Fabrizio Buratto, Sustinente (IT); Jason P. Johnson, St. Paul, MN (US); Kurt Bryan Joscher, Burnsville, MN (US); Daniel Robert Frembgen, Savage, MN (US); Claudio Formica, Pomponesco (IT); Francesco Marangoni, Ceneselli (IT)

(73) Assignee: Donaldson Company, Inc., Minneapolis, MN (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/224,025

(22) Filed: Jul. 29, 2016

(65) Prior Publication Data
US 2017/0028322 A1    Feb. 2, 2017

Related U.S. Application Data

(63) Continuation of application No. 13/262,071, filed as application No. PCT/US2010/029228 on Mar. 30, 2010, now Pat. No. 9,480,940.
(Continued)

(51) Int. Cl.
*B01D 35/147* (2006.01)
*B01D 29/21* (2006.01)
(Continued)

(52) U.S. Cl.
CPC ............. *B01D 29/96* (2013.01); *B01D 29/21* (2013.01); *B01D 35/027* (2013.01);
(Continued)

(58) Field of Classification Search
CPC ...... B01D 29/96; B01D 35/027; B01D 29/21; B01D 35/147; B01D 2201/0415;
(Continued)

(56) References Cited

U.S. PATENT DOCUMENTS 2,915,188 A    1/1957   Buker
3,159,378 A    12/1964  Hasg
(Continued)

FOREIGN PATENT DOCUMENTS

DE    100 52 524    4/2002
EP    1 747 053     4/2005
(Continued)

OTHER PUBLICATIONS

Search Report of the WIPO for PCT/EP2012/068841, dated as completed Apr. 22, 2013, with the written opinion.
(Continued)

*Primary Examiner* — Madeline Gonzalez
(74) *Attorney, Agent, or Firm* — Merchant & Gould P.C.

(57) ABSTRACT

Liquid filter assemblies, features, components and methods are described. In general, a liquid filter cartridge is provided which includes features that help ensure that when the assembly is serviced, the cartridge positioned within the assembly is a proper one, in proper sealing orientation, for appropriate use. Features that can be used to provide for this include: a seal on the filter cartridge that defines a seal pattern non-orthogonal to a plane perpendicular to a central axis of the filter cartridge; and, a member of a projection/receiver arrangement on the filter cartridge which is orientated to engage a portion of a liquid filter assembly, for
(Continued)

example a liquid flow collar, to allow sealing when the cartridge is a properly positioned cartridge and a properly configured cartridge. Assembly features are described. Also, a flexible radial projection arrangement providing snap-fit interaction between a cartridge and housing is provided. Methods of assembly and use as described.

23 Claims, 67 Drawing Sheets

Related U.S. Application Data

(60) Provisional application No. 61/211,586, filed on Mar. 31, 2009.

(51) Int. Cl.
*B01D 29/96* (2006.01)
*B01D 35/027* (2006.01)

(52) U.S. Cl.
CPC .... *B01D 35/147* (2013.01); *B01D 2201/0415* (2013.01); *B01D 2201/291* (2013.01); *B01D 2201/302* (2013.01); *B01D 2201/34* (2013.01); *B01D 2201/4046* (2013.01); *B01D 2201/4084* (2013.01)

(58) Field of Classification Search
CPC ...... B01D 2201/302; B01D 2201/4084; B01D 2201/291; B01D 2201/4046; B01D 2201/34
USPC ..... 210/133, 437, 244, 450, 493.2, 451–454
See application file for complete search history.

(56) References Cited

U.S. PATENT DOCUMENTS

| | | | |
|---|---|---|---|
| 3,502,220 A | 3/1970 | Kohlberg et al. | |
| 3,615,016 A | 10/1971 | Soriente et al. | |
| 4,272,368 A | 6/1981 | Foord et al. | |
| 4,484,753 A | 11/1984 | Kalsi et al. | |
| 5,045,192 A | 9/1991 | Terhune | |
| 5,744,030 A | 4/1998 | Reid et al. | |
| D416,308 S | 11/1999 | Ward et al. | |
| 6,440,201 B1 | 8/2002 | Billiet | |
| 6,599,342 B2 | 7/2003 | Heinz et al. | |
| 6,936,084 B2 | 8/2005 | Schlensker et al. | |
| 6,949,189 B2 | 9/2005 | Bassett et al. | |
| 6,986,805 B2 | 1/2006 | Gieseke et al. | |
| 7,442,220 B2 | 10/2008 | Pearson et al. | |
| 7,476,314 B2 | 1/2009 | Reid et al. | |
| 7,494,017 B2 * | 2/2009 | Miller | B01D 35/147 210/130 |
| 7,618,480 B2 | 11/2009 | Barnwell et al. | |
| 7,828,870 B1 | 11/2010 | Rech et al. | |
| 7,828,881 B2 | 11/2010 | Barnwell et al. | |
| 8,066,791 B2 | 11/2011 | Baseotto et al. | |
| 8,163,056 B2 | 4/2012 | Coulonvaux et al. | |
| 8,177,874 B2 | 5/2012 | Bittle et al. | |
| 8,177,971 B2 | 5/2012 | Bittle et al. | |
| 8,202,419 B2 | 6/2012 | Wallerstorfer et al. | |
| 8,292,984 B2 | 10/2012 | Baseotto et al. | |
| 9,480,940 B2 * | 11/2016 | Piva | B01D 29/21 |
| 2002/0144937 A1 | 10/2002 | Wilberscheid et al. | |
| 2004/0035097 A1 * | 2/2004 | Schlensker | B01D 46/0012 55/498 |
| 2004/0134171 A1 | 7/2004 | Scott et al. | |
| 2004/0232065 A1 | 11/2004 | Tanner et al. | |
| 2005/0028500 A1 | 2/2005 | Gieseke et al. | |
| 2006/0113235 A1 | 6/2006 | Strohm et al. | |
| 2007/0158263 A1 | 7/2007 | Brandt et al. | |
| 2008/0245725 A1 | 10/2008 | Patel et al. | |
| 2009/0049814 A1 | 2/2009 | Baseotto et al. | |
| 2009/0242473 A1 | 10/2009 | Wallerstorfer et al. | |
| 2009/0249756 A1 | 10/2009 | Schrage et al. | |
| 2009/0266757 A1 | 10/2009 | Wallerstorfer et al. | |
| 2009/0272085 A1 | 11/2009 | Gieseke et al. | |
| 2009/0283467 A1 | 11/2009 | Wallerstorfer et al. | |
| 2010/0065481 A1 | 3/2010 | Formica et al. | |
| 2010/0146920 A1 | 6/2010 | Iddings et al. | |
| 2010/0154371 A1 | 6/2010 | Bittle et al. | |
| 2011/0000174 A1 | 1/2011 | Kapelarie | |
| 2011/0168613 A1 | 7/2011 | van Savooijen et al. | |
| 2011/0258975 A1 | 10/2011 | Lundgren et al. | |
| 2012/0031828 A1 | 2/2012 | van Savooijen et al. | |

FOREIGN PATENT DOCUMENTS

| | | |
|---|---|---|
| JP | 2003053336 | 2/2003 |
| WO | 1999/30799 | 6/1999 |
| WO | 02/45819 | 6/2002 |
| WO | 02/078816 | 10/2002 |
| WO | 2005/018783 | 3/2005 |
| WO | 2005/061073 | 7/2005 |
| WO | WO 2005/061073 | 7/2005 |
| WO | WO 2005/063358 | 7/2005 |
| WO | WO 2008/128150 | 10/2005 |
| WO | WO 2005/115581 | 12/2005 |
| WO | 2006/013333 | 2/2006 |
| WO | WO 2006/012031 | 2/2006 |
| WO | 2007/009040 | 1/2007 |
| WO | WO 2008/030323 | 3/2008 |
| WO | 2009/019442 | 12/2009 |
| WO | 2009/019443 | 12/2009 |
| WO | 2009/154445 | 12/2009 |
| WO | 2010/0057843 | 5/2010 |
| WO | 2010/0057845 | 5/2010 |
| WO | 2011/086234 | 7/2011 |
| WO | WO 2012/116314 | 8/2012 |

OTHER PUBLICATIONS

Search Report and Written Opinion for PCT/NL2009/000206 dated Feb. 8, 2010 (corresponds to US publication US 2012/0031828).
International Search Report for EP 16166136 dated Sep. 6, 2016.

* cited by examiner

LIQUID FILTER ASSEMBLIES; FEATURES; COMPONENTS; AND, METHODS

CROSS-REFERENCE TO RELATED APPLICATIONS

This application is a continuation of U.S. application Ser. No. 13/262,071, filed Apr. 19, 2012, which is a US National Stage application of PCT International Patent Application No. PCT/US10/29228, filed on Mar. 30, 2010, which claims priority to U.S. provisional application 61/211,586, filed Mar. 31, 2009, which application is incorporated herein by reference. To the extent appropriate, a claim of priority is made to each of the above disclosed applications.

FIELD OF THE DISCLOSURE

The present disclosure relates to liquid filter assemblies. It particularly concerns assemblies with features to facilitate ensuring a proper replacement part filter cartridge is appropriately positioned within a filter housing, for use. Features described herein can be applied in in-tank filter assemblies, as well as in in-line types of filter assemblies. Features and components for use with such arrangements, as well as methods of assembly and use, are described.

BACKGROUND

Liquid filters have been employed in a variety of applications including hydraulic systems, engine lubrication systems, and fuel systems. In these type of systems, a filter cartridge is serviced periodically. This is important to protect equipment from contaminant.

One general type of filtration system is sometimes referenced as "in-tank." In-tank filter systems are described, for example, in PCT publication WO 2005/063358, published Jul. 14, 2005; and, in PCT publication WO 2008/030323, published Mar. 13, 2008. Each of these two PCT publications is incorporated herein by reference.

In general terms, an "in-tank" filter system, is a system configured to be mounted on a reservoir tank for the liquid involved. The system will typically provide for at least one of: liquid flow to the tank; or, draw of liquid from the tank.

Typically, an in-tank filter assembly includes a housing having a removable, i.e. serviceable, filter cartridge appropriately positioned therein. The service cartridge is periodically removed for servicing, for example when it becomes sufficiently occluded to generate an undesirable level of restriction across the filter media, or when a service interval is passed. Servicing typically involves one of: replacing with a new filter cartridge; replacing with a previously used, but refurbished, filter cartridge; or, in some manner cleaning the removed cartridge and replacing it for further use.

An additional type of liquid filter assembly involves a housing removably secured to a filter head that is not mounted on a reservoir tank. Rather, the housing is mounted on a filter head, filter base or some other form of manifold, which directs liquid to be filtered to the filter system and which provides for removal of filtered liquid from the system. Such assemblies are sometimes referenced as "in-line", since the filter assembly is typically positioned in one or more liquid flow lines. This type of assembly includes a housing or bowl which is mounted on the filter head, base or manifold, for example through a threaded engagement. A filter cartridge is positioned within the housing or bowl, and engages appropriate portions of the filter head as the housing or bowl is mounted, for sealing interaction to provide for a filtering flow path of unfiltered liquid to the filter cartridge, and filtered liquid from the filter cartridge. In some assemblies, referred to herein as bowl/cartridge assemblies, the filter cartridge (when removable from the bowl) is a service part that is typically removed and is either replaced or refurbished.

Example bowl/cartridge filter assemblies are described in PCT WO 2006/012031, published Feb. 2, 2006, incorporated herein by reference. The particular bowl/cartridge filter assemblies depicted in WO 2006/012031 are provided with certain anti-drain back valve features.

It is important to ensure, during servicing, that the filter cartridge is properly and sealingly positioned within the assembly. Since portions of the housing may block view of the cartridge, during closure of the housing, it is preferable to develop features to help ensure proper alignment and interaction between the cartridge and a remainder of the system, to ensure that the cartridge is properly positioned for use.

In addition, with the continued development of still greater numbers of different applications for liquid filter arrangements and a wide number of various types of systems to use them, it is important to ensure that any filter cartridge that is positioned within the housing of a given filter assembly, is a proper filter cartridge for that assembly.

It is also preferable to provide that any features which are incorporated to ensure proper cartridge positioning, and proper engagement within system, are features that are relatively simple to construct, inexpensive to assemble, and convenient to align in use. Improvements in these areas are sought. In addition, unique alternatives to previously existing systems are desired, in order to ensure that for a given system, there is preferably only one type of cartridge, i.e. an appropriate cartridge, which can be fit into the system for use.

SUMMARY

Liquid filter assemblies, components and features are described and depicted. In general, the features provide for ensuring that a filter cartridge, for a liquid filter assembly, is the proper filter cartridge for that assembly and is appropriately installed and sealed, when positioned in the assembly for use. Features described herein can be applied with both in-line filter assemblies and in-tank filter assemblies.

In general terms, a liquid filter cartridge is provided. The cartridge is configured for use, in installation, in removable sealing engagement with a liquid flow collar of a liquid filter assembly. The liquid filter cartridge includes filter media surrounding an open filter interior. The media has first and second, opposite, ends and defines a central axis. The media can define a cylindrical outer perimeter, or alternatives.

A first end construction is positioned at the first end of the filter media. It is typically closed, although alternatives are possible. This end construction can be a closed end cap, or it can be an end construction having a bypass valve arrangement therein.

A second, open, end construction is positioned at the second end of the media. The second end construction, being open, includes a liquid flow aperture therethrough in communication with the open filter interior. In examples depicted, the second end construction includes a central spigot projecting away from the media and surrounding and defining a central liquid flow aperture.

A seal member is positioned on the spigot. The seal member can comprise an o-ring, although alternatives are possible. In examples depicted, the seal member is positioned around the spigot, although alternatives are possible. The seal member is typically configured to define a seal pattern non-orthogonal to the central axis of the media.

Typically, the seal member is configured so that, in axial projection, it defines a circular perimeter.

A member of a projection/receiver rotational alignment arrangement is positioned on the second end construction. Typically this member is not a seal, i.e. it is a "non-seal member." The member of the projection/receiver rotational alignment arrangement positioned on the second end construction is configured and oriented at a location to engage at another member of a projection/receiver rotational arrangement on a liquid flow collar, in selected rotational alignment, when the liquid filter cartridge is positioned for use. The "selected rotational alignment" can be a single possible pre-selected rotational alignment or more than one, depending on the system. Typically, only a single possible (pre-selected) rotational alignment will be preferred. The rotational alignment arrangements depicted also prevent the cartridge from rotating, once installed.

Also according to the present disclosure, methods, features and techniques providing for snap-fit engagement between a filter cartridge and a filter housing, in use, are provided. These can be used with various alignment features previously described, or can be used independently thereof.

Methods of assembly and use are described.

It is also noted that there is no specific requirement that a feature, component, assembly or method include all of the detail characterized herein, in order to obtain some benefit according to the present disclosure.

BRIEF DESCRIPTION OF THE DRAWINGS

in FIG. 46 the assembly being depicted during a step of securing a housing to a filter head.

in FIG. 71 selected portions being shown in cross-sectional view.

DETAILED DESCRIPTION

The principles described herein can be used with a variety of liquid filtration systems. Typical uses will be in hydraulic systems. However, the principles can be applied in other liquid systems, for example lubricant systems and/or fuel filter systems.

I. Example In-Tank Liquid Filter Assemblies Including Features According to the Present Disclosure A. General Schematic, FIG. 1

Figure 1:
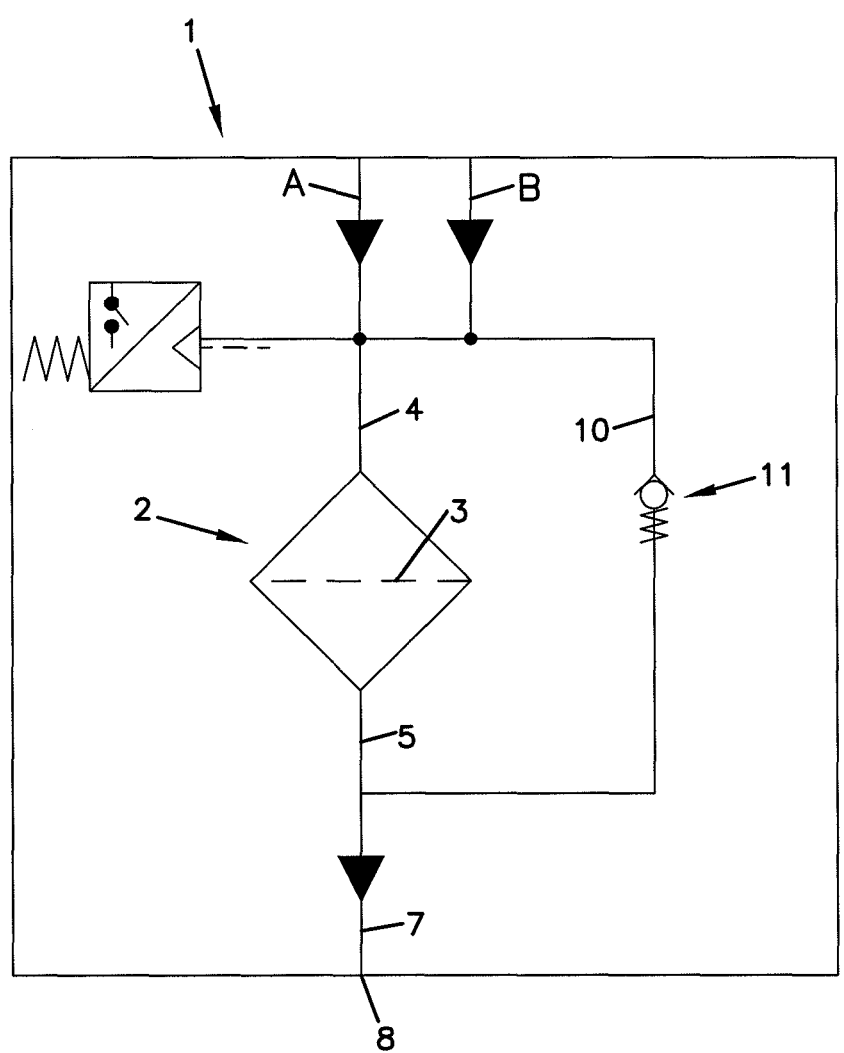
FIG. 1 is a schematic representation of an in-tank filter assembly that can be implemented with principles according to the present disclosure.

The reference numeral 1, FIG. 1, generally indicates a schematic depiction of a system including an in-tank filter assembly according to the present disclosure. Referring to FIG. 1, the system 1 includes a filter arrangement or cartridge 2 including filter media 3 therein. The filter media 3 is configured to filter liquid from inlet line 4 to outlet line 5. The outlet line 5 from the media 3 is directed to an outlet line 7 directed to a reservoir tank, shown generally at 8.

Still referring to FIG. 1, the assembly 2 includes an optional bypass line 10 to accommodate flow around the media 3. The bypass line 10 includes a bypass valve assembly 11 therein, configured to only open and allow flow through line 10, when the restriction between inlet line 4 and outlet line 5 is sufficiently high, i.e. high enough to overcome an opening pressure of the valve assembly 11. Typically, the bypass valve 10 will open to avoid damage to the media 3 during over-pressurization caused by cold starts or excessive contaminant. The opening of valve 10 can also protect equipment from damage.

Assembly 1 can be configured for liquid flow to the filter assembly 2 from one source, indicated generally at A, or from two sources, indicated generally at A and B.

Typically, a filter cartridge 2, which comprises filter media 3, is configured as a service part. That is, the filter cartridge 2, including filter media 3 therein, is serviced periodically, for example when a need for servicing is indicated by a restriction indicator, or when a service interval for the equipment involved has been reached, or when otherwise chosen by the equipment owner or operator. It is desirable to ensure that during servicing, any replacement part cartridge that is selected for installation is properly positioned within the assembly and sealed, for use. It is also preferable to ensure that the servicing operation is a fairly simple operation, easily accomplished by a service provider. Further, it is preferable to ensure that only a proper cartridge, designed for the assembly 2, will fit in the assembly and appear to be installed, when the assembly is closed. Features that facilitate one or more of these, for an in-tank filter assembly, are described herein below, in connection with FIGS. 2-19. It is noted that the particular embodiments described in FIGS. 2-19 are configured with features that are also advantageous in being simple and inexpensive to construct and use.

B. A First Example In-Tank Filter Assembly, with Selected Variations, FIGS. 2-16

It is noted that FIGS. 2-16 include structural features found in FIGS. 2-16 of U.S. Ser. No. 61/211,586. However, specifically with respect to FIG. 16 a change in order of the features, to depict actual assembly, as described below, is made.

Figure 2:
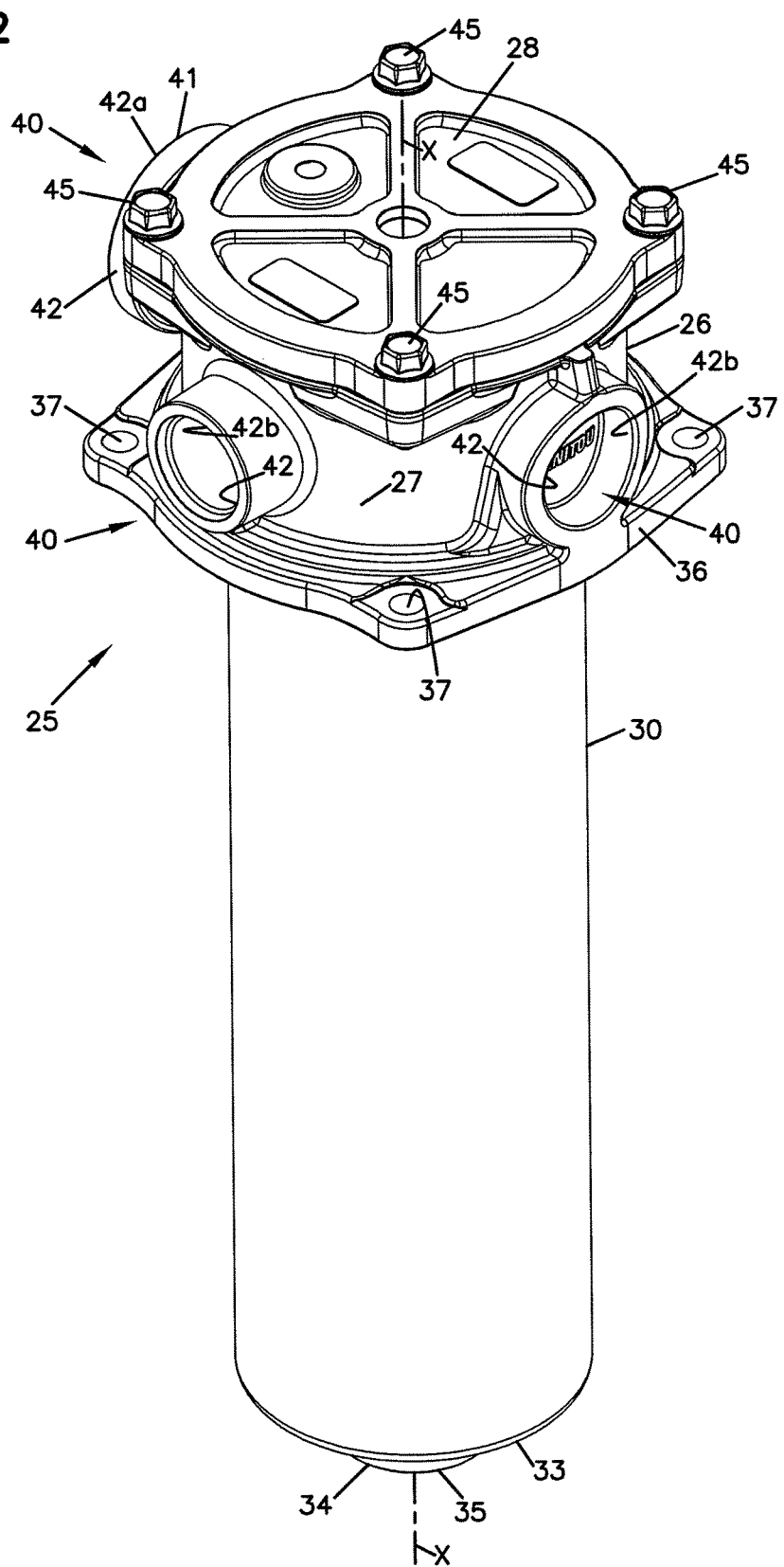
FIG. 2 is a schematic perspective view of an in-tank filter assembly configured for implementation of principles in general accord with FIG. 1.
Figure 3:
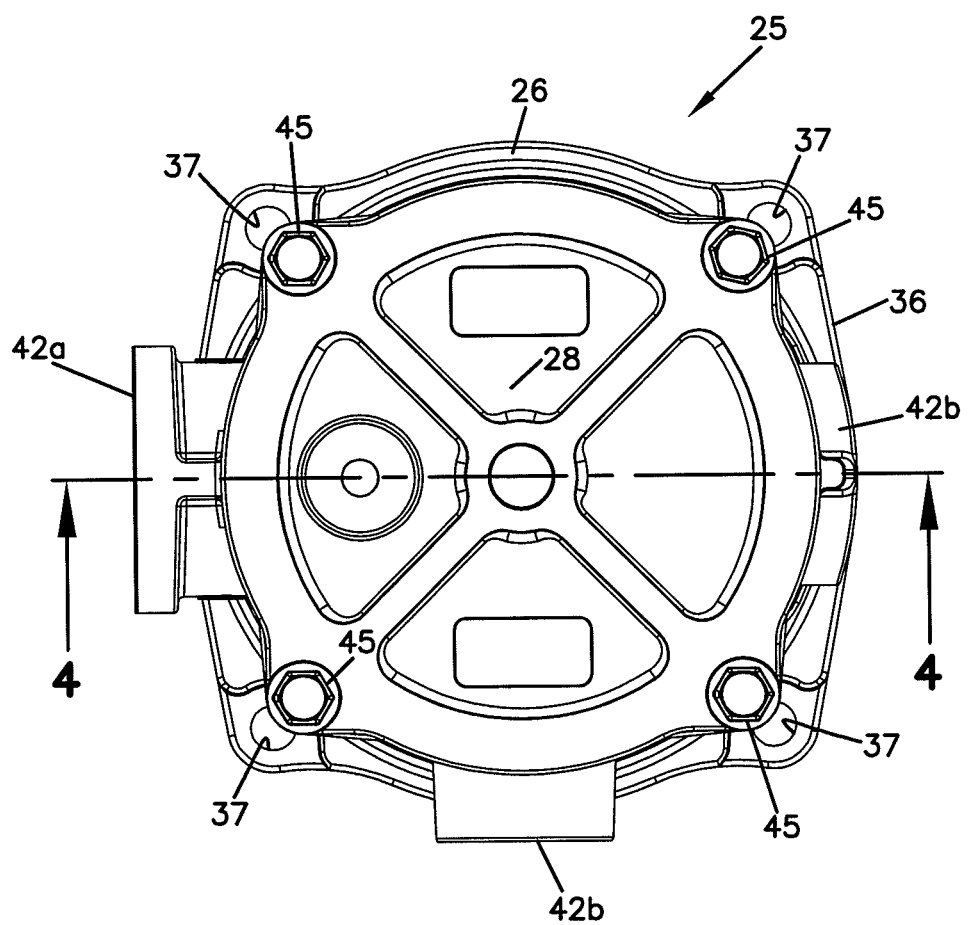
FIG. 3 is a schematic top plan view of the assembly of FIG. 2.
Figure 4:
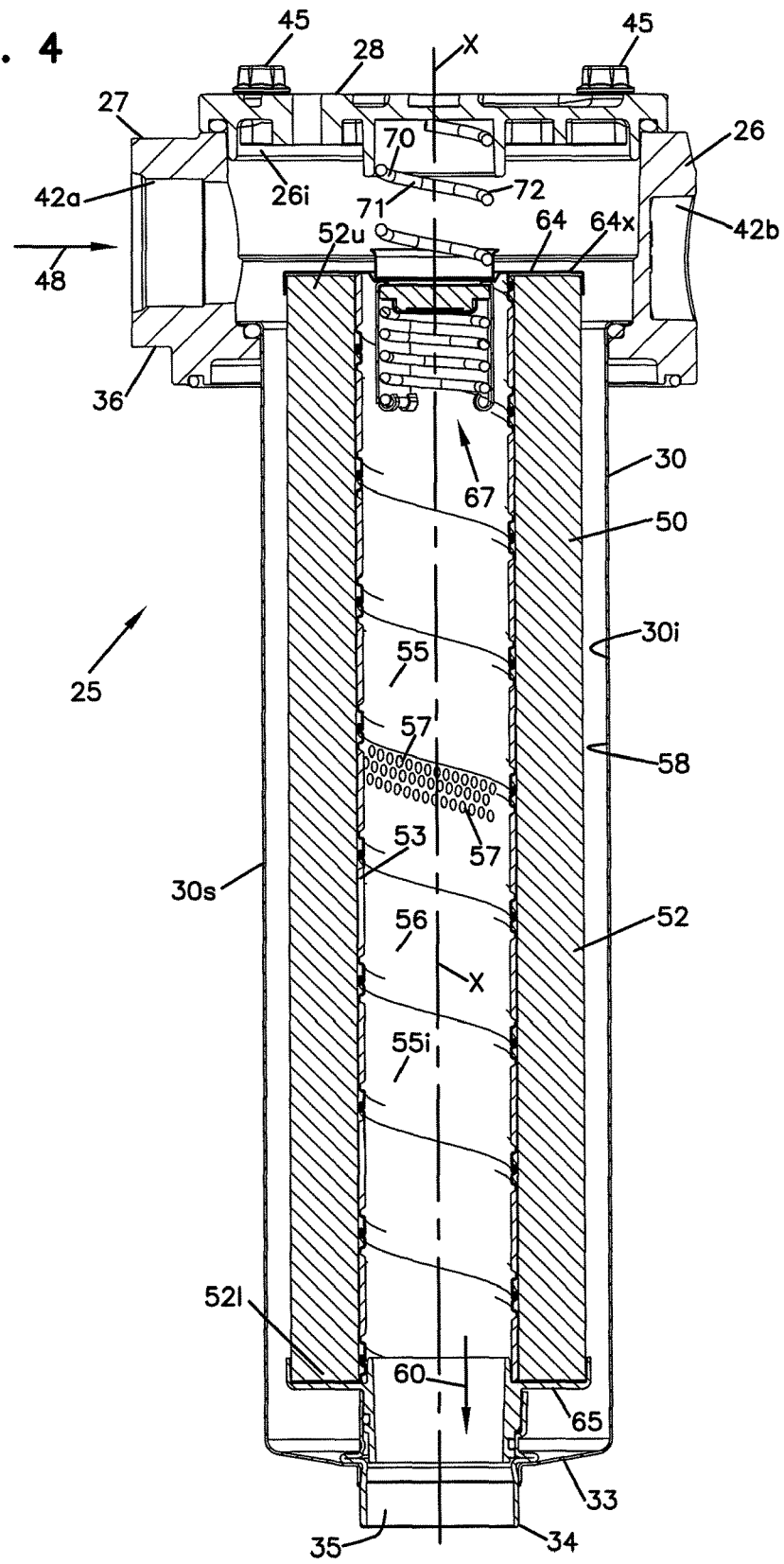
FIG. 4 is a schematic side cross-sectional view of the assembly of FIG. 2, taken generally along line 4-4, FIG. 3.

A first example embodiment of an in-tank filter assembly is depicted in FIGS. 2-4. Referring first to FIG. 2, an in-tank filter assembly 25 is depicted including a filter head assembly 26 comprising a base 27 and an access cover 28; and, a housing 30, depending downwardly from the filter head assembly 26. The housing 30 is configured to receive, projecting therein, a serviceable filter cartridge not depicted in FIG. 2.

Still referring to FIG. 2, the housing 30 includes a lower end 33 with liquid flow port 34 positioned thereon. For the particular assembly 25 depicted, the liquid flow port 34 is an outlet port 35, through which filtered liquid exits the assembly 25. Thus, end 33, remote from head 26, is an open end of housing 30.

In use, assembly 25 would be mounted on a reservoir tank, for example a reservoir tank of a hydraulic filter assembly. Housing 30 would be lowered into the tank, with mounting flange or collar 36 positioned against structure on an exterior of the tank. The assembly 25 can be secured in place, for example, by bolts projecting through apertures 37 in mounting flange 36.

In general, the mounting flange 36 comprises a portion of base 27. The base 27 also includes a port arrangement for liquid flow. The port arrangement 40 depicted, generally comprises a liquid flow inlet arrangement 41. For the assembly depicted, the inlet arrangement 41 allows for flow of liquid to be filtered into the assembly 25. The inlet arrangement 41, i.e. the port arrangement 40, can comprise one or more ports, depending upon the number of liquid flow lines to be fed into the system. The particular assembly 25 depicted, includes three ports 42. It is noted that one or more of the ports 42 may be closed, or may be formed (for example cast) closed, when the assembly 25 is to be used with only one inlet line. Indeed, assembly 25, FIG. 2 is configured so that only port 42a is open to direct liquid flow into the interior of in-tank assembly 25; the other two ports, 42b, each being cast closed. In alternate applications, two or more ports 42a, 42b, 42c can be formed open, with selected ones capped if they are not to be used.

Still referring to FIG. 2, filter head assembly 26 includes an access cover 28 removably mounted on filter base 27, in the example shown by bolts 45. Service access to an interior of assembly 25 is provided by removing access cover 28. This allows, for example, for the service provider to install a cartridge or to remove the cartridge for servicing.

In FIG. 3, a top plan view of assembly 25 is depicted. Attention is directed to line 4-4, FIG. 3, which defines the cross-sectional view of FIG. 4.

Attention is now directed to FIG. 4. Here aperture 42a is depicted open for inlet flow therethrough of liquid to be filtered, the inlet flow generally being designated by arrow 48. Interior 26i of filter head assembly 26 is viewable. Also viewable is housing 30 defining interior 30i depending downwardly from filter head assembly 26. Within interior 30i is, removably, positioned filter cartridge 50. As previously described, the filter cartridge 50 is a service part, i.e. is constructed and configured to be removable from a remainder of assembly 25 during servicing. The term "removable" and variants thereof when used in this and related contexts, is meant to refer to components that can be separated without damage to either component.

In FIG. 4, attention is directed to central axis X, which defines a central axis for housing 30, and also for liquid filter cartridge 50.

Liquid filter cartridge 50 comprises an extension of media 52 surrounding and defining a filter interior 53 which is typically open. For the particular example cartridge 50 depicted, the media 52 surrounds a central core 55, which is perforated for liquid flow therethrough. The particular example core 55 depicted, is a spiral-wound construction 56 having liquid flow apertures 57 therethrough, although alternatives are possible.

As can be seen, referring to FIG. 4, the cartridge 52 is sized to define a liquid flow annulus 58 therearound, between the cartridge 50 and a sidewall 30s of the housing 30. The filter head assembly 26 is configured to direct liquid to be filtered into this annulus 58. The liquid then is directed through the media 52 into interior 53, and thus into interior 55i of core 55. The filtered liquid is then directed in the general direction of arrow 60 outwardly from cartridge 50 and through liquid flow outlet 35. In this manner liquid filtered by the cartridge 50, is directed into the tank or reservoir.

Herein, an assembly which is configured for the filtering flow through media to be from outside of the media through the media to a filter interior, will sometimes be characterized as configured for "out-to-in" flow during servicing. It is noted that the assemblies shown herein are generally depicted as configured for "out-to-in flow" during filtering. The principles described herein can also be used, however, in assemblies configured for "in-to-out" flow during filtering, i.e. a direction of filtering flow from the interior of a cartridge to an exterior, if desired.

In general, the media 52 of the cartridge 50 has opposite ends 52u and 52l and extends between first and second end constructions 64, 65. End construction 64 is closed and generally provides for a closed end cap 64x, i.e. an end cap closed to the flow of liquid therethrough, during normal operation. The particular closed end cap 64x depicted, is closed by an optional bypass valve assembly 67. Bypass valve assembly 67, which is described in further detail below in connection with FIGS. 7-10, is configured to open end cap 64 to liquid flow therethrough, into interior 53, without the liquid passing through the media pack 52, only when a pressure drop across the media 52 has reached a selected level. This may occur, for example, during a cold start-up. It can also occur should contaminant sufficiently occlude the media pack. For example, as the media pack 52 begins to occlude, should it occlude sufficiently to an undesirable extent, the bypass valve assembly 67 is configured to open and allow the liquid to bypass the media pack 52 and to be directed from inlet 42a to outlet 35. Thus, in general, end construction 64 is a closed "end construction" or "closed end cap" since during normal operation, i.e. when the bypass valve 67 is not opened, the end cap closes end 52u of the media 52, and also closes the corresponding end of the media interior 53, to passage of liquid therethrough.

Still referring to FIG. 4, attention is directed to locator member 70. The locator member 70 helps provide for alignment between the cartridge 50 and the filter head assembly 26. Further, the particular locator member 70 depicted comprises a biasing member 71. The biasing member 71 helps ensure that the cartridge 50 is biased in the assembly 25 in a direction toward the outlet 35, i.e. in a direction for ensuring sealing. To facilitate this, the example biasing member 71 depicted comprises a coiled spring 72. Some variations in mounting of the locator member 70 are discussed below in connection with FIGS. 6 and 6A.

As discussed above, cartridge 50 is a service part, i.e. it is removable and replaceable within in-tank assembly 25. The general features of the cartridge 50 will be understood by reference to FIGS. 5-6A.

Figure 5:
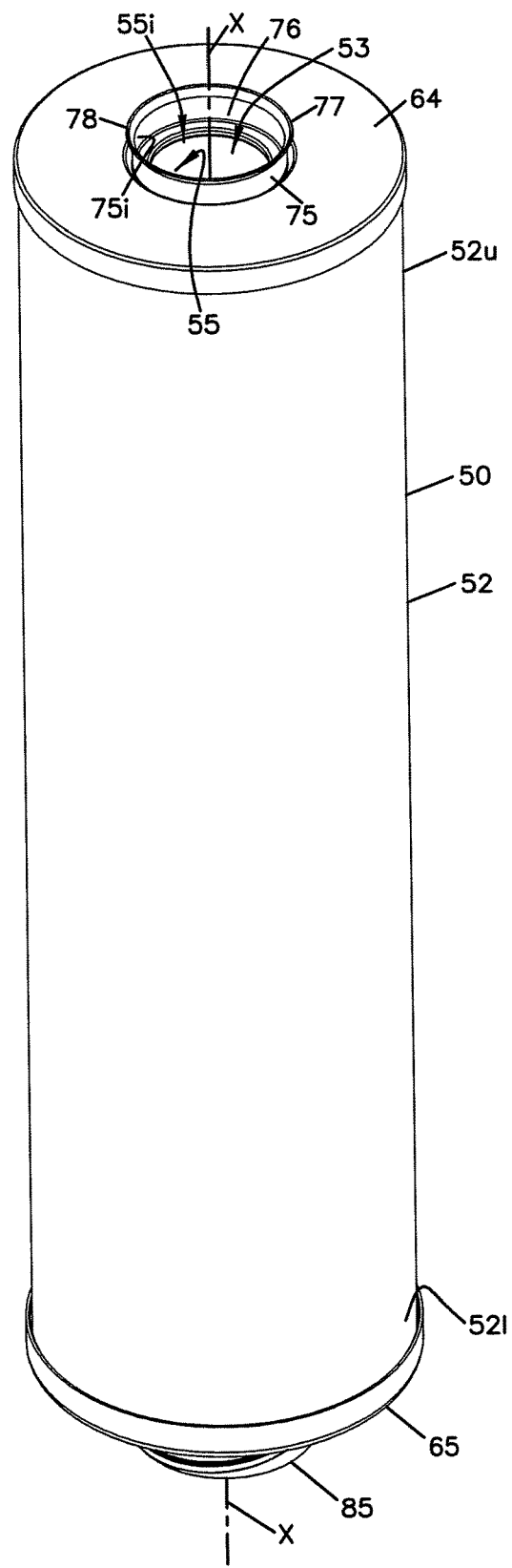
FIG. 5 is a schematic top perspective view of a replacement part filter cartridge for the assembly of FIGS. 2-4.

Referring first to FIG. 5, liquid filter cartridge 50 is depicted in schematic top perspective view. The media 52 is depicted surrounding interior 53, core 55 and central axis X. The media 52 is not depicted in detail. It can comprise, for example, a variety of configurations of media, including pleated and non-pleated arrangements. Further it can be provided with an outer liner surrounding the media 52, to form a media pack, if desired. The media can comprise a variety of filter media materials suitable for the intended filtering operation. It will typically comprise non-woven fibrous material.

Still referring to FIG. 5, end constructions 64 and 65 are depicted. Construction 64 includes, projecting axially outwardly therefrom, in a direction away from end construction 65, a collar 75. The collar 75 surrounds an inner rim 76 against which coiled spring 72, i.e. biasing member 71, FIG. 4, will bias. The collar 75 also includes an outer edge 77 with a outward flare 78, to facilitate entering the coiled spring 72 into interior 75i of the collar 75.

Figure 6:
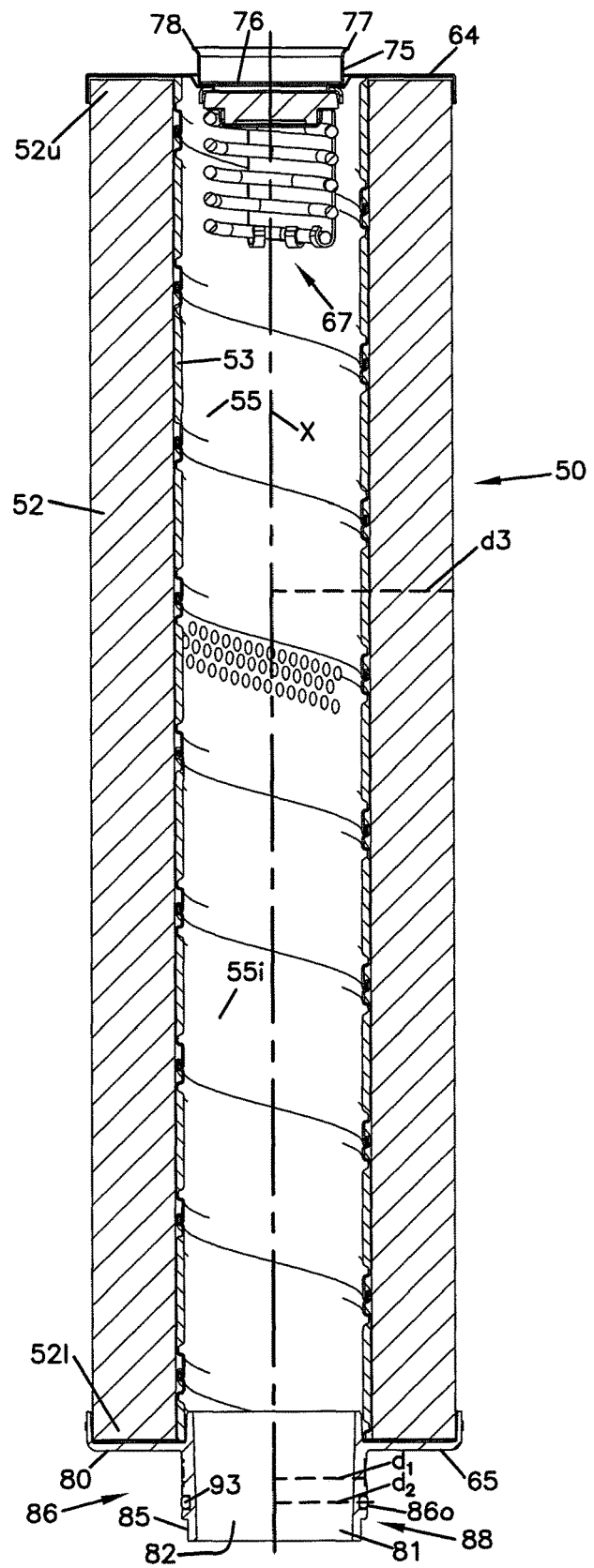
FIG. 6 is a schematic cross-sectional view of the cartridge of FIG. 5.

Attention is now directed to FIG. 6, a schematic cross-sectional view of cartridge 50, taken generally along line 6-6, FIG. 5. Referring to FIG. 6, end construction 64 is viewable on one end of the media 52. The bypass valve assembly 67, discussed further below in connection with FIGS. 7-10 is more readily viewable. Further collar 75 with flare 78 and inner rim 76 is viewable.

With respect to FIG. 6, attention is now directed to end construction 65 which is positioned on an opposite end 52l of the media 52 from end construction 64. The end construction 65 is open, and generally includes: a flange 80, which extends over end 52l of the media pack 52; and, central port arrangement 81, which provides for liquid flow communication between interior 55i (and thus media interior 53) and a region exterior to cartridge 50, without passage through bypass valve assembly 67 or media 52. In a typical assembly configured for out-to-in flow during filtering operation, as described previously with respect to FIG. 4, central port arrangement 81 comprises an outlet port 82 for flow of filtered liquid from interior 53 (i.e. core interior 55i) of cartridge 50.

End construction 65 includes a seal support, spigot or projection 85 thereon, having a seal 86 thereon. The seal support 85, in the example depicted, comprises a spigot or projection extending away from the media pack 52 in a direction generally away from end construction 64. The seal 86 depicted comprises a radial seal member which surrounds and spigot 85 and is configured to form a housing seal, with a portion of the housing 30. For the particular assembly depicted, seal 86 is configured to form an outwardly directed radial seal 88. By "outwardly directed" in this context, it is meant that the seal 86 is positioned so that when it sealingly engages a seal surface in a housing, the sealing force are against a surrounding structure and generally directed radially toward or away from central axis X of the cartridge 50.

For the particular example seal 86 depicted, an o-ring 86o is shown, positioned in a receiving groove 93 on the seal support 85. It is noted that alternate configurations for the seal 86 to o-rings, can be used. For example, the seal 86 can comprise a portion of seal material molded onto or otherwise mounted on a portion of end construction 65.

It is noted that the end constructions 64 and 65 can be pre-made and then be secured to ends of the media pack 52, 52l respectively, with a potting material or adhesive. The end constructions 64, 65 can be formed from metal, or can comprise molded plastic components.

Figure 6A:
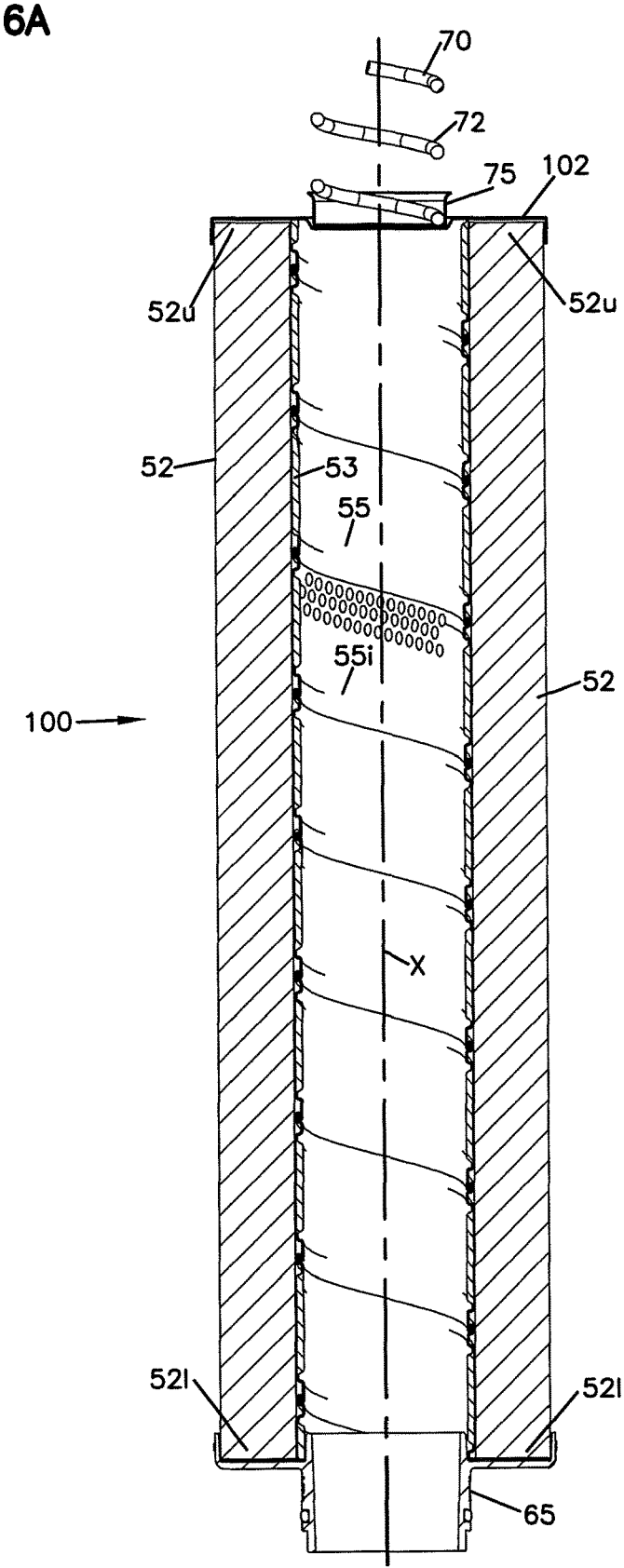
FIG. 6A is a schematic cross-sectional view of an alternate cartridge to the cartridge of FIGS. 5 and 6, depicted without a bypass valve and with a locator spring secured on the cartridge.

Attention is now directed to FIG. 6A, which depicts an alternate cartridge construction to that shown in FIG. 6. Referring to FIG. 6A, cartridge 100 is depicted. The cartridge 100 includes many features analogous to cartridge 50, and analogous reference numerals are sometimes used to identify those features. Cartridge 100 differs from cartridge 50 in two primary manners. First, cartridge 100 does not include a bypass valve arrangement analogous to bypass valve assembly 67 thereon. Rather end 52u of media pack 52 (and cartridge 100) is closed by an end construction 102 that is simply a closed end cap, without a bypass valve but with a collar 75 thereon that has been configured for receipt of a locator member 70 projecting therein.

The second manner in which cartridge 100 in FIG. 6A differs from cartridge 50, is that the locator member 70, in this instance coiled spring 72, is secured to the cartridge 100. In the example of FIG. 6, the locator member 70 was not secured to the cartridge 50, but rather cartridge 50 was configured to be used with a filter head, in which the locator member remains secured to the filter head during servicing. Of course with the cartridge of FIG. 6A, the overall assembly of FIGS. 2-4 would need to be modified only insofar as the locator member adjustment would be needed.

It is noted that for other alternate applications of the principles described herein, the cartridge can be modified from cartridges 50 and 100, for alternate variations in use of the principles. For example, a bypass valve assembly can be used with a cartridge that also has a locator member 70 secured thereto.

Figure 7:
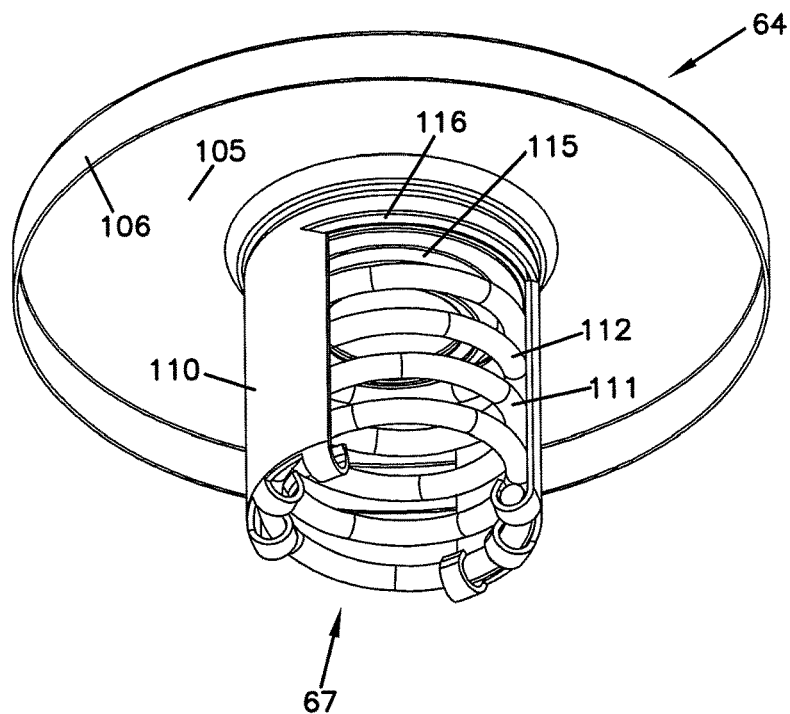
FIG. 7 is a schematic bottom perspective view of a closed end construction of the cartridge of FIGS. 5 and 6.

Attention is now directed to FIGS. 7-10, with respect to the first end construction 64 and bypass valve arrangement 67. Referring to FIG. 7, end construction 64 is shown separated from the media pack 52 of cartridge 50, FIG. 6. The end construction 64 includes an end plate 105 and flange 106. The media 52 is typically potted and sealed against end plate 105 for sealing end 52l of the media 52, with rim 106 extending around the media 52. It is noted that the particular rim 106 and end plate 105 construction, can be for example manufactured from metal, although it could also be a molded piece in some applications.

Figure 8:
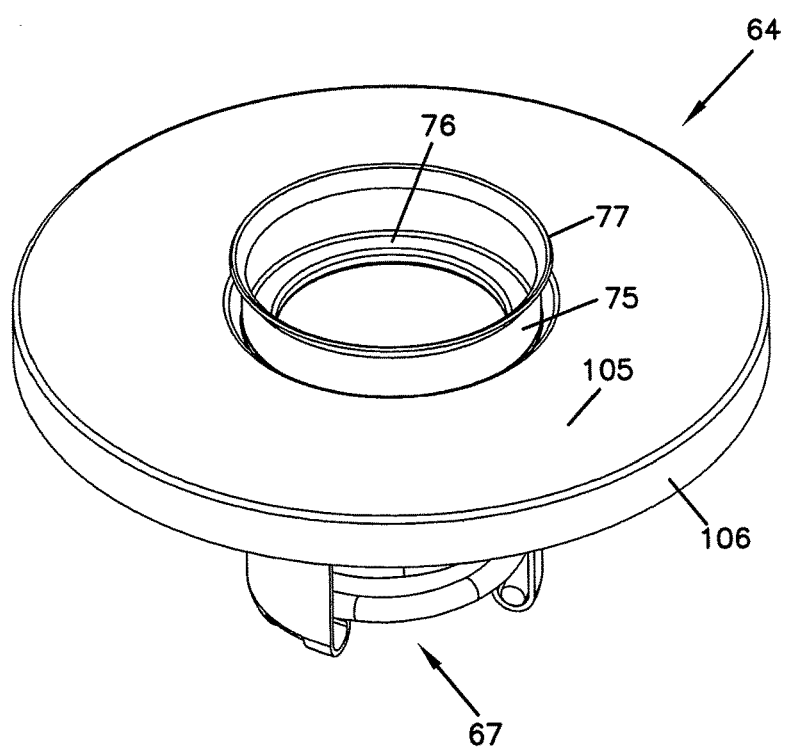
FIG. 8 is a schematic top perspective view of the end construction of FIG. 7.
Figure 9:
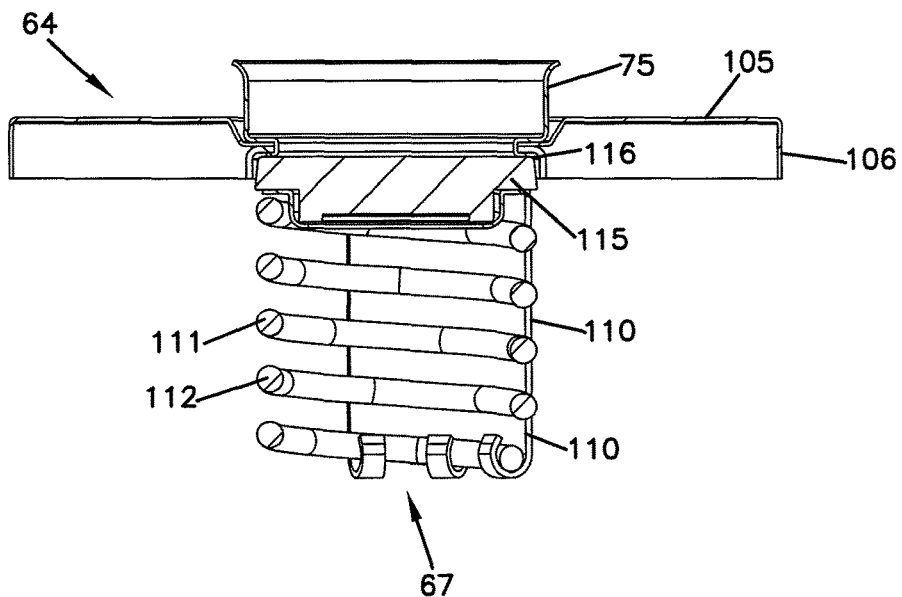
FIG. 9 is a schematic cross-sectional view of the end construction of FIGS. 7 and 8.

Referring to FIG. 8, the end construction 64 is provided in a top plan view. Locator member-receiving collar 75 is viewable. Collar 75 and rim 76 can also be formed from metal if desired.

Referring back to FIG. 7, bypass valve assembly 67 is seen attached to end construction 64 at a location so that it will project into an open region 53 surrounded by the media 52, when installed in the cartridge 50. The bypass valve assembly 67 comprises frame 110 positioned as a support to a biasing member 111, in this instance comprising coiled spring 112. The bypass valve assembly 67 further includes a valve member 115, supported by the biasing member 111 in sealing engagement with a valve seat 116. With respect to this, attention is directed to FIG. 9. Here valve member 115 can be seen biased against valve seat 116, to close the valve assembly 67; the biasing being provided by coiled spring 112 (i.e. by biasing member 111). Thus, end construction 64 is closed, as long as the closing pressure of biasing member 111 is not overcome by the pressure differential between opposite sides of the valve member 115. Should the pressure differential between opposite sides of valve member 115 become sufficiently large, the closure force of the biasing member 111 will be overcome, the valve head 115 will bias away from valve seat 116 and the valve assembly 67 will open for flow of unfiltered liquid therethrough, into the cartridge interior 53, FIG. 6.

Figure 10:
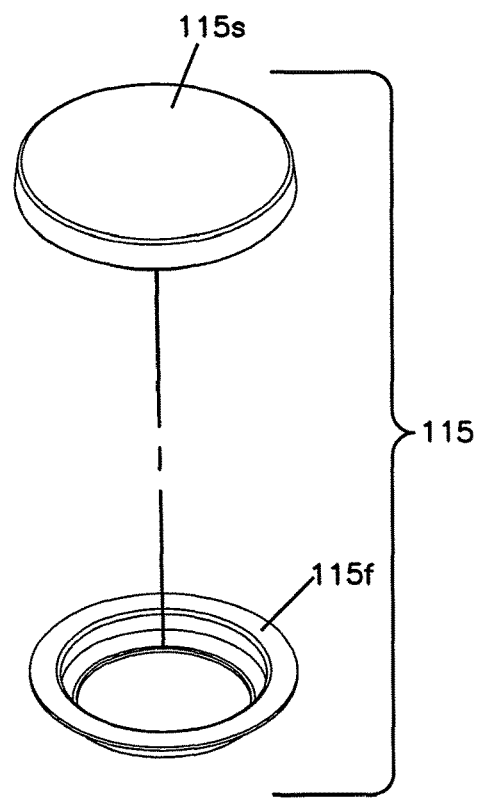
FIG. 10 is a schematic, exploded, perspective view of a component in the end construction of FIG. 9.

In FIG. 10, a exploded view of the valve member 115 is depicted, showing seal member 115s and frame piece 115f.

Figure 11:
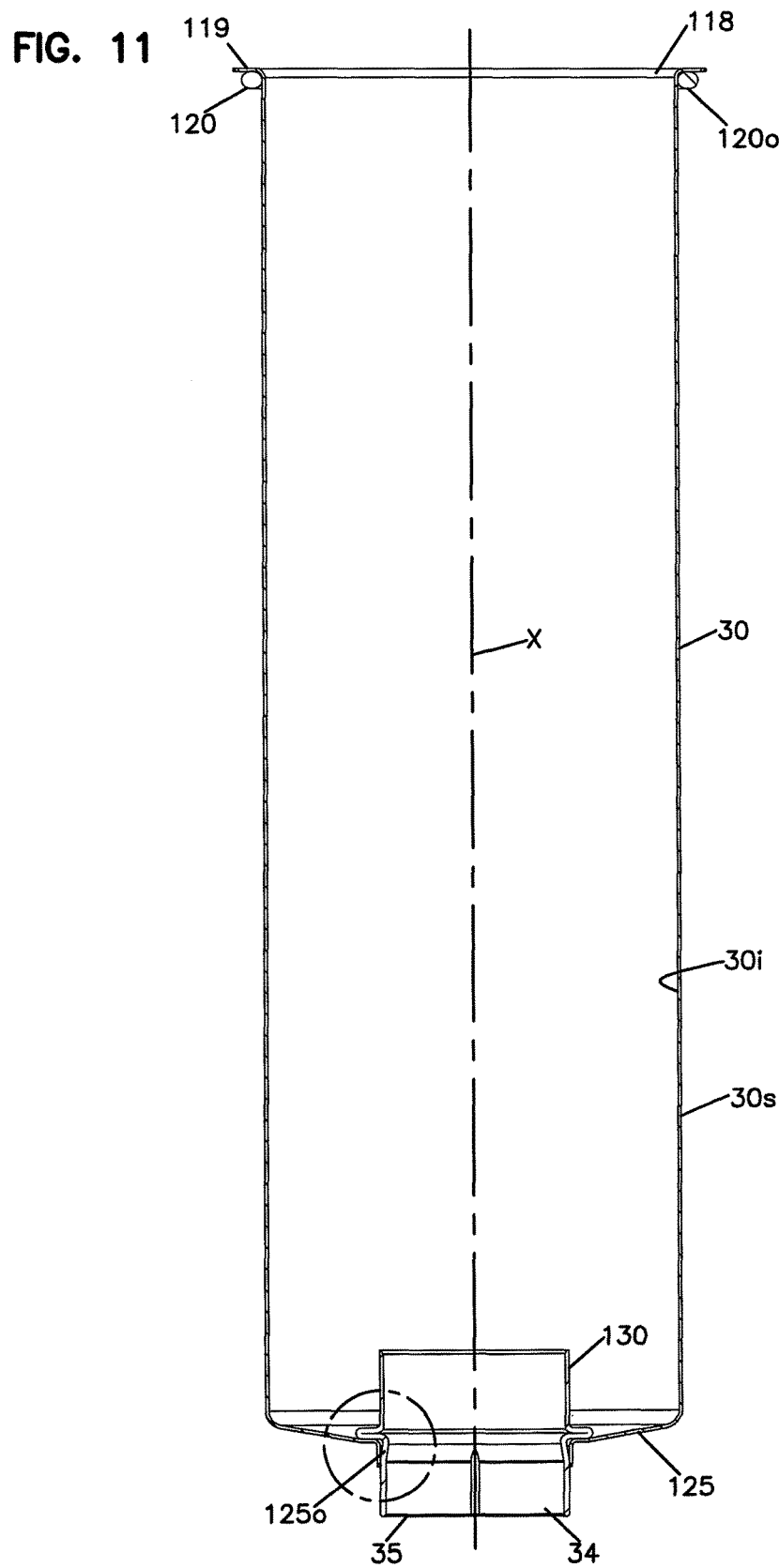
FIG. 11 is a schematic cross-sectional view of a housing member of the assembly of FIGS. 2-4.

Attention is now directed to FIG. 11, in which the housing 30 is depicted in schematic cross-sectional view. The example housing 30 includes a sidewall 30s defining an interior 30i. At one end 118, the example housing 30 is generally open for receipt of cartridge 50 projecting therethrough, into interior 30i. For the example housing 30 depicted, at end 118 an outwardly directed flange 119 is provided. Underneath flange 119 is positioned a seal member 120. Seal member 120 can be secured to a remainder of the housing 30, or can just be loosely positioned. Although alternatives are possible, for the example depicted the seal member 120 is an o-ring 120o. Alternate shaped or types of gaskets can be used.

Figure 16:
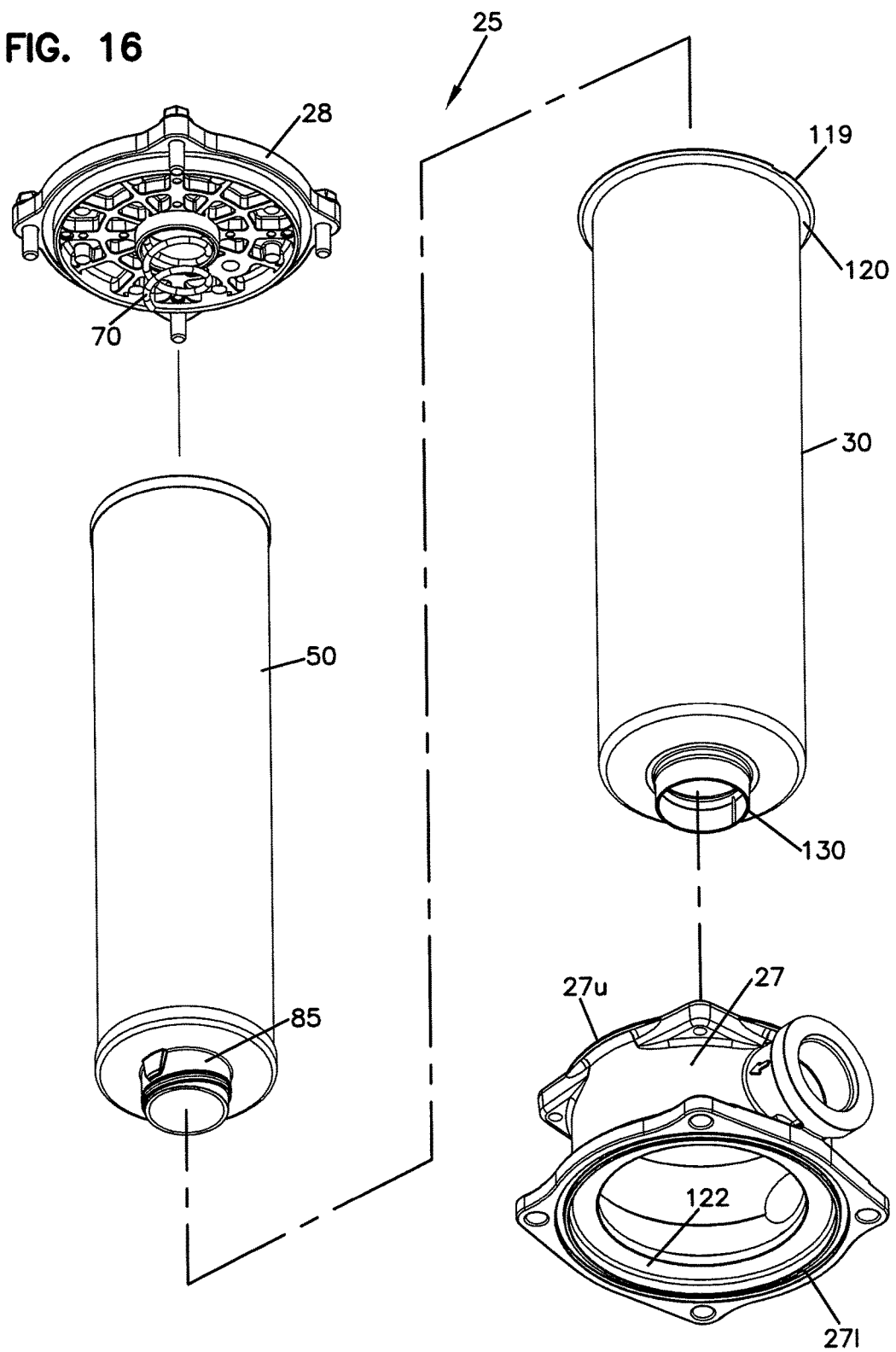
FIG. 16 is a schematic, exploded, bottom perspective view of the assembly of FIGS. 2-4.

Attention is now directed to FIG. 16. FIG. 16 is, in general, a schematic exploded perspective view of assembly 25. In FIG. 16, base 27 is viewable, with access cover 28 removed. During assembly, housing 30 is lowered through upper end 27u of base 27, with sidewall 30s depending downwardly through lower end 27l of base 27. Lowering would occur until flange 119 engages the shelf 122 in base 27. Sealing between the flange 119 and the shelf 122 is provided by seal member 120. The combination of base 27 and housing 30 is now ready to receive, operably therein, cartridge 50 and then to be closed by positioning access cover 28 over upper end 27u of base 27.

Attention is now directed back to FIG. 11. Opposite to end 118, housing 30 includes end 125. End 125 includes liquid flow port 34 therein, in this instance comprising a liquid flow outlet 35. In the example depicted, liquid flow port 34 is provided by a liquid flow collar 130, separately made and then positioned with a portion thereof extending through aperture 125o in end 125. With respect to this, attention is directed to FIG. 13, an enlarged fragmentary view of a portion of FIG. 11. Here, aperture 125o defined by downwardly directed flange 125x is viewable. A portion of collar 130 can be seen projecting into aperture 125o. Further detail regarding collar 130 is described herein below, in connection to FIGS. 14 and 15.

Figure 12:
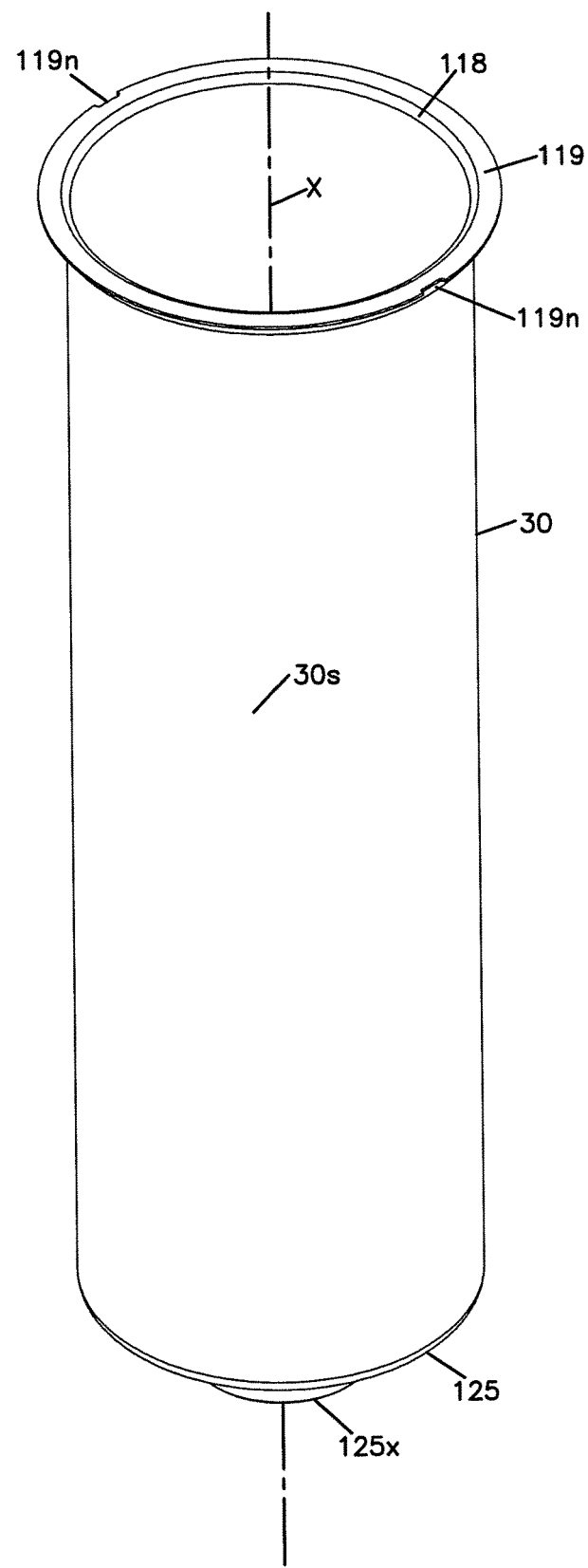
FIG. 12 is a schematic top perspective view of the component of FIG. 11.
Figure 13:
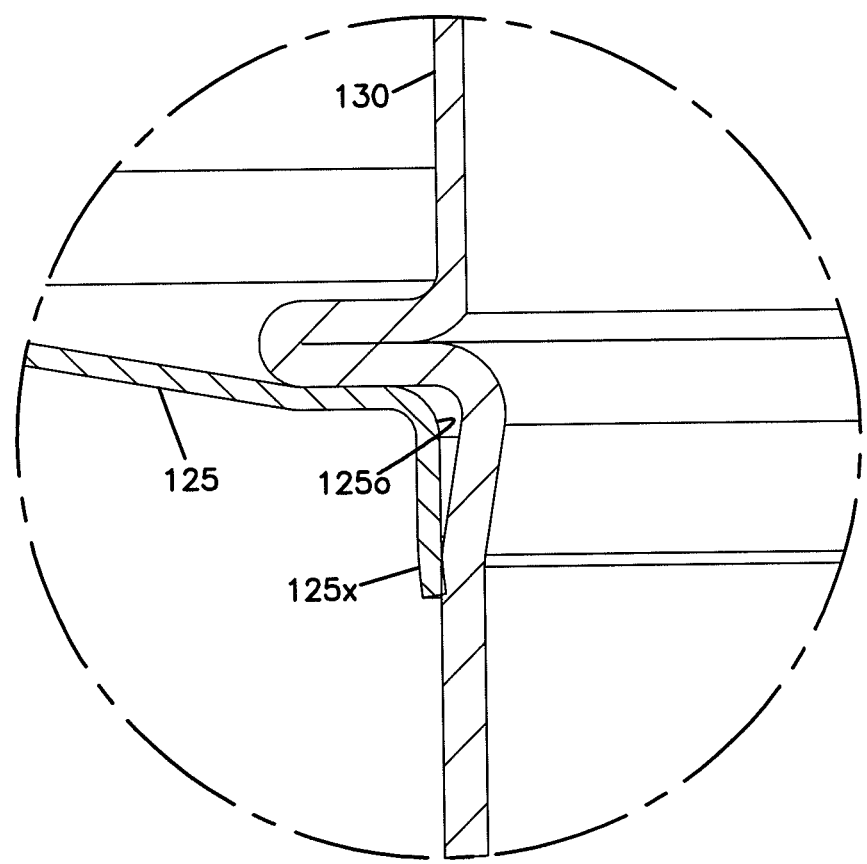
FIG. 13 is a schematic, enlarged, fragmentary, cross-sectional view of an identified portion of FIG. 11.

In FIG. 12, a top perspective view of housing 30 is provided. Opposite notches 119n in flange 119 are viewable. These can be oriented to engage projections in base 27, FIG. 16, during installation, for aligning and securing housing 30 in position.

Figure 14:
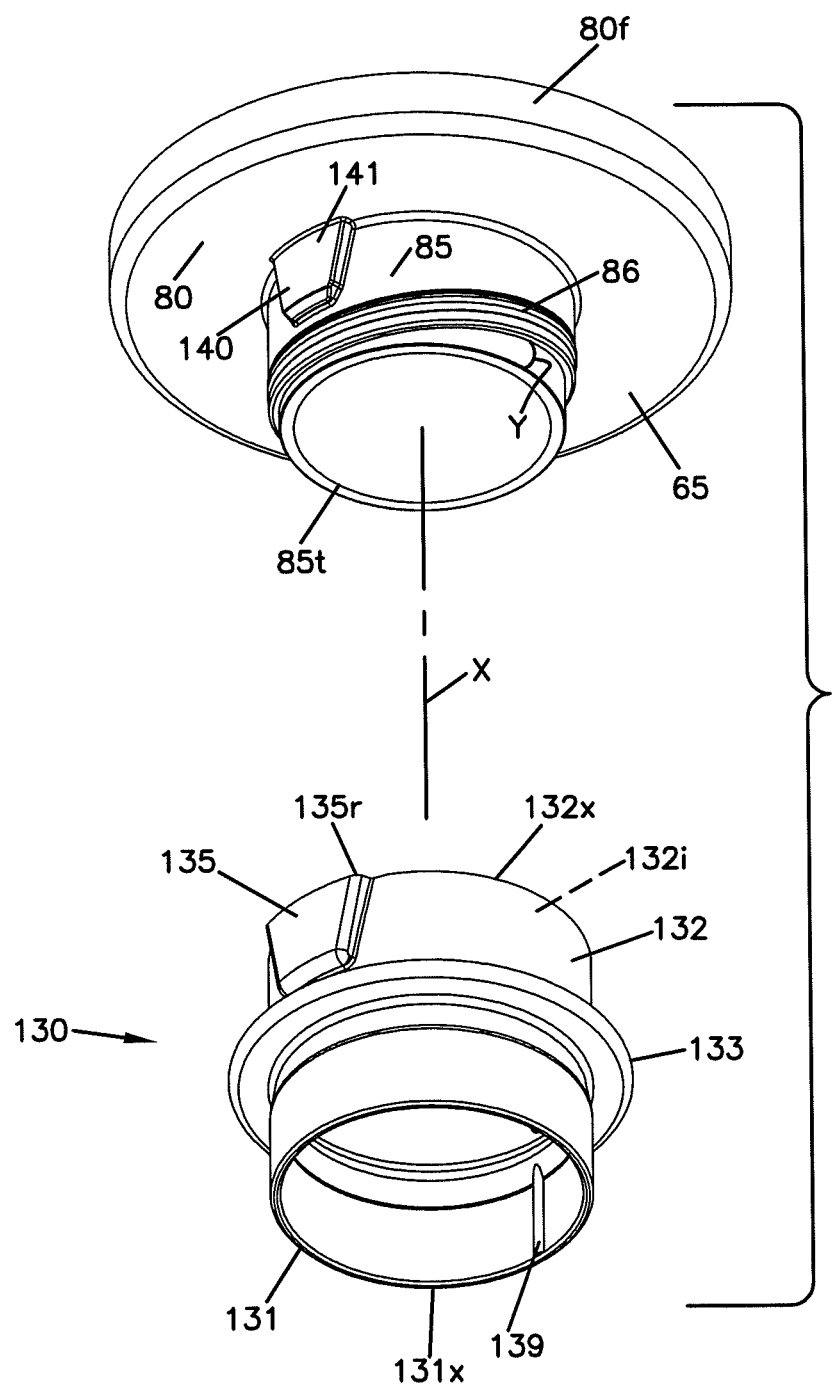
FIG. 14 is a schematic, exploded, bottom perspective view of two components of the assembly of FIGS. 2-4, oriented and rotationally aligned for engagement with one another.

Attention is now directed to FIG. 14, an exploded perspective view depicting both liquid flow collar 130 and end construction 65. In FIG. 14 a schematic, exploded, bottom perspective view is provided, so one can see how end construction 65 is configured for preferred engagement with liquid flow collar 130, when cartridge 50 is installed in housing 30.

Referring to FIG. 14, attention is first directed to liquid flow collar 130. The liquid flow collar 130 is depicted in bottom perspective view and includes a first ring portion 131, a second ring portion 132; and, a central radially projecting rim 133.

First ring portion 131 defines an open end 131x, for liquid flow therethrough. The second ring portion 132 defines an open rim 132x for liquid flow therethrough.

The central radially projecting ring 133 is sized and shaped to interfere with an end 125 of housing 30, when liquid flow collar 130 is installed. Typically, the liquid flow collar 130 is installed by being positioned within interior 30i with collar potion 131 projecting outwardly from interior 30i, see FIG. 11. Welding or other attachment arrangements can be used, to secure and seal collar 130 in place and to provide sealing.

Figure 15:
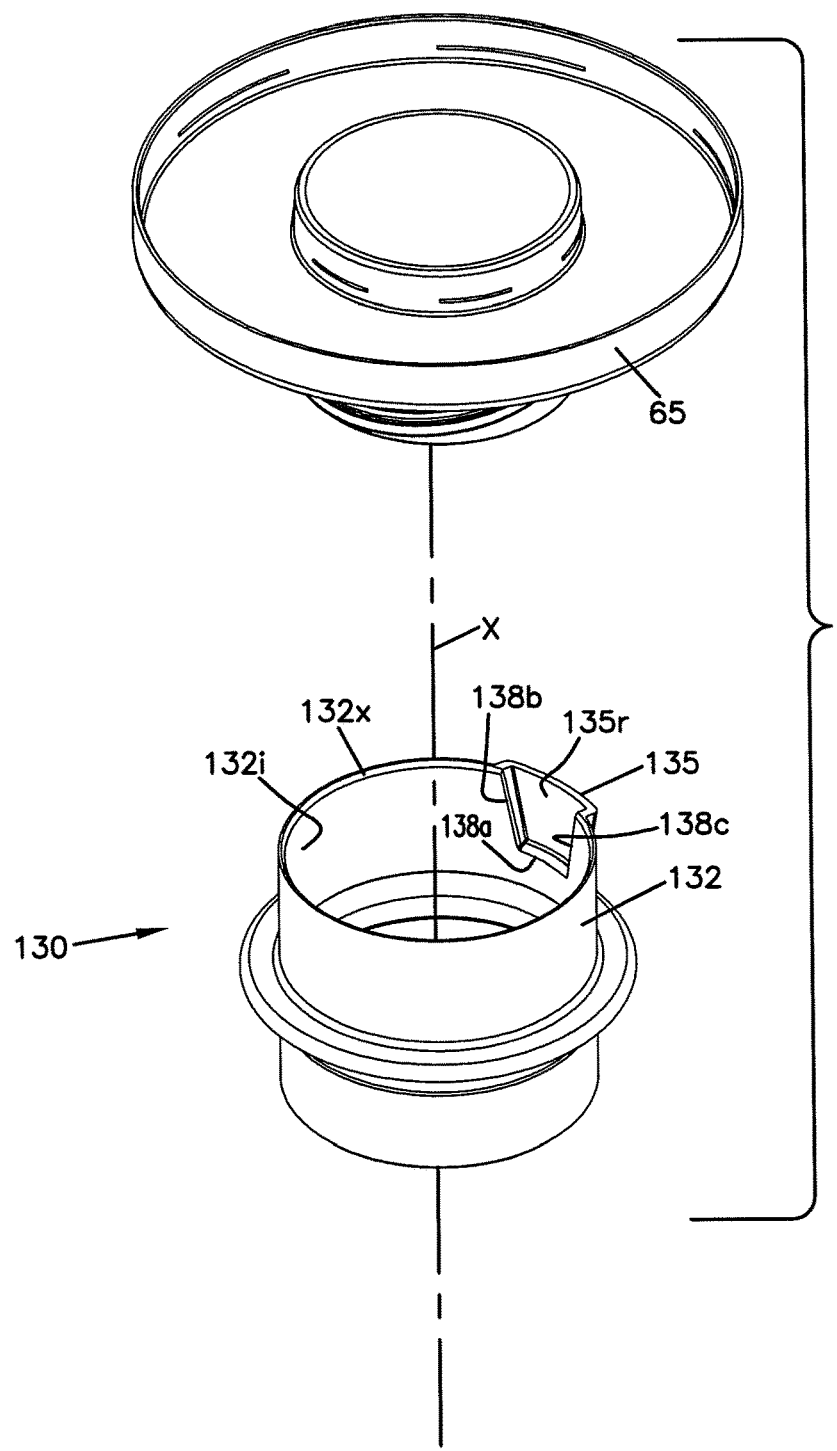
FIG. 15 is a schematic, exploded, top perspective view of the components of FIG. 14.

Referring to FIG. 14, second ring portion 132 is generally circular or ring shaped, but includes a (bump-out) radially outwardly projecting portion 135. Referring to FIG. 15, in which a top perspective view of the componentry depicted in FIG. 14 is shown, the (bump-out) projection 135 can be seen as defining, along an interior 132i of upper region 132, a outwardly directed recess or receiver (receiver recess) 135r.

It is noted that the particular receiver recess 135r depicted, diverges in extension away from end 132x, opposite sides 138b, 138c. In a typical assembly, the angle divergence for each of the sides 138b, 138c is the same, and typically is within the range of 5°-20°, inclusive for example 8°-16°, inclusive from vertical. The internal angles where the sides 138b, 138c engage bottom 138a, for the example depicted, would be about 95-110°, inclusive, typically 98-116°, inclusive.

The liquid flow collar 130 can be constructed from a variety of materials. Usable materials include, for example, metal and plastic. It is anticipated that in a typical application, collar 160 will comprise a steel ring formed, for example, from a sheet of appropriate steel coiled and welded into a cylinder, for example as shown at welding bead 139, FIG. 14. The features of the liquid flow collar 130 could then be formed using a metal press operation. This would tend to smooth any portion of the welding bead in the second collar section 132. It can also be used to form bump-out 135 (i.e. recess 135r) and ring 133.

Referring to FIG. 15, in general terms interior surface 132i of collar 130 and in particular second region 132 is positioned and configured to define a seal surface oriented to receive, sealed thereagainst, the housing seal 86. This will be understood by further reference to FIGS. 14 and 15.

Referring to FIG. 14, attention is directed to end construction 65. As previously discussed in connection with FIG. 6, end construction 65 includes flange 80 and central port arrangement 81. Positioned at a location to extend around end 52l of media 52, FIG. 6, cover 80 includes rim 80f.

Central port arrangement 81 comprises a projection or spigot 85 secured to flange 80 and extending in a direction away from the media 52, FIG. 6. Referring to FIG. 14, projection or spigot 85 includes thereon an interference fit member 140. The interference fit member 140 is positioned to ensure that the projection or spigot 85 can only sealingly engage portion 132i of collar 130 when the two are in preferred rotational orientation as further discussed below. For the particular example assembly depicted, the interference fit member 140 comprises a trapezoidal-shaped seal projection 141 sized, shaped and positioned to slide into receiver 135*r* as projection 85 is pushed into liquid flow collar 130. Alternate shapes to the interference fit member 140 can be possible.

In more general terms, interference fit member 140 is a first member of a projection/receiver rotational alignment arrangement, positioned within the assembly 25. Another member of the projection/receiver rotational alignment arrangement, is positioned in liquid flow collar 130. The two members are configured such that they can only engage in a manner that allows sealing engagement between the cartridge 50 and the liquid flow collar 130, when the rotational alignment between the two is as selected. For the particular example depicted, only one rotational alignment is allowed, although alternatives are possible in other applications of the technique described herein. Also for the particular arrangement depicted, member 140 is a projection arrangement, and member 135*r* is a receiver arrangement, although alternatives are possible.

Still referring to FIG. 14, seal 86 can be seen oriented to encircle projection or spigot 85 on an exterior thereof, and is oriented to define a seal pattern oriented non-orthogonal to a central axis X extending through projection or spigot 139. Typically the seal pattern defines a plane that is non-orthogonal to central axis X which extends at an acute angle to a plane orthogonal to axis X at an angle, indicated generally at Y, of at least 5° usually at least 7° and typically not more than 40° and usually not more than 20°, typical angles are within the range of 7°-15°, inclusive.

Comparing FIGS. 14 and 15, the seal pattern and angle Y are chosen so that the seal 86 will pass under receiver 135*r*, but will, when sealing against surface 132*i*, angle upwardly. Indeed, interior 132*i* of upper collar section 132 is typically configured so that when the seal passes underneath receiver 135*r* it will not be able to seal to the surface 132*i* unless it is slanted upwardly. Alternately stated, an interior seal surface portion of interior 132*i*, of the liquid flow collar 130, is generally configured to only accept a seal thereagainst, when the seal is angled, i.e. non-orthogonal to a central axis X. This can be managed by providing disruptions through bumps or recesses within interior 132*i*, to any other orientation of seal.

Still referring to FIG. 14, it is noted that seal 86, as it surrounds spigot 85, passes between projection 140, and an end tip 185*t* of projection 85.

A number of advantages can be obtained from using such seal features and other engagement features between the spigot 85 and liquid flow collar 130, in general as described and shown. For example a slanted radial seal can be advantageous during installation, since it can be worked into a side of the seal surface 132*i* without engaging a complete 360° seal force initially, i.e. at the beginning of the insertion. Thus, the insertion can be started, and then with added force and rocking, the cartridge 50, with rotation as needed, can be pushed into appropriate position.

Secondly, the system described can be implemented to help ensure that the cartridge 50 is a proper one, properly installed, for the assembly 25 involved, before the assembly is put on line. For example the interference projection 140 and the receiver 135*r* can be used to ensure that the cartridge 50, once installation is started, is rotated to a proper orientation, before it is pushed fully (downwardly) into a sealing orientation. This will ensure that the seal is properly oriented, for the slanted seal/seal surface alignment needed, to obtain proper sealing.

It is noted that the spigot 85 and flow collar 130 described, can operate as a "sight unseen" rotational alignment arrangement. By this it is meant that typically during engagement between the spigot 85 and the liquid flow collar 130, the service provider cannot see either, as they are buried within the depth of housing 30. However, the interference which will occur between the two members until proper rotational alignment is achieved, will prevent the service provider from believing that the cartridge is properly installed, until appropriate alignment has occurred.

Features can be used in association with those described, to ensure that the cartridge 50 has been properly biased to the seal orientation, and thus is a proper, installed, cartridge, before the access cover 28 is positioned on the base 27. In particular, and referring to FIG. 4, attention is directed to locator member 70, which will be positioned between end cover 64 and access cover 26. Biasing member 71, for example when it is a spring 72, can be selected so that it will resist access cover 26 being bolted closed, unless the cartridge 50 has been pushed downwardly into the sealing orientation. Alternately stated, if the cartridge 50 has not been recessed through alignment between the interference fit member 140 and the receiver 135*r*, the cartridge end 64 will push upwardly substantially far so that the spring 72 cannot be easily collapsed as the access cover 26 is lowered. Generally, this is accomplished by selecting an appropriate length and compression force for the spring 72.

In general terms, assembly 150 shows how a previously existing filter head 151 can be retro-fit for use with assembly having features generally in accord with FIGS. 2-16. This will be done, by providing an alternate housing, to the assembly, generally in accord with housing 30; a cartridge generally in accord with cartridge 50; and, by closing port 156 with cover 157.

Of course a biasing member in accord with biasing member 71 could also be used.

Thus, security features are provided by the characterized features. The interference fit member 140 will ensure that the spigot 139 cannot be pushed fully into interior 132*i* of collar 130, unless in the proper radial alignment, i.e. relative rotational alignment between the spigot 139 and the collar 130. For the example depicted, this seal alignment only occurs in one radial orientation, i.e. when interference fit member 140 is aligned to be received within receiver 135*r*. Of course alternatives are possible. When this rotational alignment occurs, interference to pushing of the cartridge 50 into full engagement with collar 130 is removed. Unless the radial alignment occurs, interference between member 140 and rim 132*x* will occur. This will leave the end cover 64 projecting upwardly within base 27 too far, for access cover 28 to be readily lowered into position due to biasing member 71 (i.e. spring 72).

Once the appropriate radial alignment occurs, cartridge 50 can be lowered and the seal 86 will be properly radially oriented to engage sealing surface portion of surface 132*i*, i.e. with the seal passing under receiver 135*r* and then slanting upwardly along interior surface 32*i* at a preferred locations for sealing engagement. Of course, preferably the relative sizes of the interference fit member 140 and the receiver 135*r* are chosen so that when slightably engaged, the cartridge 50 cannot, in general, rotate relative to the liquid flow collar 130.

In general terms, then, the assembly of FIGS. 2-16 can be said to include a liquid filter cartridge for installation, in use, to provide removable sealing engagement with a liquid flow collar with a liquid filter assembly. The liquid filter cartridge includes filter media surrounding an open interior, the media having first and second, opposite, ends and defining a central axis. A first, closed, end construction is positioned in a first end of the filter media. This first, closed, end construction can include a bypass valve assembly thereon, if desired. A second end construction is positioned at a second end of the media. The second end construction is open, and includes a central spigot projecting away from the media and surrounding and defining a central liquid flow aperture in liquid flow communication with the open filter interior. A seal member is positioned on the spigot to define a seal pattern non-orthogonal to a central axis of the media. A member of a projection/receiver rotational alignment arrangement is positioned on the second end construction at a location to engage another member of the projection/receiver rotational alignment arrangement on the liquid flow collar, in selected rotational alignment, in use. The member of the projection/receiver rotational alignment arrangement is generally a projection or receiver member that is not itself a seal, i.e. it is a "non-seal member." The assembly can be configured so that there is only one selected rotational alignment possible, although alternatives, i.e. in which there is more than one possible rotational alignment possible, can be used. In an example depicted, the seal member is positioned around the spigot, although alternatives are possible. Also, in an example depicted, the member of the projection/receiver rotational alignment arrangement positioned on the spigot is a projection, and particularly radially outwardly projecting projection (or bump-out), although alternatives are possible.

Referring to FIG. 6, a dimension of maximum extension of the projection or spigot 85 radially outwardly from the central axis X, is indicated generally at $d_1$. For the example shown, this dimension closely correlates dimension $d_2$, a maximum extent of projection radially outwardly from central axis X, of seal member 86. Each (including an outwardly projecting projection or bump-out) is typically smaller than $d_3$, a maximum extent of projection of media 52 radially outwardly from central axis X. Typically, the maximum extension of radial projection of each of the spigot 85 and seal 86 outwardly from axis X is no more than 80% of a maximum extent of radial projection of the media 52 radial outwardly from the central axis X, and usually no more than 60% of this amount. This helps allow the spigot 85 and seal 86 can be configured to be used in a variety of systems, due to their relatively small size by comparisons of the media. Examples of this are described below, in which a end construction analogous to end construction 65 is depicted used with an "in-line" filter assembly.

C. An Alternate In-Tank Assembly, FIGS. 17-19

Figure 17:
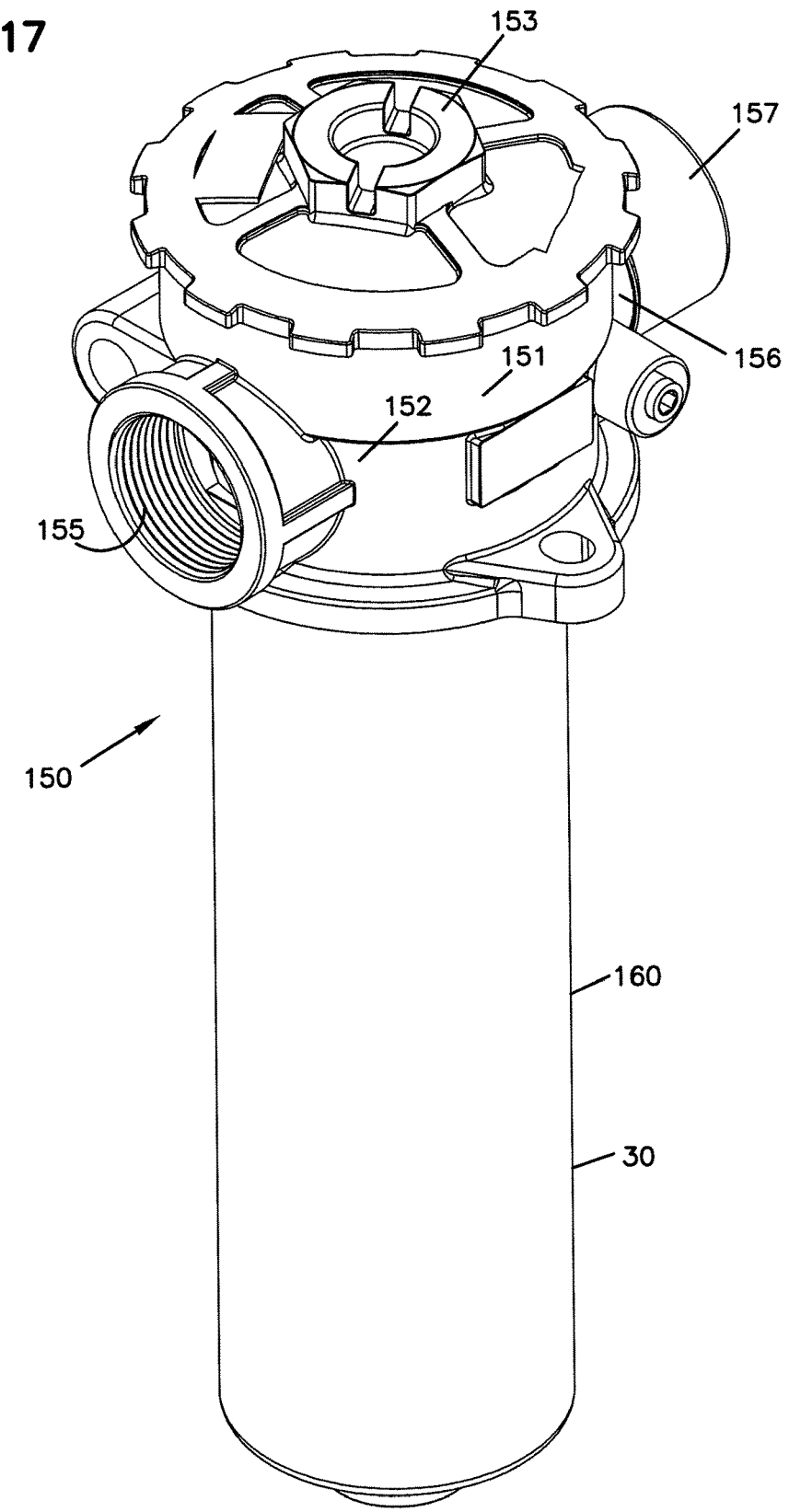
FIG. 17 is a schematic top perspective view of an alternate in-tank filter assembly including features according to the present disclosure.
Figure 18:
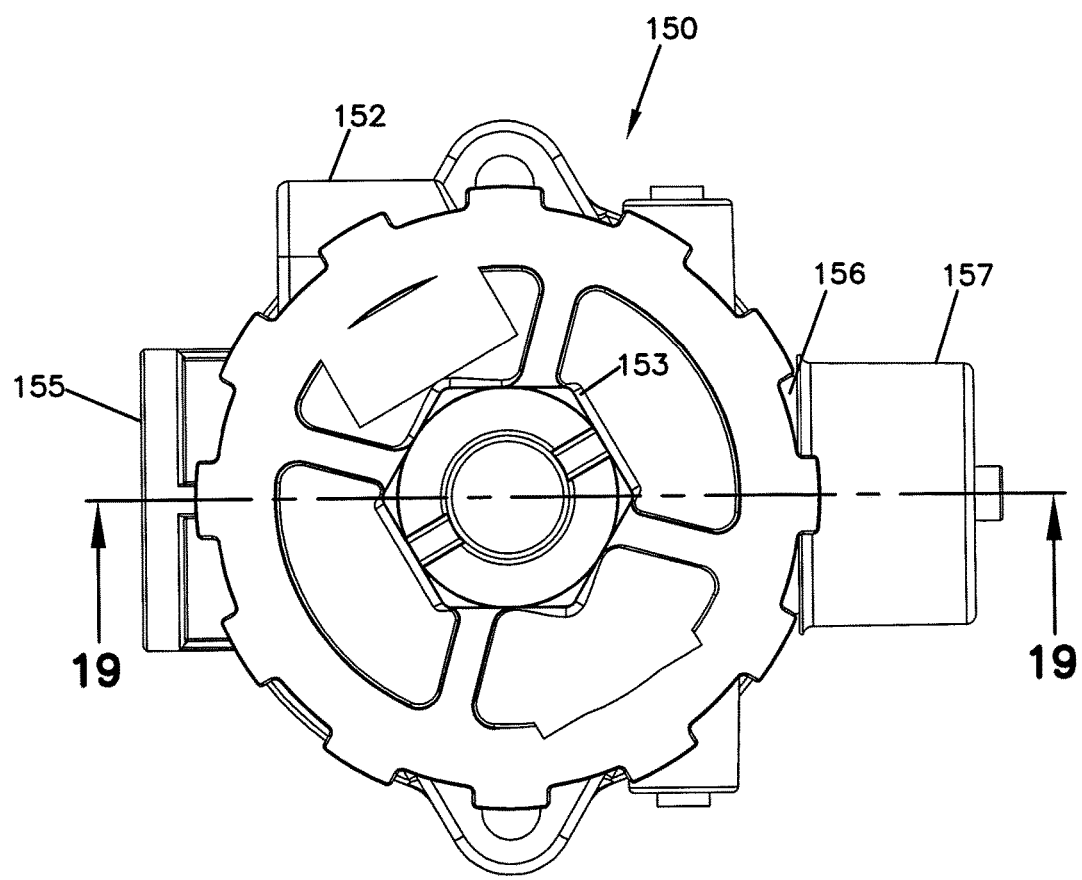
FIG. 18 is a schematic top plan view of the assembly of FIG. 17.
Figure 19:
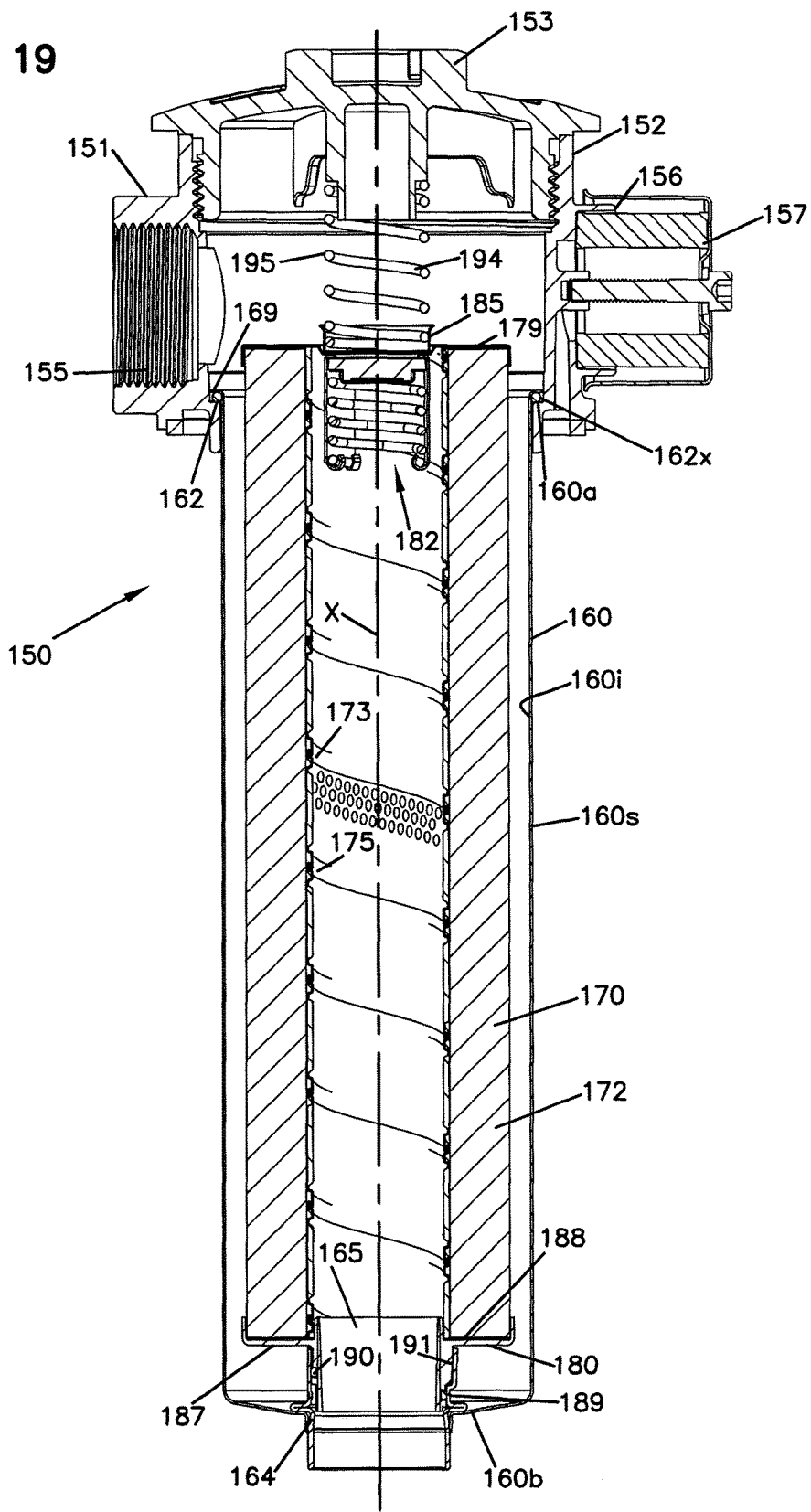
FIG. 19 is a schematic cross-sectional view of the assembly of FIGS. 17 and 18, taken generally along line 19-19, FIG. 18.

It is noted that the features of FIGS. 17-19 are generally as described in U.S. Ser. No. 61/211,586.

In FIGS. 17-19, an alternate in-tank assembly is depicted. Referring to FIG. 17, a schematic top perspective view of an alternate in-tank filter assembly 150 is provided. As with the previous assembly of FIGS. 2-16, assembly 150 includes a filter head assembly 151 comprising a base 152 and an access cover 153. In this example assembly, the access cover 153 is threaded onto the base 152.

Still referring to FIG. 17, the assembly includes a liquid flow inlet 155. A port 156 opposite the liquid flow inlet 155 is shown closed by a cap or cover 157.

In FIG. 18, a top plan view of assembly 150 is depicted, a cross-section line 19-19 being used to define a cross-sectional view of FIG. 19.

Attention is now directed to FIG. 19, a side cross-sectional view of assembly 150. In FIG. 19, housing 160, having a construction generally analogous to housing 30, FIG. 12 is viewable. The housing 160 includes a sidewall 160s defining an interior 160i. At a first end 160a, the housing includes an outwardly directed flange 169 analogous to flange 119, FIG. 12, positioned over seal 162. In the example depicted, the seal 162 is an o-ring seal 162x, although alternatives are possible. The housing 160 includes an end 160b opposite end 160a having an outlet port 164 therein, in which is fit liquid flow collar 165. The collar can be constructed analogous to collar 130, FIG. 12.

It can be seen that except for adjustments for size or similar minor modifications, the housing 160 and collar 165 can be generally analogous to those previously described.

Positioned within assembly 150 is serviceable filter cartridge 170. The filter cartridge 170 is generally analogous to cartridge 50, and includes media 172 surrounding and defining an open filter interior 173. In the specific example, the media 172 is positioned around perforated inner liner 175. The media 172 extends between first and second end constructions 179, 180. End construction 179 comprises a closed end cap having a bypass valve construction 182 therein, configured to allow liquid flow through construction 179 into filter interior 173, bypassing the media 172, should a pressure differential between the upstream side and downstream side of the cartridge 170, when configured for out-to-in flow during filtering, exceed a predetermined amount.

It is noted that end construction 179 also includes collar 185, analogous to collar 75.

End construction 180 includes flange 187 and spigot projection 188. The spigot projection 188 includes an outer surface 189 with a seal arrangement 190 thereon. The example seal arrangement depicted is an o-ring seal 191, although alternatives are possible.

In general terms, the cartridge 170 can be analogous to the cartridge 50 previously described, including with respect to specific sub-features of end constructions 179, 180. Of course sizes can be varied, depending on the particular application of use.

It is noted that the same variations discussed with respect to filter cartridge 50, i.e. absence of a bypass valve arrangement, absence of a collar 185, and/or presence of biasing member (for example a spring) secured to the end construction 179 can be used.

Still referring to FIG. 19, attention is directed to biasing member 194 positioned in extension between access cover 153 and end construction 179. Biasing member 194, in the example depicted, comprises spring 195, although alternatives are possible. Biasing member 194, again, helps ensure that the cartridge 170 remains in place during use, and also provides for a check to ensure that the cartridge 170 is properly lowered into a sealing engagement with collar 165, when installed.

Thus, in general terms, assembly 150 is analogous assembly 25, the primary differences relating to specific configuration of the head 151, and the manner in which the access cover 153 is secured on the base 152. Also the depictions of assembly 150, FIGS. 17-19, show how certain principles according to the present disclosure can be applied by retrofitting previously existing equipment. In particular, filter head assembly 151 can be a filter assembly originally designed and manufactured for use with a different type of in-tank filter assembly, in which aperture 155 is an inlet and port 156 is an outlet. The assembly is retro-fit for use with a cartridge in accord with the present disclosure, by a capping port 156 with cap 157, and then installing the internal features defined.

II. Example In-Line Liquid Filter Assemblies Including Features According to the Present Disclosure Herein, the term "in-line" when used in reference to a filter assembly, is meant to indicate a type of filter assembly, (in contrast to an "in-tank filter assembly") in which the filter assembly is positioned in one or more liquid flow lines. Thus, the filter head receives liquid to be filtered from a liquid flow line, directs liquid to be filtered through the filter assembly, receives the filtered liquid from liquid filter assembly, and then directs filtered liquid back into the liquid flow line. In contrast to "in-tank" filter assemblies, here the liquid filter assembly is not typically mounted to with a housing projecting into a reservoir configured to pass liquid directly into, or from, the liquid reservoir.

A. A First Example Assembly, FIGS. 20-28

It is noted that the features of FIGS. 20-28 are generally as described in U.S. Ser. No. 61/211,586.

Figure 20:
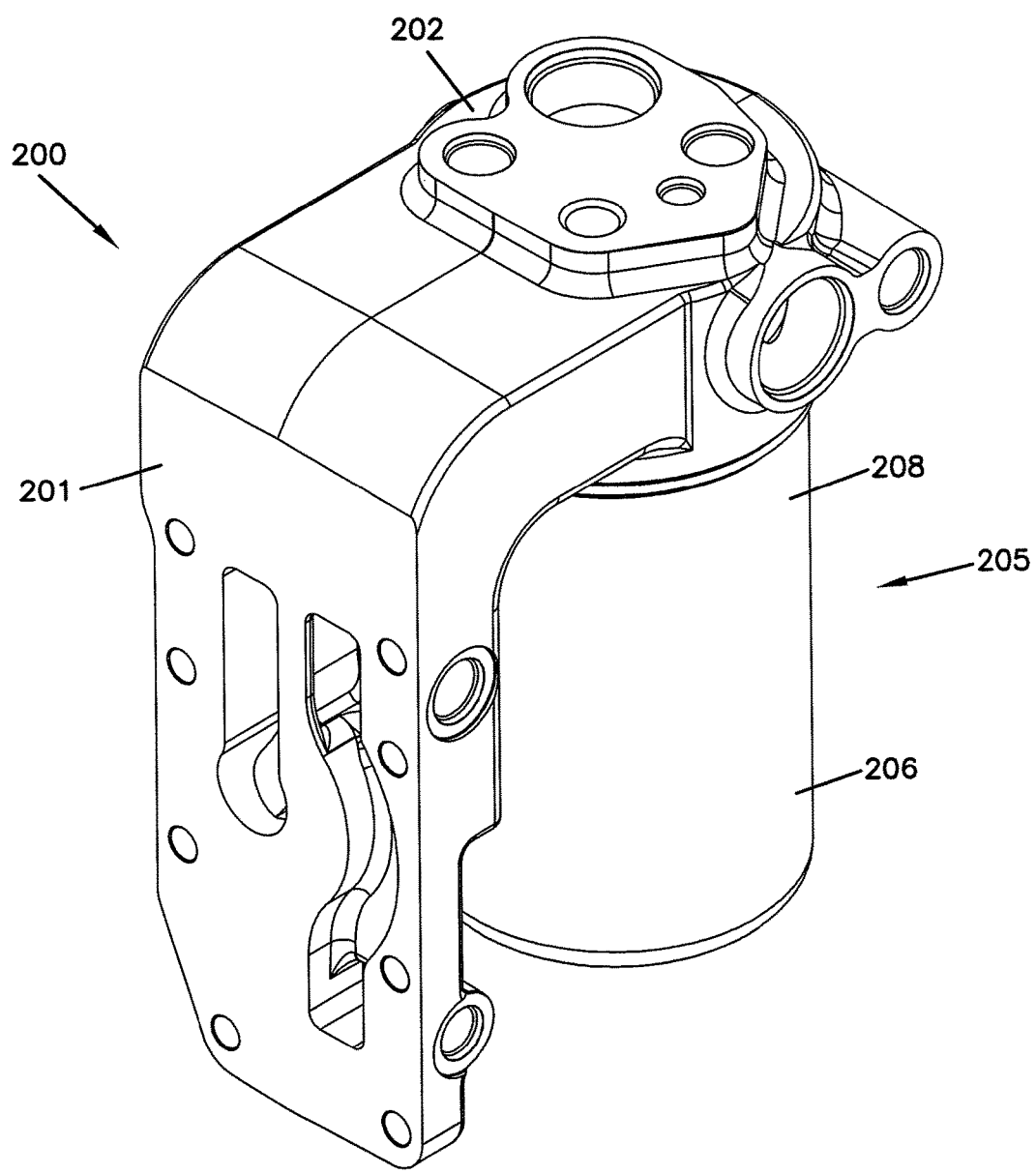
FIG. 20 is a schematic, top perspective, view of a liquid filter assembly according to a third embodiment of the present disclosure, mounted on a manifold assembly for use in-line.

Attention is first directed to FIG. 20, a top perspective view depicting an in-line filter assembly 200 comprising a manifold 201 with a filter head 202 thereon. Removably secured to the filter head 202, in an operable orientation, is provided a filter assembly 205. The filter assembly 205 depicted comprises a bowl/cartridge assembly 206. The bowl/cartridge assembly 206 generally comprises an outer housing or bowl 208, and an interiorly received filter cartridge 210 not viewable in FIG. 20; see FIGS. 21 and 22 below.

It is noted that the assembly 205 can be configured so that the cartridge 210 can not be removed from the housing or bowl 208. However, in typical applications, the principles herein will be practiced with bowl/cartridge assemblies, wherein the cartridge 210 is configured as a replacement part, to be removed from the housing or bowl 208 for servicing.

In general terms, the filter assembly 205 is mounted on the filter head 202, to receive liquid to be filtered directed from the filter head 202 into the assembly 205, and to direct filtered liquid back into the filter head 202, to be directed through the liquid system involved. It is noted that the manifold 201 and filter head 202 can be configured with a variety of inlet port arrangements and outlet port arrangements.

Figure 21:
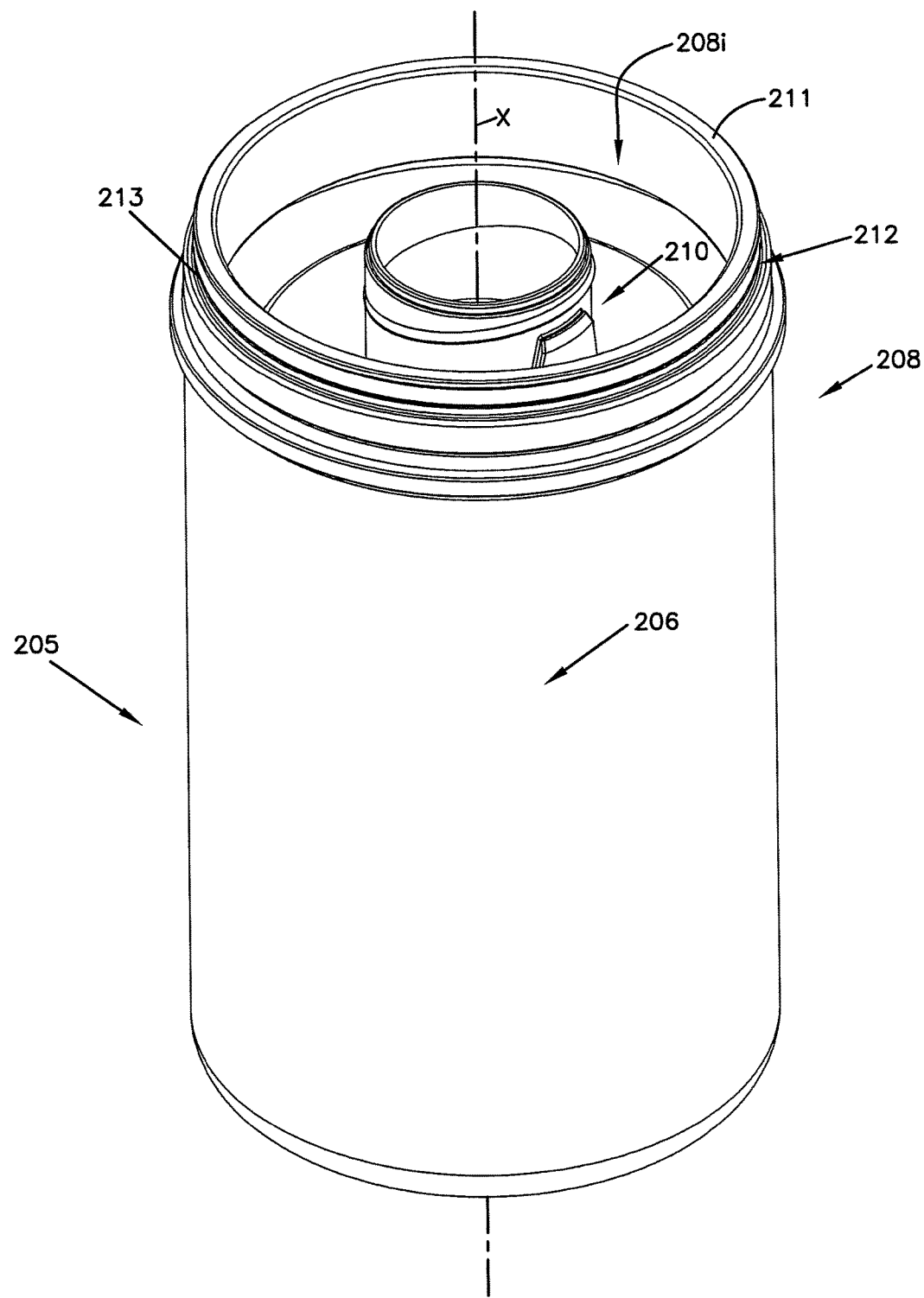
FIG. 21 is a schematic top perspective view of the in-line liquid filter assembly of FIG. 20, removed from the manifold.

Attention is now directed to FIG. 21, in which filter assembly 205 is depicted separated from filter head 202. It can be seen, referring to FIG. 21, that assembly 205 is indeed a bowl/cartridge arrangement 206 comprising the outer housing 208 and an internally received, removable and replaceable, service cartridge 210. It is noted that housing 208 is provided with a first end 211 which includes an engagement mechanism 212 for mounting on the filter head 202. In the example depicted, the engagement mechanism 212 comprises a threaded arrangement 213. For the particular assembly 205 depicted, the threaded arrangement 213 comprises outer threads, although in some alternatives, housing 208 can be configured with inner threads. In some arrangements, the first end 211 will be provided with a seal member such as an o-ring, for example, although alternatives are possible, to provide for sealing engagement when mounted on the filter head 202.

Figure 22:
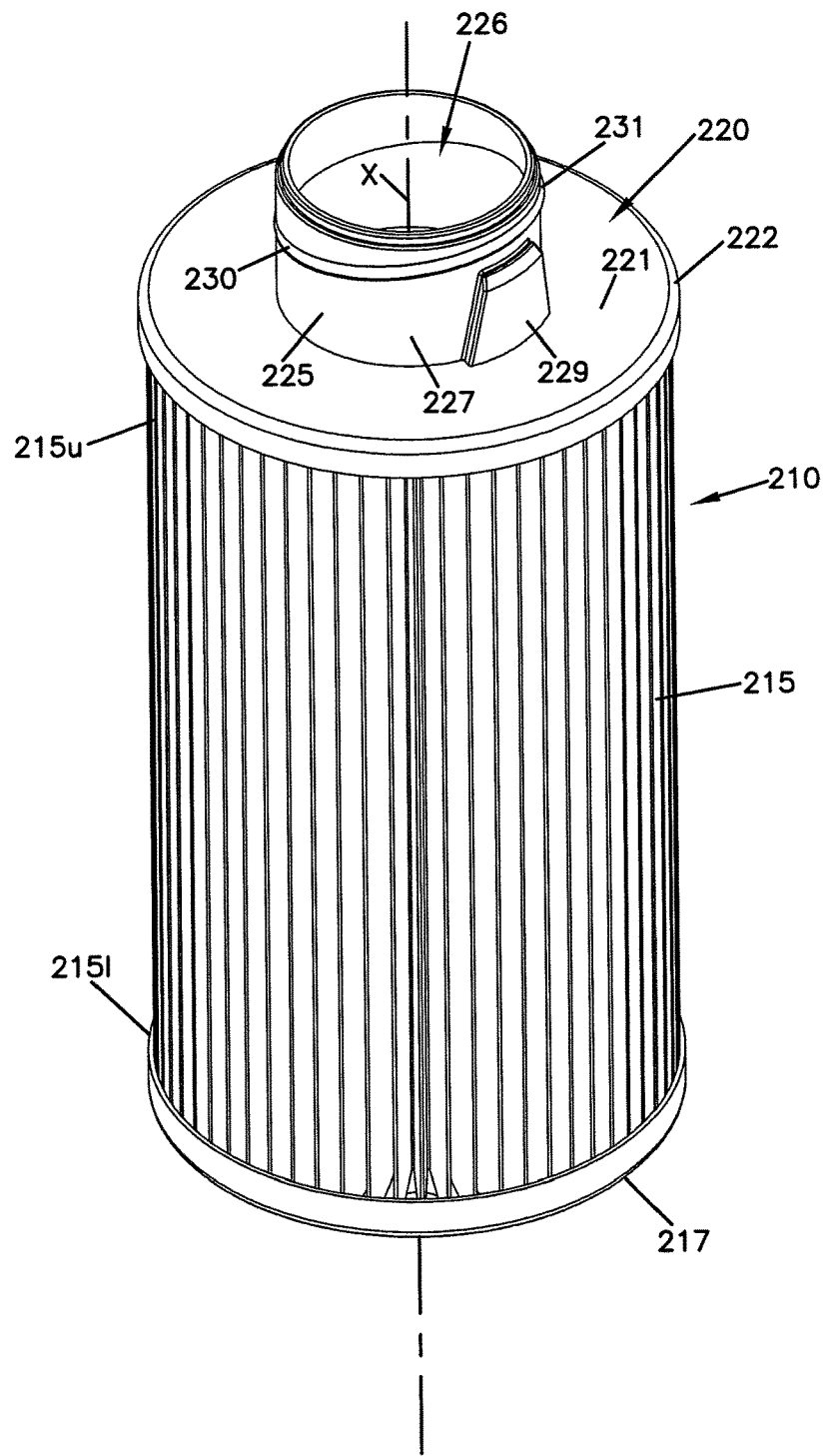
FIG. 22 is a schematic, top perspective, view of a filter cartridge component of the filter assembly of FIG. 21, shown removed from a housing.

The particular filter assembly 205, again, is configured as a bowl/cartridge assembly 206 with cartridge 210 removable and replaceable within interior 208i of bowl 208, during servicing. In FIG. 22, cartridge 210 is shown removed from bowl 208.

Figure 25:
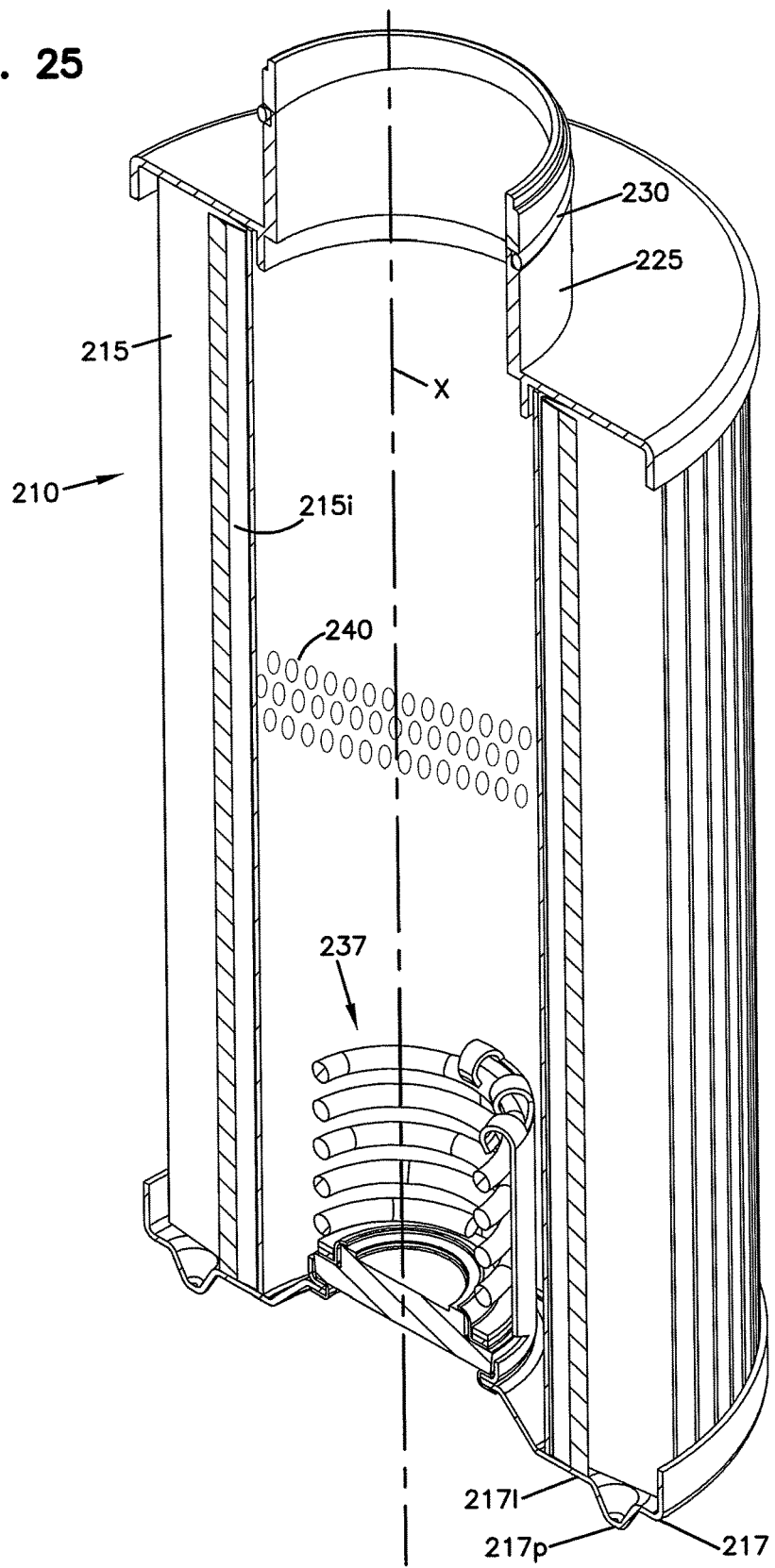
FIG. 25 is a schematic top perspective cross-sectional view of the filter cartridge component of FIGS. 22 and 24, taken generally along line 25-25, FIG. 24.

Referring to FIG. 22, cartridge 210 comprises a media pack including filter media 215 surrounding and defining an open filter interior 215i, not viewable in FIG. 22, see FIG. 25.

Still referring to FIG. 22, media 215 extends between opposite ends 215u, 215l. At end 215l is provided an end construction 217. The end construction 217 is generally a closed end cover, and can optionally be provided with a bypass valve arrangement thereon, analogous to bypass valve arrangements 67, FIG. 6. This will be understood from further discussions below, related to FIG. 25.

Provided at opposite end 215u of the media 215 from end construction 217, is open end construction 220. The end construction 220 can, for example, be generally analogous to end construction 65 of FIG. 6. Referring to FIG. 22, end construction 220 comprises flange 221, outer rim 222 and central projection 225. Projection 225 comprises a projection or spigot defining a flow aperture 226 therethrough, allowing flow communication with interior 215i. Outer surface 227 of projection or spigot 225 includes (bump-out) radially outwardly projecting projection 229 generally analogous to (bump-out) radially outwardly projecting projection 141, FIG. 14. Positioned around outer surface 227 is a seal member 230 configured and positioned to form a seal with a portion of the filter head 202, when installed. The particular seal member 230 depicted, is an o-ring 231, although alternatives are possible as discussed above.

Still referring to FIG. 22, it can be seen that seal member 230 defines a seal pattern extending at an angle non-orthogonal to the central axis X passing through the cartridge 210. The acute angle of the plane of seal member 230 relative to the plane orthogonal to a central axis 233, is typically at least 5° usually at least 7°, and typically not more than 40° and usually not more than 30°, although alternatives are possible.

In general terms, the end construction 220 can be analogous to end cover 65, FIG. 6 and if the sizes and proportions are appropriate for the instance of use intended, an identical end construction to can be used for end construction 220.

Figure 23:
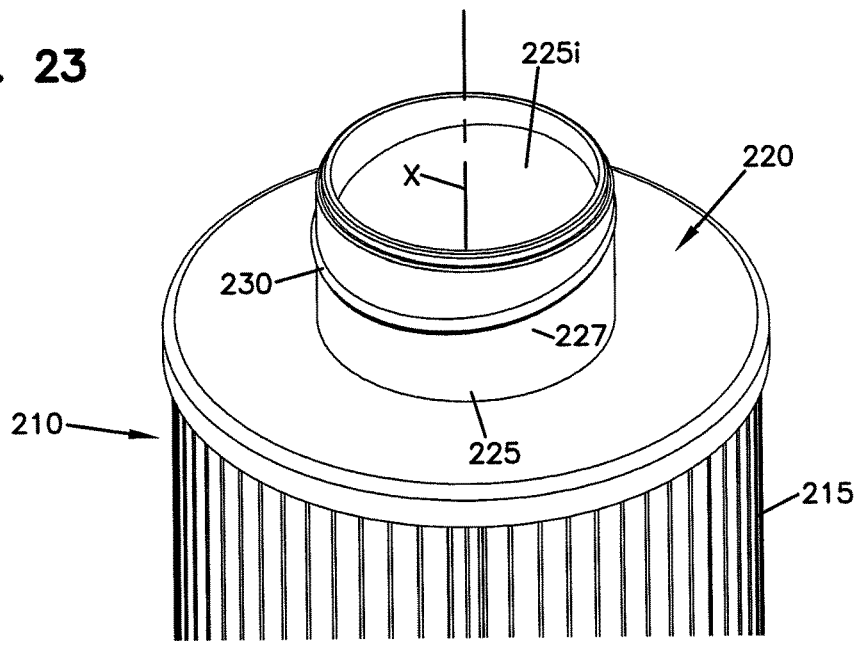
FIG. 23 is a fragmentary schematic perspective view of the filter cartridge component of FIG. 22, rotated counter-clockwise around a central axis approximately one-quarter turn.

In FIG. 23, a fragmentary perspective view of a portion of FIG. 22 is depicted. Here the cartridge 210 has been rotated somewhat relative to the view of FIG. 22, leaving the bump-out 229 out of view. It is noted that along interior 225i of spigot or projection 225, no concave or bump-out portion is viewable. This is an indication that example end cover 220 depicted is a molded part, from plastic. The end cover 220 could be made from pressing metal, in which case there may be a bump-out recess along a portion of interior surface 225i corresponding to (bump-out) projection 229.

Figure 24:
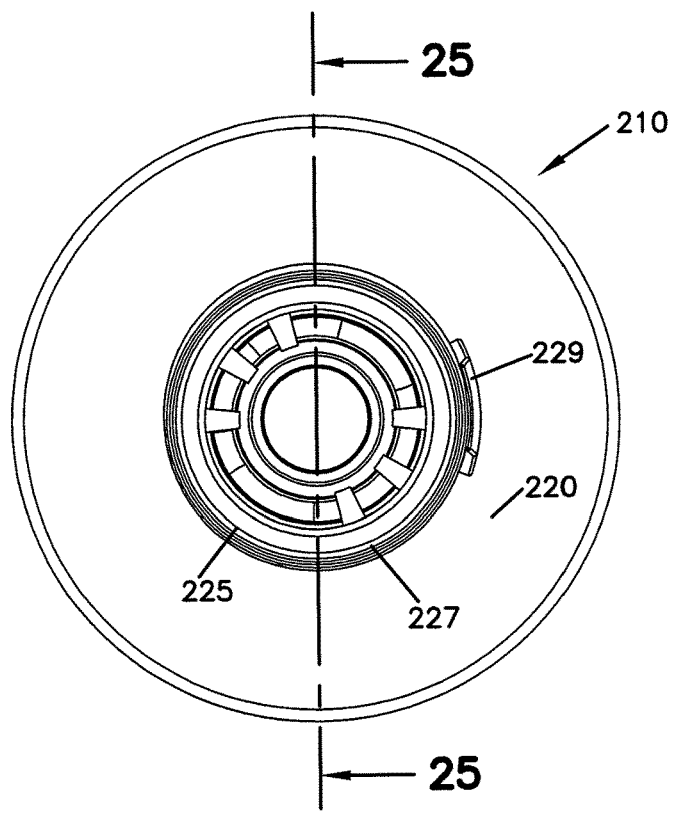
FIG. 24 is a schematic top plan view of the filter cartridge component of FIG. 22.

In FIG. 24, a top plan view of cartridge 210 is depicted. It is noted that line 25-25 provides a definition for the cross-sectional view depicted schematically in FIG. 25.

Referring to FIG. 25, it can be seen that the cartridge 210 includes an optional bypass valve assembly 237 generally analogous to bypass valve assembly 67, discussed above.

Also referring to FIG. 25, internal perforated core 240, around which the media 215 is positioned is viewable.

It can be seen that cartridge 210 has features generally analogous to cartridges 50 and 150 discussed above, except for the absence of certain flanges or collars. Also, for the example depicted, the cartridge 210 is used with spigot or projection 225 projected upwardly, rather than downwardly as for the examples of cartridges 50 and 150. It is noted that vertical orientation is a matter of convenience for the particular manifold and filter head system involved. With a bowl/cartridge assembly 206, typically the open end of the bowl 208 will be directed upwardly, so that as the bowl 208 is removed, the cartridge 210 does not fall out and oil does not leak.

To facilitate operation of the bypass valve assembly 237, end construction 217 includes a lower surface 217l with projection arrangement 217p thereon, to support a remainder of the end construction 217 above a bottom of housing or bowl 208. It is noted that a biasing member such as a spring can be positioned between end construction 217 and a bottom of the housing or bowl 208.

Figure 27:
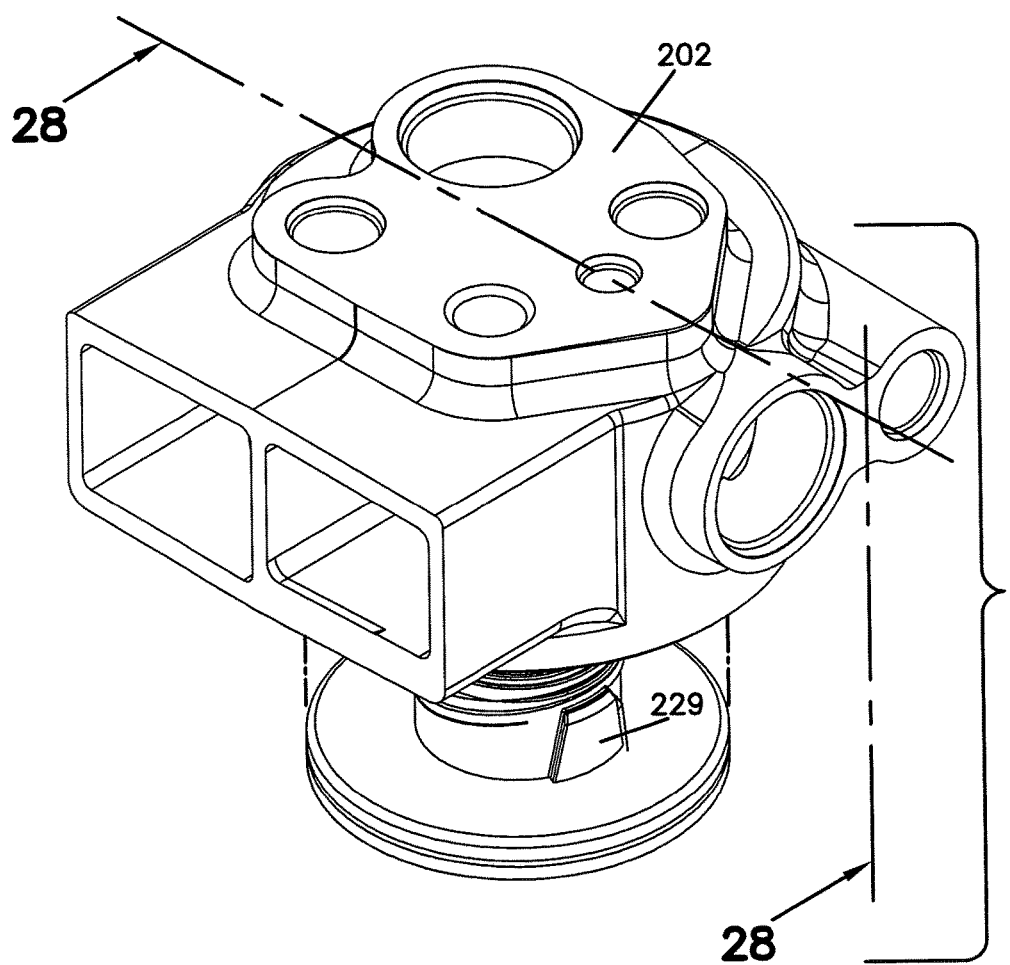
FIG. 27 is a schematic, top, exploded, perspective view of the componentry of FIG. 26.
Figure 28:
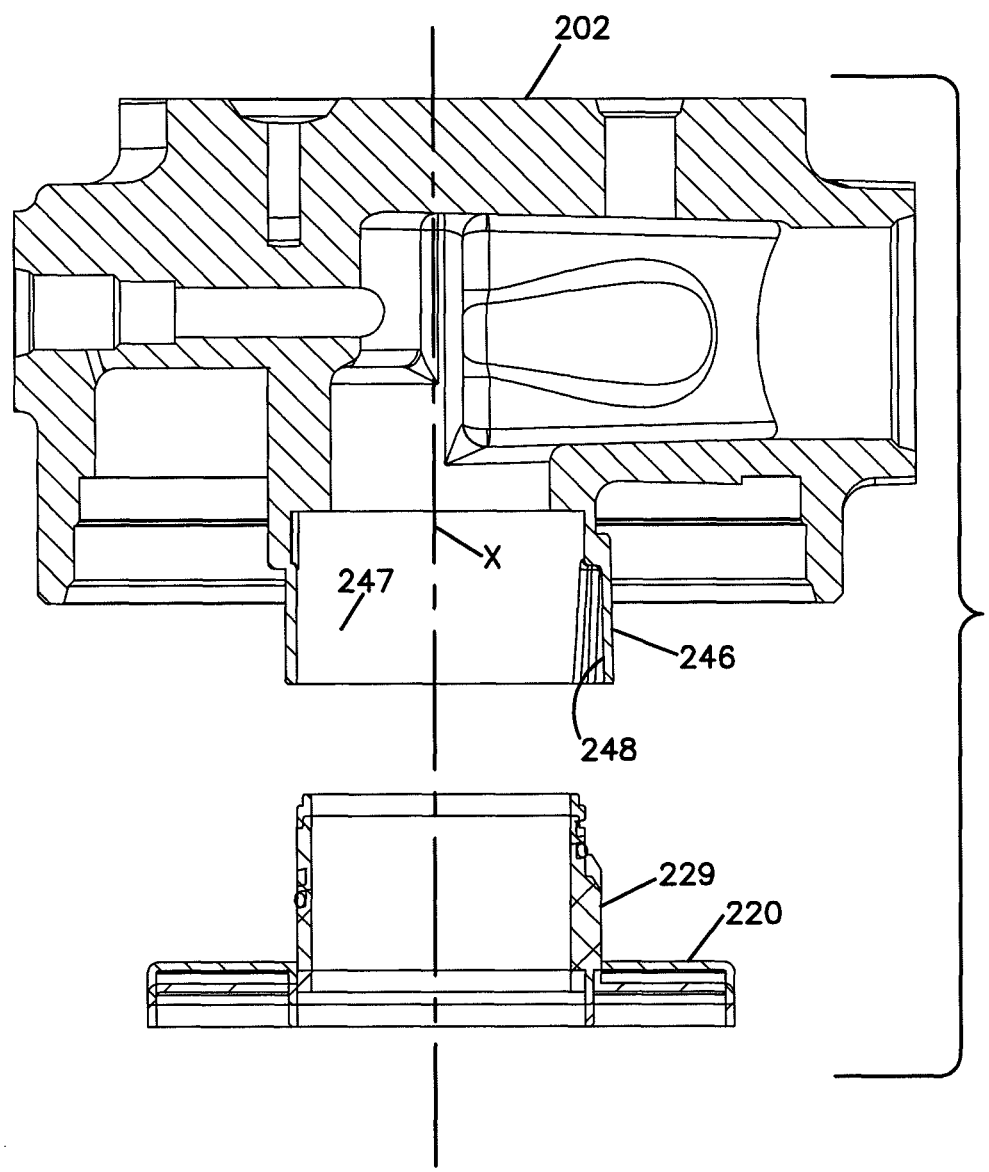
FIG. 28 is a schematic exploded cross-sectional view of the componentry of FIGS. 26 and 27.

For the assembly of FIGS. 20-22, the interaction between the cartridge 210 and the filter head 202 can be configured to be analogous to that between the cartridges and the collars for previously described assemblies, to accomplish generally analogous results. This is depicted in FIGS. 26-28.

Figure 26:
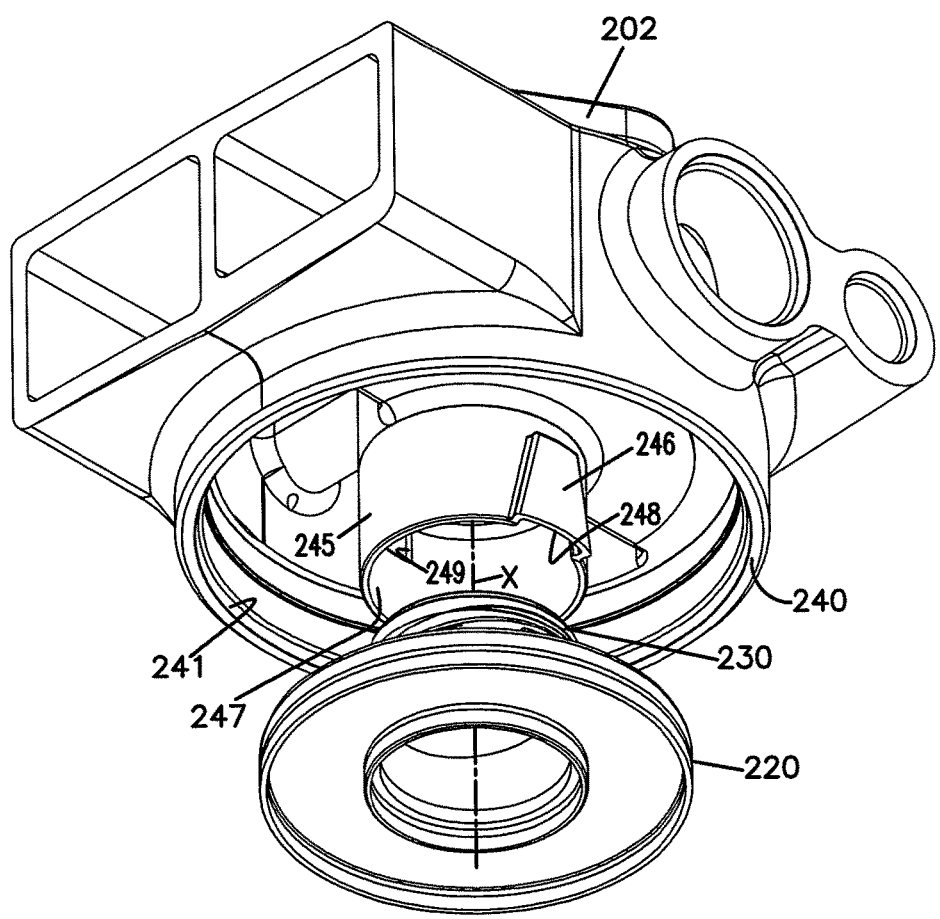
FIG. 26 is a schematic exploded bottom perspective view depicting alignment for engagement between a filter cartridge component and a filter head component, of the in-line liquid filter assembly of FIG. 20.

Referring first to FIG. 26, filter head 202 is depicted having mounting ring 240 by which bowl or housing 208 is mounted to the filter head 202. The example ring 240 includes inwardly directed threads 241. As previously described, alternate mounting arrangements can be used, for example the housing or bowl 208 can be provided with inwardly directed threads, and the ring 240 with outwardly directed threads.

In FIG. 26, a bottom perspective view of head 202 is provided, and end cover 220 is depicted in exploded view showing how alignment occurs. Referring to FIG. 26, filter head 202 includes central collar 245 including a (bump-out) radially outwardly projecting projection 246. This provides a collar interior surface 247, with a (bump-out) receiver recess 248 therein. The bump-out recess 248 is configured to receive bump-out or interference projection 229, to allow spigot or projection 225 to be pushed fully upwardly into interior 247, during engagement. Analogously to previously described arrangements, proper engagement can only occur when the cartridge 210 is in the proper rotational orientation, otherwise interference between projection 229 and collar 247 will occur.

Interior surface 247 of collar 245 is generally configured to provide a sealing surface for seal member 246. Preferably collar 247 is configured so that such a seal engagement is only secure, when the seal member 230 is rotationally oriented properly, due to its slanted (seal pattern non-orthogonal to axis X) shape. In the example head 202 depicted, recess 249 is depicted at a location which will interfere with proper sealing, unless the cartridge 210 in particular the seal member 230, is properly configured and orientated.

Thus, for the particular example collar 245 depicted, when the cartridge 210 is installed, seal member 230 passes over bump-out 246 and under slot 249.

In FIG. 27, a top perspective view of componentry analogous to FIG. 26 is depicted. Thus, filter head 202 and end construction 220 are depicted.

In FIG. 28, a cross-sectional view of the componentry depicted in FIGS. 26 and 27 is provided. Here, again, filter head 202 and end construction 220 are viewable aligned for proper engagement.

B. General Principles

In general terms, then, the features described above for the assembly of FIGS. 20-28, depict how the principles described herein above with respect to an in-tank assembly, can be used with an alternate in-line assembly, to accomplish advantages. That is, it will be difficult to properly assemble the bowl/cartridge onto the filter head, unless the cartridge is of a proper type, and unless the cartridge is appropriately rotationally oriented. This helps provide an assurance that the cartridge is a proper one for the system of use, and is properly oriented for appropriate sealing. Further, the use of the slanted seal provides advantage with respect to ease of initiating installation.

In general terms, a liquid filter cartridge is provided usable for installation, in use, to provide a removable seal engagement with a liquid flow collar of a liquid filter assembly. The liquid filter cartridge includes filter media surrounding an open filter interior. The filter media has first and second, opposite, ends and defines a central axis. The assembly includes a first, closed, end construction at a first end of the filter media. This closed end construction can include optional bypass valve assembly therein, if desired.

A second end construction is positioned on the second end of the media. The second end construction is open, includes a central spigot projecting away from the media and surrounding and defining a central liquid flow aperture in liquid flow communication with the open filter interior. A seal member is positioned on the spigot to define a seal pattern non-orthogonal to the central axis of the media. A member of a projection/receiver rotational alignment arrangement is positioned on the second end construction at a location to engage another member of the projection/receiver rotational alignment arrangement on a liquid flow collar, in selected rational alignment, in use. Typically, the member of the projection/receiver rotational alignment arrangement positioned on the second end construction is a non-seal member; i.e. projection or receiver member that does not comprise a portion of the seal.

As with assemblies previously described, the seal member and the spigot (including a bump-out or projection) define a maximum extent of projection radially outwardly from the central axis that is no more than the media, typically no more than 80% of the maximum extension of the media and usually no more than 60% of a maximum distance of an extension of the media from the central axis. This means that the spigot and seal are relatively small, and can be used with filter head assemblies that include many conventional prior art features.

It is noted that the bowl can be mounted on the filter head without a cartridge in place. Assemblies have been developed to provide for inhibition of this, and some of these principles can be applied to the systems described herein.

It is noted that the techniques described can also be applied when the cartridge is not removable from the bowl. However with such an assembly it will be important to ensure that the cartridge can rotate relative to the bowl, so that once the cartridge is positioned in proper engagement with the liquid flow collar, the bowl can continue to rotate during installation or removal.

III. Example Variations in Spigot and Collar Configuration

It is noted that FIGS. 29-33 are generally as described in U.S. Ser. No. 61/211,586.

In FIGS. 29-33, some variations in collar/spigot configuration for engagement are depicted. In the example embodiments of FIGS. 29-33, these variations are depicted in componentry for a filter head and a bowl/cartridge assembly generally analogous to the assembly of FIGS. 20-28, described above. However it is noted that the same types of variations can be applied in a spigot/collar for an in-tank assembly, such as those described in FIGS. 2-19.

A. A First Variation, FIGS. 29-30

Figure 29:
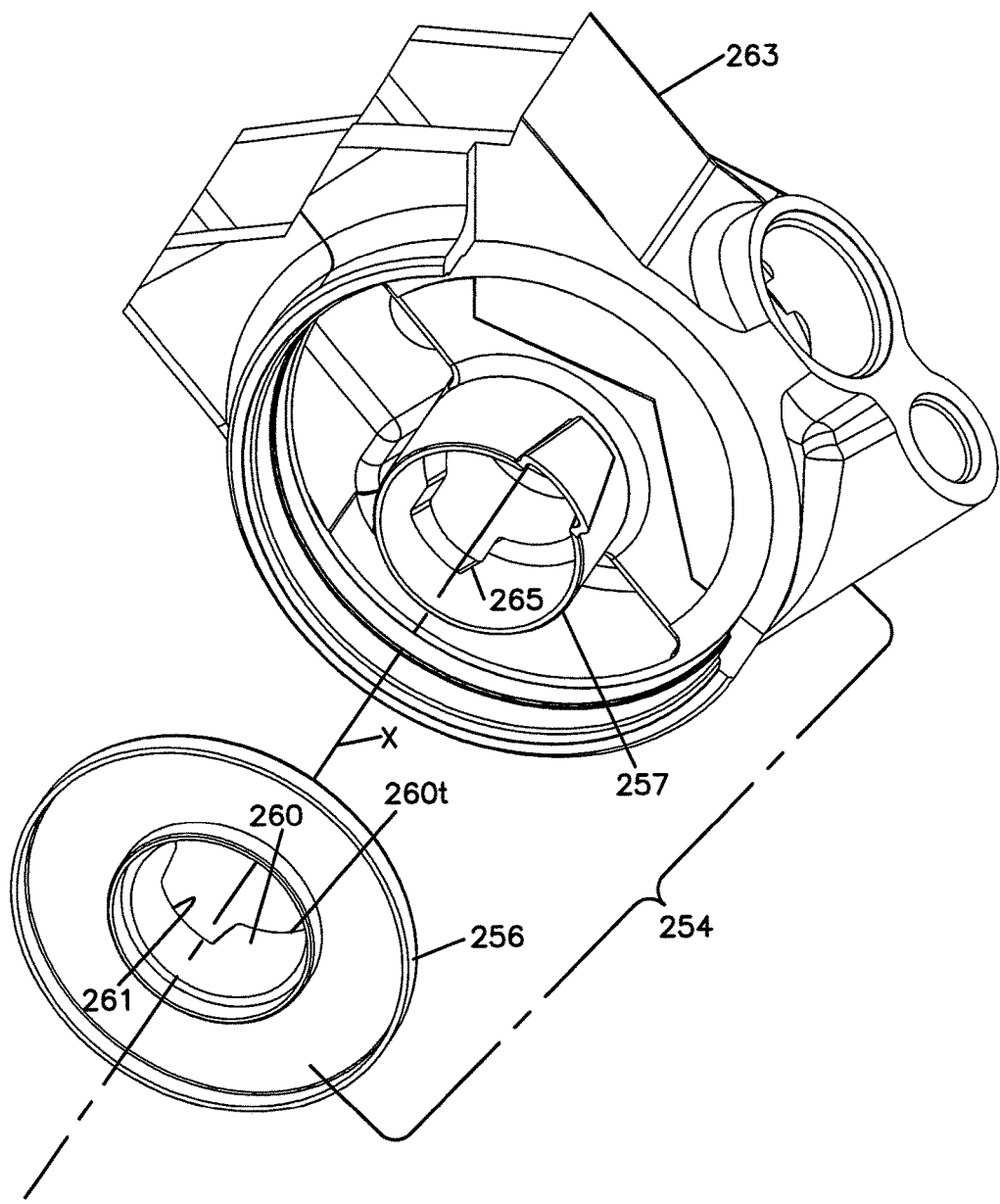
FIG. 29 is a schematic, bottom, exploded, perspective view of an alternate embodiment to the depictions of FIGS. 26-28.

Referring to FIG. 29, an exploded bottom perspective view of components of a filter arrangement 254 is provided. The components depicted include an end construction 256 and a collar 257. The end construction 256 can be used in place of end constructions 65 and 220, in FIGS. 4 and 22 respectively; and, the collar portion 257 depicted can be used in place of portions of collars 130 and 245, FIGS. 11 and 26.

For the particular filter arrangement 254 depicted, the collar portion 257 is mounted on part of a filter head 263. However, the collar portion 257 depicted, could be used as part of a collar in a housing of an in-tank filter assembly, such as those depicted in FIGS. 2-19.

Referring to FIG. 29, attention is directed to projection or spigot 260 on end construction 257. The spigot 260 includes a notch or recess 261 therein, directed axially toward the media (not viewed) from outer tip 260 of spigot 260. It is noted that the spigot 260 could also include a (bump-out) radially outwardly projecting projection, for example analogous to (bump-out) projection 246 discussed above.

Still referring to FIG. 29, collar section 257 includes a radially inwardly extending projection 265 sized and shaped to be received within notch 261, when spigot 260 is positioned inside of collar section 257. This provides for rotational securement and alignment of the cover construction 250, and thus the resulting cartridge, with collar 257. Preferably, the notch 261 and projection 265 are sized and shaped so that once slightably engaged, the cartridge cannot rotate substantially relative to the filter head.

Figure 30:
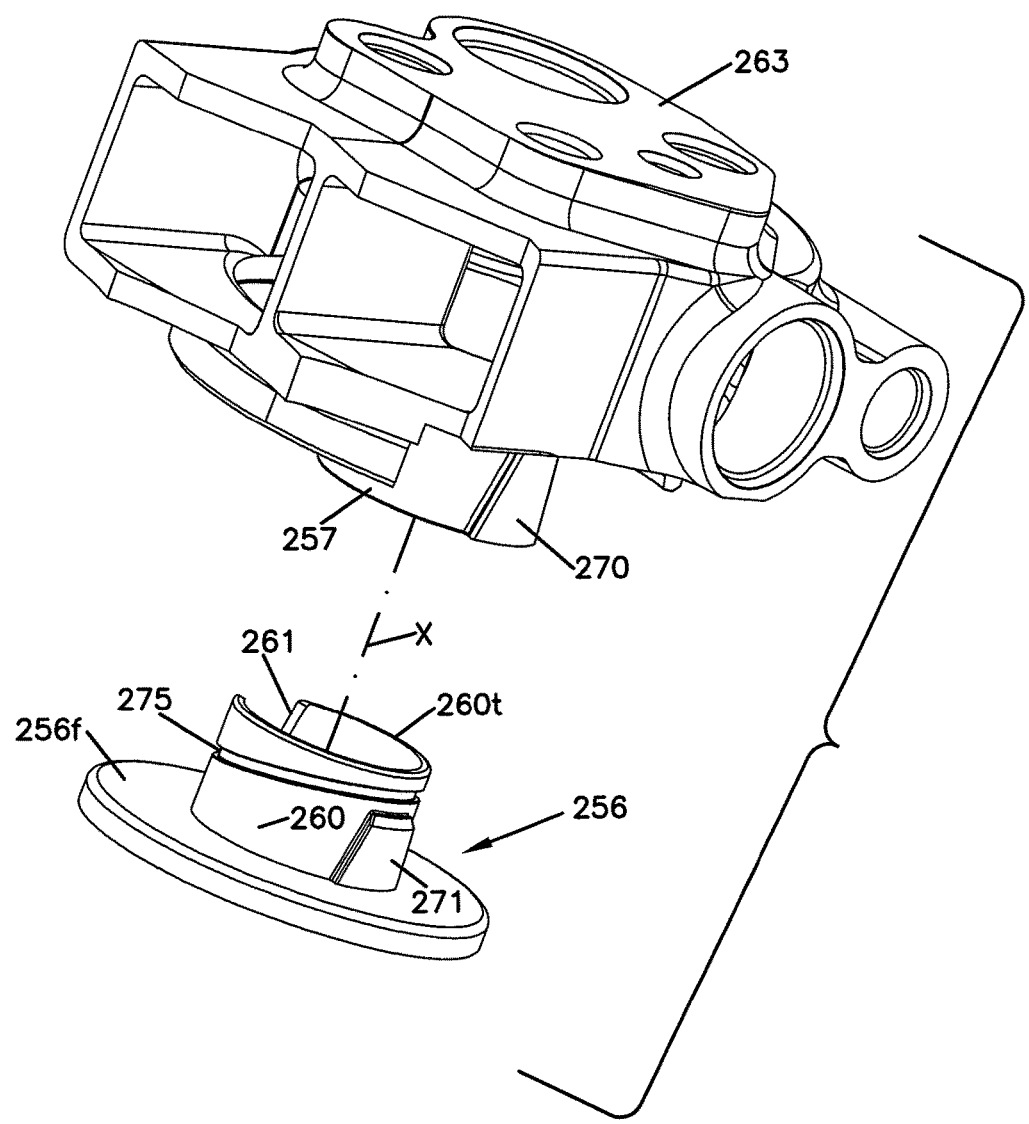
FIG. 30 is a schematic, top perspective, view of the componentry depicted in FIG. 29.

In FIG. 30, a top perspective view of the componentry described is discussed. Here (bump-out) recess 270 on collar section 257 is viewable, oriented to receive (bump-out) radially outwardly projecting projection 271 on spigot or projection 260. Also notch or recess 261 can be seen in spigot or projection 260. Also viewable is seal mount 275 extending around spigot 260. In typical use seal mount 275 would have a seal mounted thereon, for example an o-ring seal. It can be seen that the seal will pass over (bump-out) projection 271 (i.e. projection 271 and tip 260t) and under notch 261 (i.e. between notch 261 and media). Alternately stated, the seal within seal mount 275 will pass between (bump-out) projection 271 and tip 260t; and, will also pass between notch 261 and end flange portion 256f of end construction 256.

In general terms, the variations described in FIGS. 29 and 30 depict how instead of, or in addition to, a (bump-out) radially outwardly projecting projection, a notch can be used in a projection or spigot to accomplish desirable rotational alignment. It further depicts how both the bump-out and the notch can be used together.

B. Further Alternate Variations, FIG. 31-33

In each of the previously described embodiments, rotational alignment between the appropriate end cover on the cartridge, and the appropriate liquid flow collar on either of the housing (for the in-tank variation) or the filter head (for the bowl/cartridge variations) is managed with features on a spigot engaging features on an interior of the liquid flow collar. It is noted that additional or alternate interference arrangements can be used, to accomplish the desired rotational orientation. An example of this is depicted in FIGS. 31-33.

Figure 31:
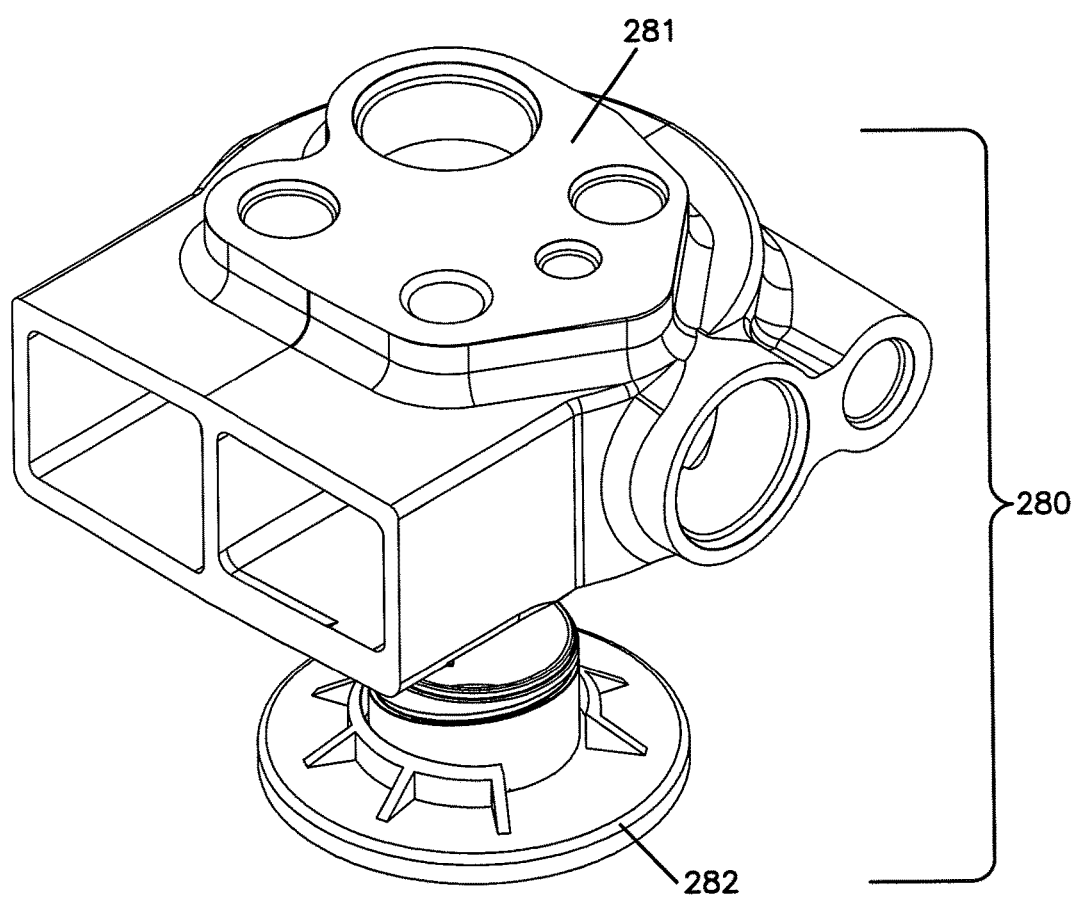
FIG. 31 is a schematic, exploded, top perspective view of a second alternate componentry, to the componentry depicted in FIGS. 26-28.
Figure 32:
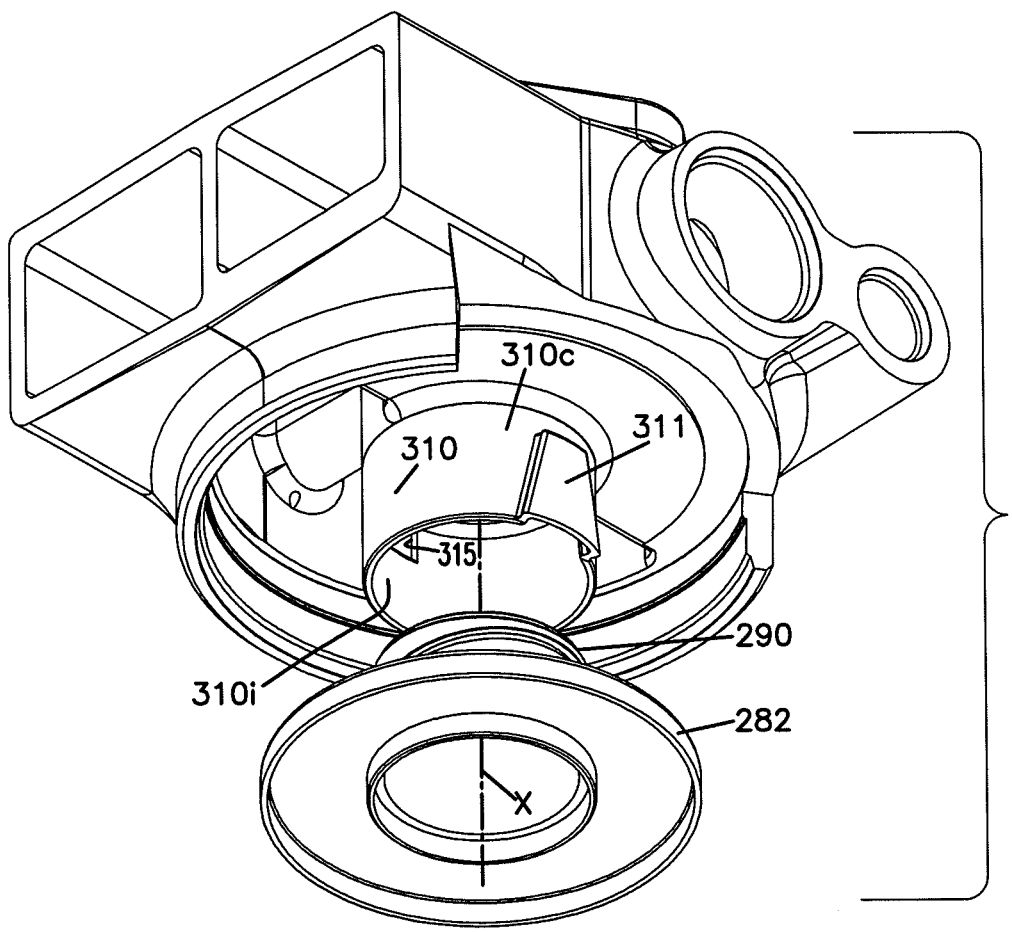
FIG. 32 is a schematic exploded bottom perspective view of the componentry of FIG. 31.

Attention is first directed to FIG. 31. Here a top perspective view of selected componentry of a filter assembly 280 is provided. The componentry depicted is a filter head 281 and an end construction 282 of a filter cartridge. It will be understood that other features may be generally analogous to those described with respect to previously described embodiments of FIGS. 20-30. It will also be understood that the principles can also be applied when the end construction 282 is configured to engage a liquid flow collar of an in-tank assembly in accord with FIGS. 2-19.

Figure 33:
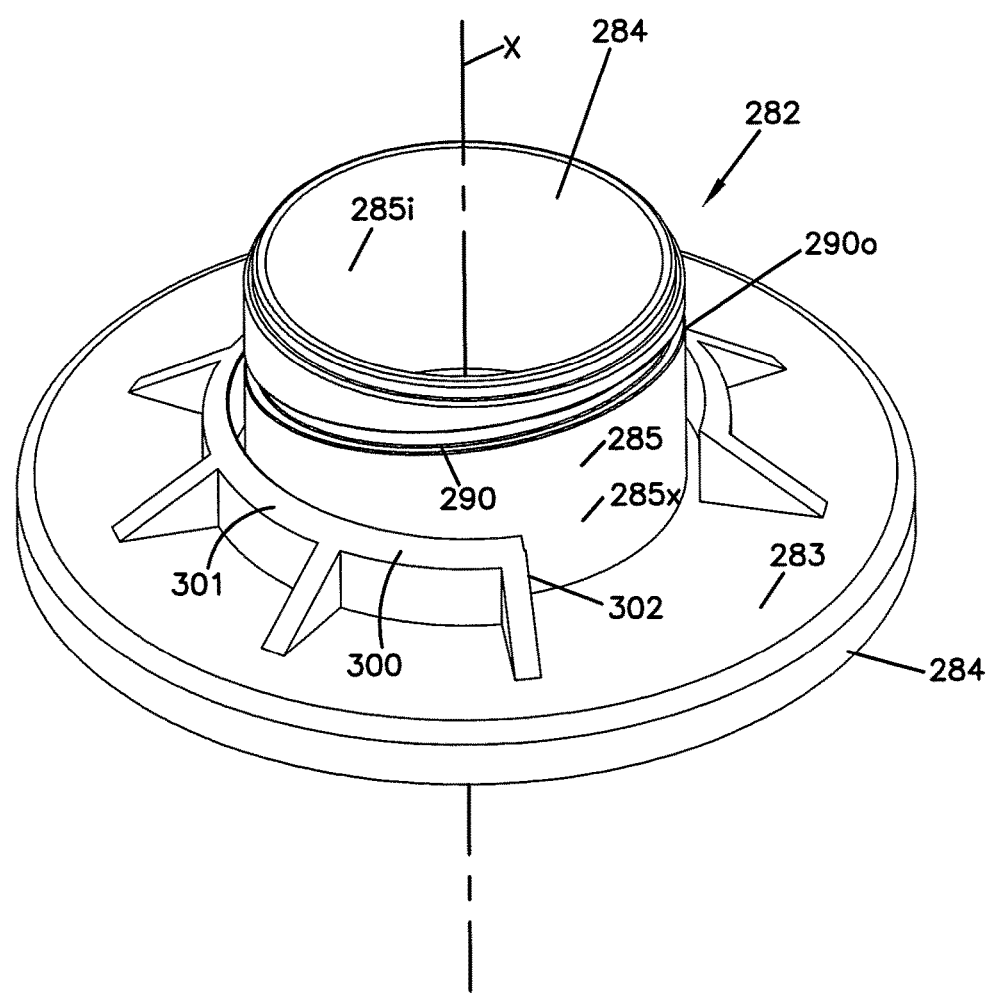
FIG. 33 is a schematic top perspective view of an end construction of the embodiment depicted in FIGS. 31 and 32.

In FIG. 33, end construction 282 is depicted in top perspective view for more ready inspection. Referring to FIG. 23, end construction 282 includes a flange 283, outer rim 284 and central projection or spigot 285. The central projection or spigot 285 defines a flow aperture arrangement 288 therethrough, for liquid flow. The projection or spigot 285 includes an interior surface 285i and an exterior surface 285x with a seal arrangement 290 thereon.

The particular seal arrangement 290 depicted, is oriented and angled slanted (non-orthogonal) relative to a plane orthogonal to a central axis X through end construction 282 and the resulting cartridge. In this manner the seal arrangement 290 is generally analogous to those previously discussed. The seal arrangement 290 can comprise an o-ring 290o, although alternatives are possible.

Still referring to FIG. 33, the end construction 282 includes an interference projection member 300. In this instance, the projection member 300 does not comprise a bump-out on outer surface 285o. Rather, it comprises a portion of a collar 301 having a receiver gap 302 therein at a location oriented to receive a (bump-out) radially outwardly projecting projection on a liquid flow collar therein, when end construction 282, and the resulting filter cartridge, is appropriately radially aligned relative to the liquid flow collar. The particular gap 302 depicted is oriented for engagement with an outside of a bump-out analogous to the bump-out 135, FIG. 14. With respect to this, attention is directed to FIG. 32.

Referring to FIG. 32, on outer portion 310 of liquid flow collar 310c is depicted with bump-out 311. The bump-out 311 depicted is generally trapezoidal shaped, and analogous to bump-out regions 135 and 246, FIGS. 14 and 28. It can be seen by comparing FIGS. 31, 32 and 33, that the end construction 282 will only properly seal with the interior surface 310c of collar 310, if the cartridge is in appropriate rotational alignment, allowing bump-out 311 to be received within gap 302, FIG. 33. It will also be understood that the seal 290 will engage surface 310i above bump-out 311 and below member 315.

It will be understood that the principles described in connection with FIGS. 31-33 can be applied in an in-tank arrangement, by using appropriate features on the cartridge for engagement with appropriate features on the collar in the bottom of the housing.

IV. Additional (Alternate) Assemblies, Features and Component Variations—FIGS. 34-75

It is noted that in FIGS. 34-75, some variations in assemblies, components and features from those described in U.S. Ser. No. 61/211,586 are presented.

A. An Alternate In-Line Assembly, FIGS. 34-53

Figure 34:
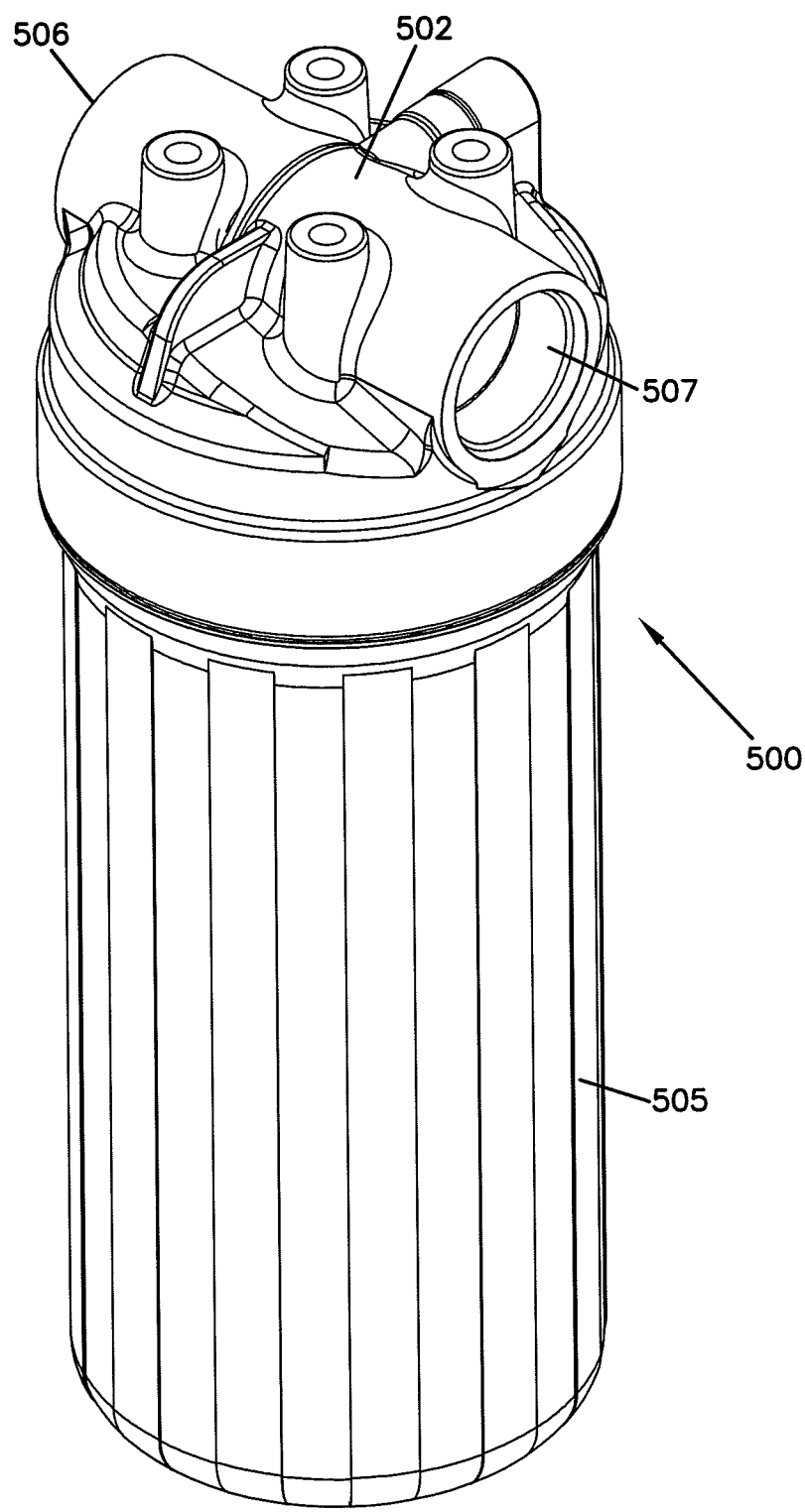
FIG. 34 is a schematic top perspective view of a liquid filter assembly according to a fifth embodiment of the present disclosure, mounted on a filter head assembly for use in line.

The reference numeral 500, FIG. 34, designates an additional example of an in-line assembly according to the present disclosure. The assembly 500 includes a filter head 502 with a liquid filter assembly 505 mounted thereon. The filter head 502 includes a liquid flow inlet port arrangement 506, by which liquid to be filtered enters the filter head 502. The filter head 502 also includes a liquid flow outlet port arrangement 507, by which filtered liquid leaves the assembly 500 and the filter head 502.

In general terms, filter assembly 505 is removably mounted on filter head 502. Typically, a threaded engagement is used, as discussed below.

Figure 35:
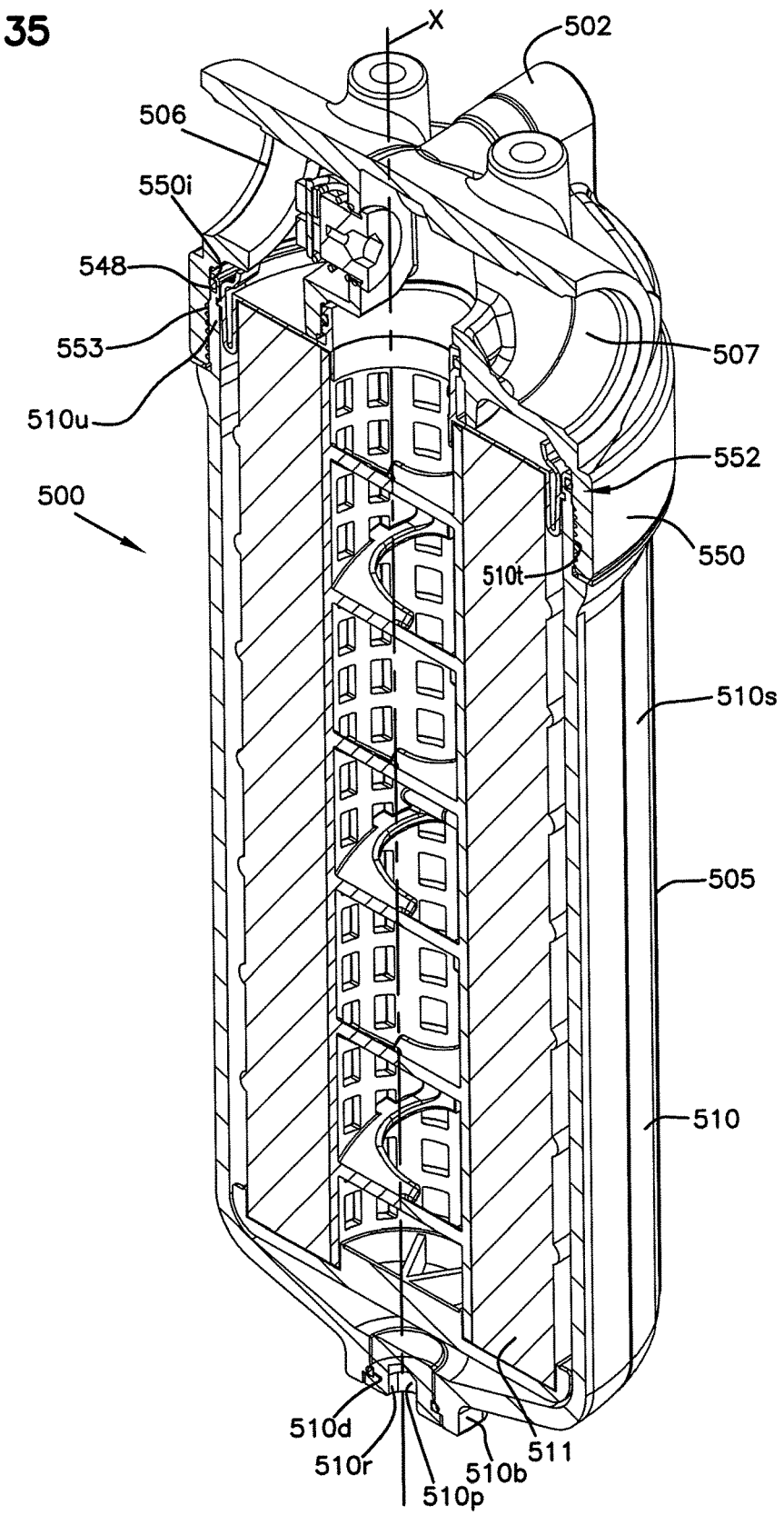
FIG. 35 is a schematic cross-sectional perspective view of the components of FIG. 34.

In FIG. 35, a schematic cross-sectional view of the assembly 500 is depicted. Filter assembly 505 can be seen as comprising: outer housing or bowl 510 and filter cartridge 511. The housing or bowl 510 includes a sidewall 510s having a first, open (in this example upper) end section 510u. The upper end 510u includes a threaded section 510t for releasably securing the housing 510 to the filter head 502. For the particular example assembly depicted, the threads 510t surround an exterior of the sidewall 510s adjacent, and spaced from, an end tip of end section 510*u*. That is, housing 510 has outer or outwardly directed threads 510*t*, although alternatives are possible.

The example housing 510 depicted further includes a housing bottom 510*b*, in the example depicted having an optional central aperture 510*d* closed by removable plug 510*p*. In use, plug 510*p* can be removed to drain housing 510. The plug 510*p* is shown fit with a socket receiver 510*r*, for receiving a tool, to insert or remove the plug 510*p*.

Figure 36:
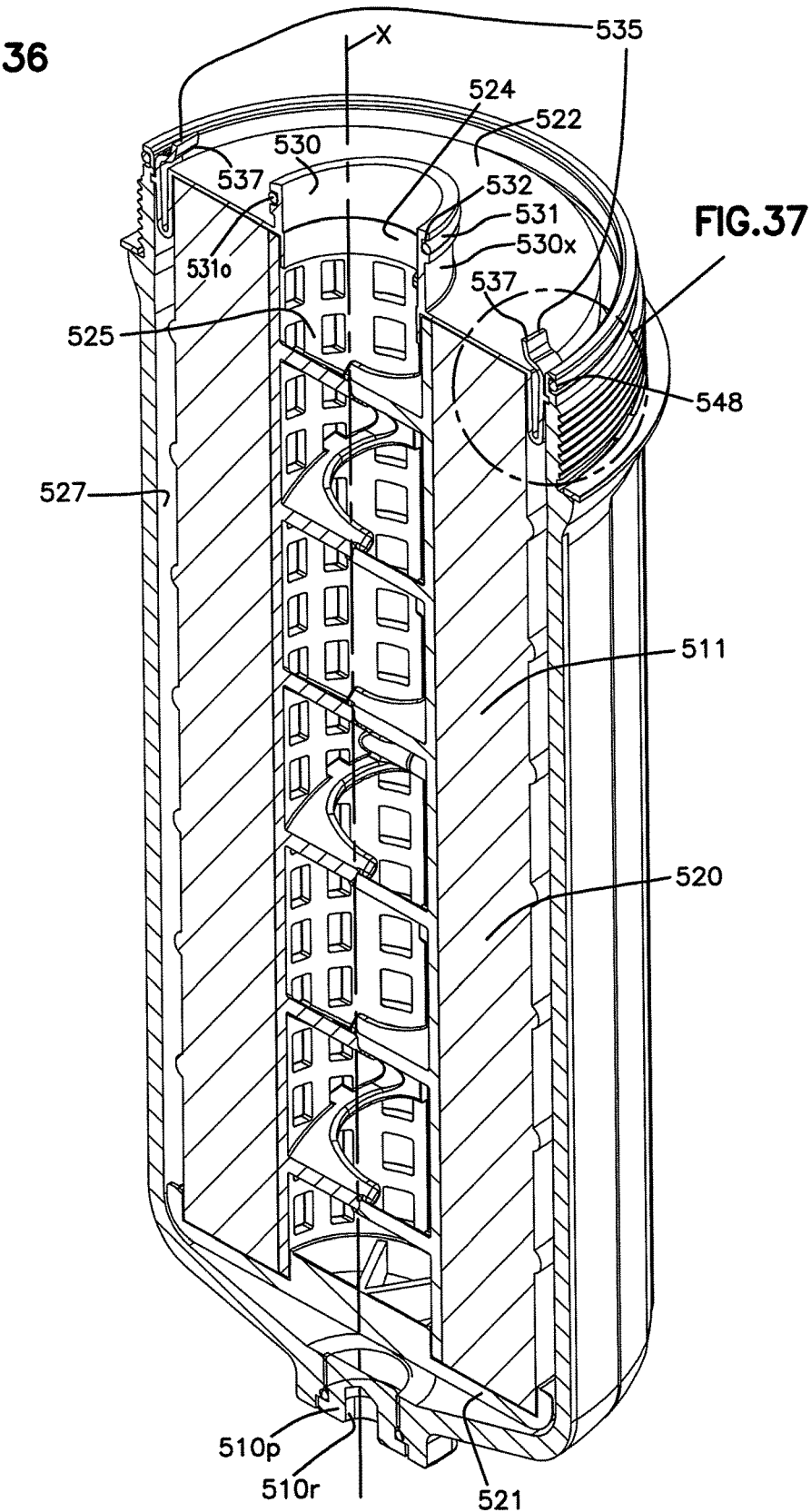
FIG. 36 is a schematic perspective cross-sectional view of a housing and cartridge component of the assemblies of FIGS. 34 and 35.

Attention is now directed to FIG. 36, in which a cross-sectional view of a filter assembly 505 separated from filter head 502 is presented. The cartridge 511 can be seen as comprising media 520 positioned in extension between a first end construction (end cap) 521 and a second end construction (end cap) 522.

The first end construction 521, for the example system depicted, is generally directed downwardly, i.e. in a direction away from the filter head 502, in installation. The depicted end construction 521 is closed, i.e. it has no aperture completely open to flow therethrough. In some applications of the techniques described herein, end construction 521 can be provided with an aperture therethrough, closed by a bypass valve. In still other applications of the techniques described herein, end construction 521 can be provided with an aperture therethrough, and with appropriate construction for sealing to a housing, to avoid undesirable leakage at that location. An example of such an open end cap or end construction, with a seal arrangement, is described in U.S. Ser. No. 11/098,242, incorporated herein by reference. Such features can be adapted, for example, for use with the features of the present disclosure.

Second end construction 522 for the example depicted, comprises an open end construction, having a central aperture 524 therethrough, in fluid flow communication with an open end interior 525 of cartridge 511, around which media 520 extends.

Surrounding the cartridge 511, between the media pack 520 and the bowl sidewall 510*s*, is provided annular region or flow annulus 527. In general terms, liquid to be filtered is directed into annulus 527 and passes through the media 520 (with filtering) and into open region 525. From the open region 525 the filtered liquid passes outwardly from cartridge 511 through aperture 524. This is, in general, an "out-to-in" flow with respect to the direction of flow through the cartridge 511. It is established by providing annulus 527 in flow communication with liquid flow inlet arrangement 506, FIG. 34, and providing open interior 525 in liquid flow communication with liquid flow outlet arrangement 507, FIG. 34.

It is noted that the techniques described herein can be applied in arrangements designed for alternate flow, for example in-to-out flow, during filtering.

Still referring to FIG. 36, aperture 524 in end construction 522 is surrounded by a projection or spigot 530. The spigot 530 projects away from media 520 and engages a portion of the filter head 502, when filter assembly 505 installed. The particular projection 530 depicted has an outer surface 530*x* on which a seal member 531 is mounted, to form a radially outwardly directed radial seal. Mount 532 is shown in FIG. 36, for the seal arrangement 531. The typical seal arrangement would be an o-ring 531*o*, although alternatives are possible.

Still referring to FIG. 36, end construction 522 includes a flexible radial projection arrangement 535 thereon. The flexible radial projection arrangement 535 provides for a releasable interference connection between the cartridge 511 and the bowl or housing 510. Thus, in general terms, the radial projection arrangement 535 is sometimes referred to herein as a (spring-loaded) housing-engagement projection arrangement. This will be understood from the further description below.

For the particular example assembly depicted, the flexible radial projection arrangement 535 comprises at least first and second spaced (in the example radially opposite) flexible tabs 537.

Figures 37, 38:
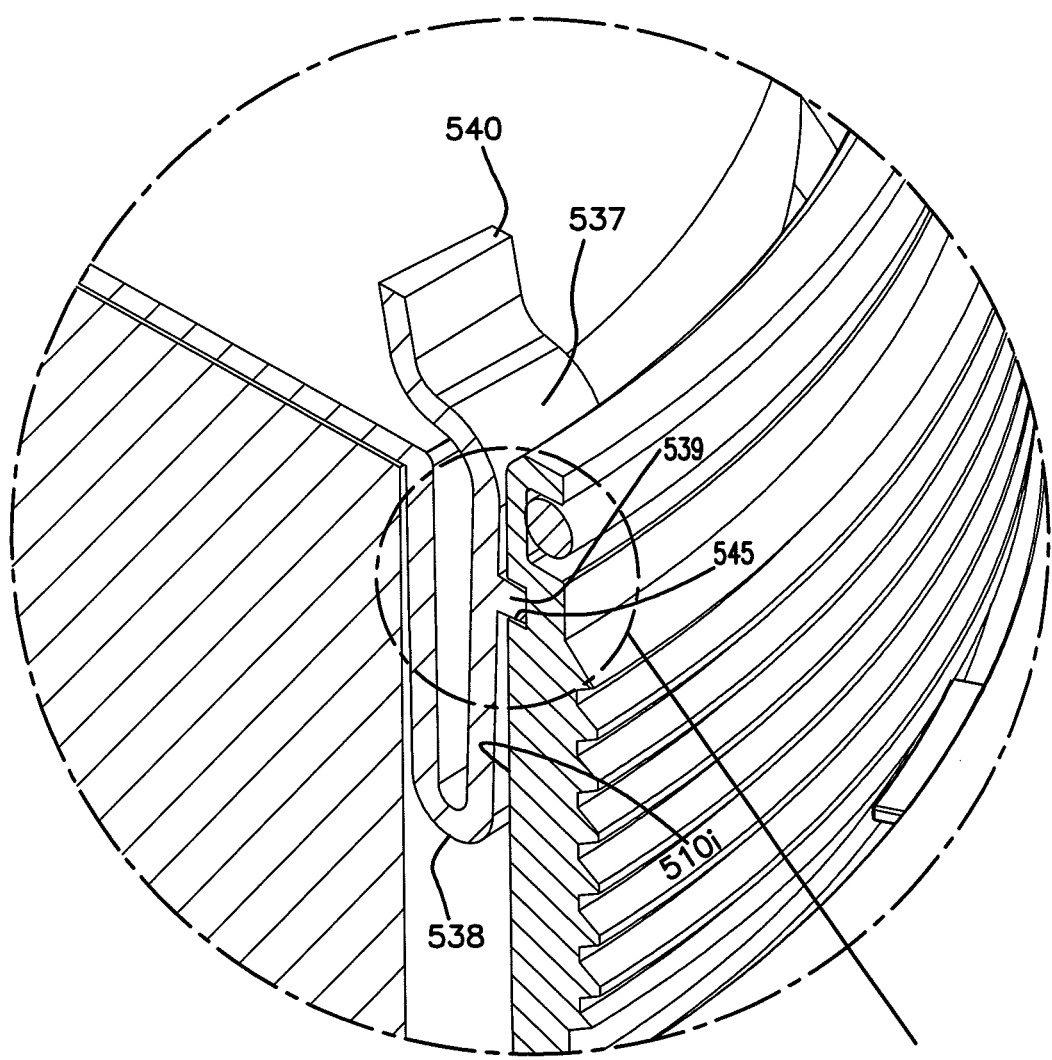
FIG. 37 is a schematic, enlarged, fragmentary cross-sectional view of a selected portion of FIG. 36.
FIG. 38 is a schematic, enlarged, fragmentary schematic view of a selected portion of FIG. 37.
Figure 38:
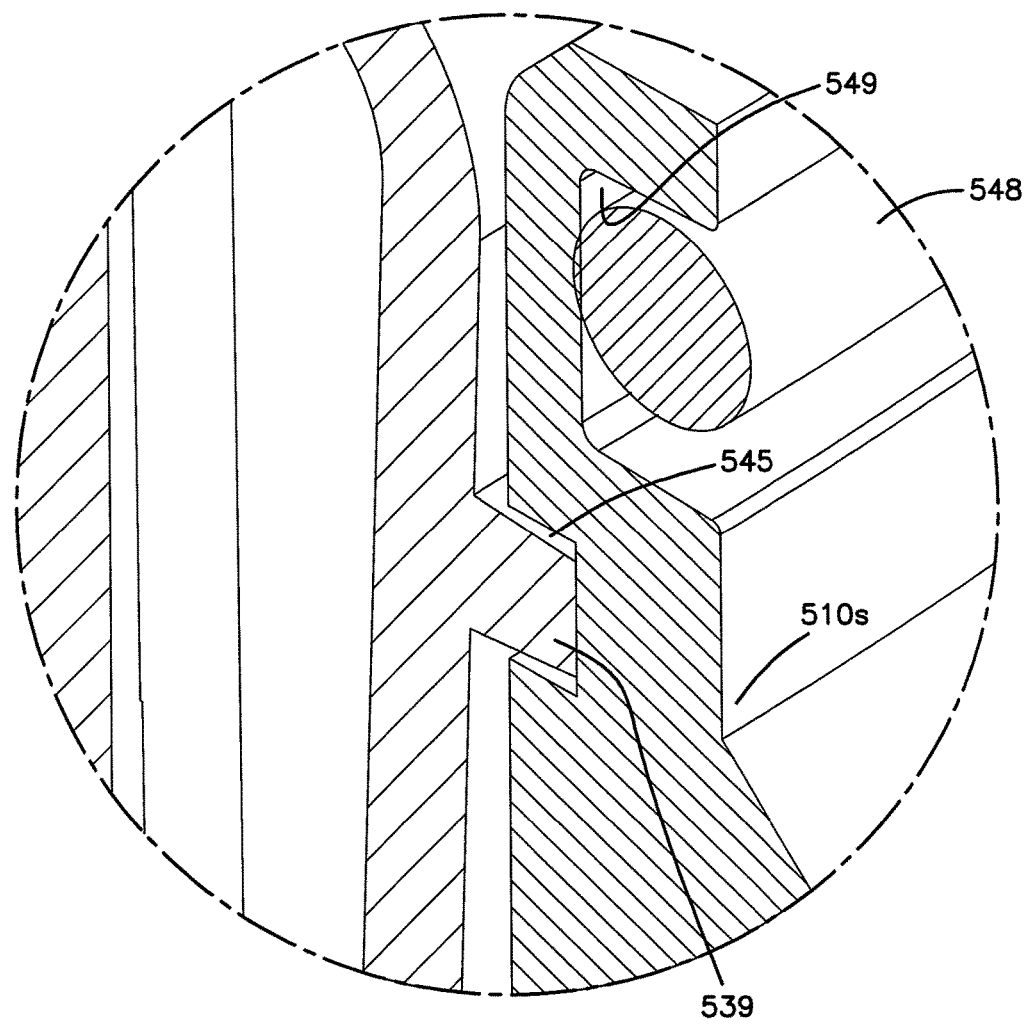

Attention is directed to FIG. 37, with respect to one of the tabs 537. Each of the flexible tabs 537 includes: a flex mount 538 which in the example shown is a living hinge in tab 537; a radially outwardly directed projection arrangement (or member) 539 and an actuator (free, handle) end or projection 540. The projection 539 is oriented and positioned to project outwardly (radially) into receiver recess 545 along an interior 510*i* of housing 510, when the cartridge 511 is properly installed. When actuator projection or end 540 is manipulated to be flexed radially inwardly, by a service provider, projection member 539 will be recessed radially (retracted) inwardly out of receiver or recess 545. When this movement is made for both of the two tabs 537, the cartridge 511 can be separated from the housing 510. During installation of cartridge 511 into the housing 510, engagement between the projection member 539 and the housing sidewall 510*s* can be used to deflect the tabs 537 radially inwardly, or manual deflection can be done, until the receiving 545 is encountered and snap-fit occurs.

This type of engagement between the cartridge 511 and the housing 510 provides conveniently that the housing 510 and cartridge 511 remain assembled to one another, until the service provider desires separation. Such an engagement uses some of principles related to these described for example in U.S. Pat. No. 7,556,155, incorporated herein by reference. However, it is advantageous.

In FIG. 38, an enlarged fragmentary view showing engagement between projection member 539 and recess 545 is shown. The typical receiver recess is a continuous groove. It is noted that the projection/receiver arrangement or snap-fit arrangement represented by flexible projection arrangement 535 and receiver recess 545 can be applied in a variety of liquid filter systems having alternate features to those described herein. It is advantageous for the present system, since it allows independent rotation of the housing and cartridge, which is desirable when used with alignment arrangements as described herein.

Also viewable is o-ring 548, which comprises a seal member mounted in groove 549, in sidewall 510*s*, in an appropriate location to form a seal with outer mounting ring 550 of head 502 during installation, FIG. 35.

In FIG. 35, sealing engagement between the o-ring 548 and the mounting ring 550 is shown generally at 552, along an inner surface 550*i* of mounting ring 550, but above threads 553 therein.

Figure 39:
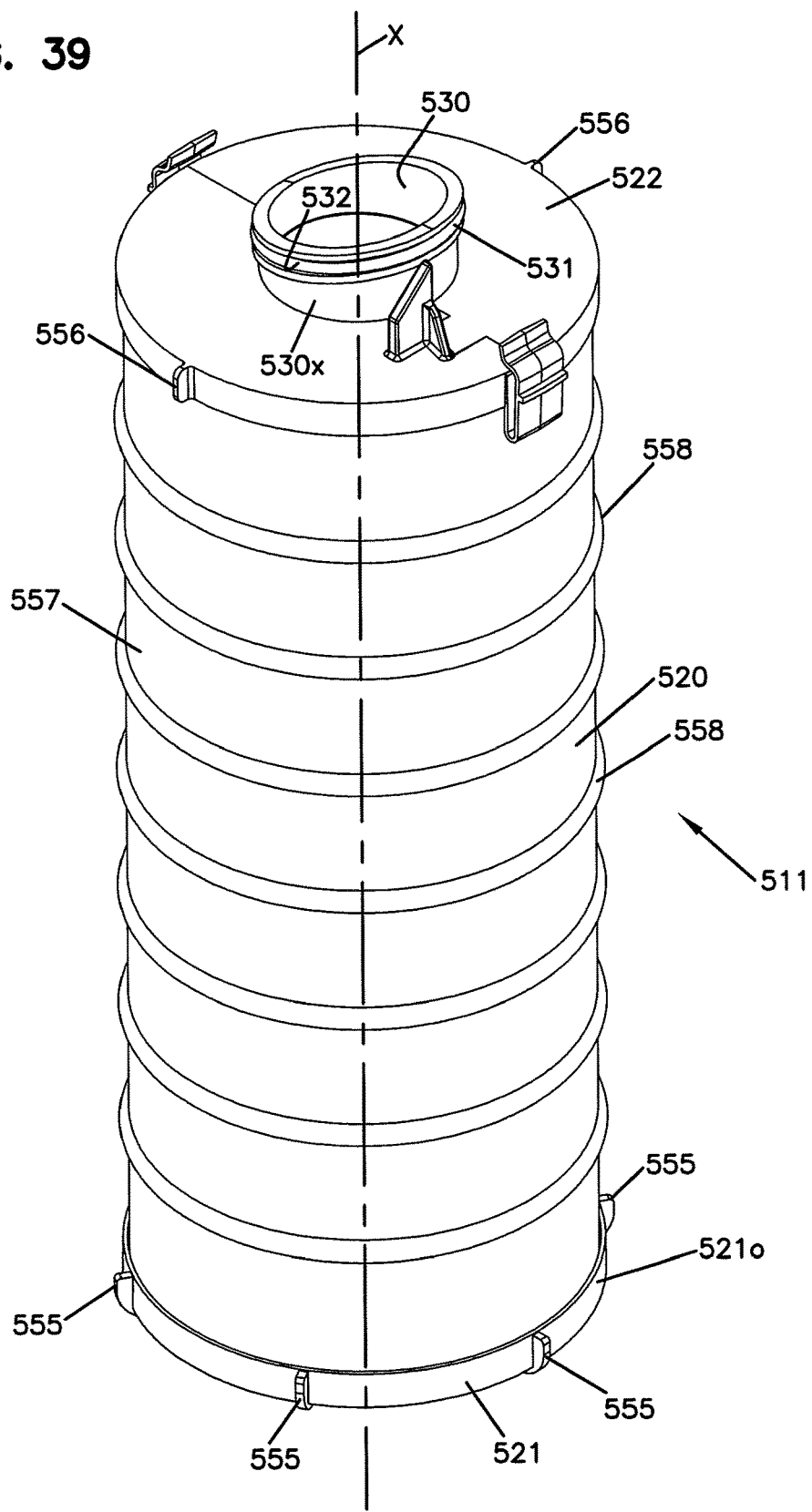
FIG. 39 is a schematic top perspective view of a filter cartridge component of the assembly of FIGS. 34 and 35.

In FIG. 39, cartridge 511 is depicted in perspective view toward end construction (cap) 522. The depiction is schematic. The media 520, for example, can comprise pleated media.

Referring to FIG. 39, it is noted that around an outer periphery 5210 of end construction 521 are positioned optional spaced radial projections 555. These optional projections provide centering in housing 510. Optional projections 556 at outer periphery 522*o* of end construction 522 also provide centering.

Figure 40:
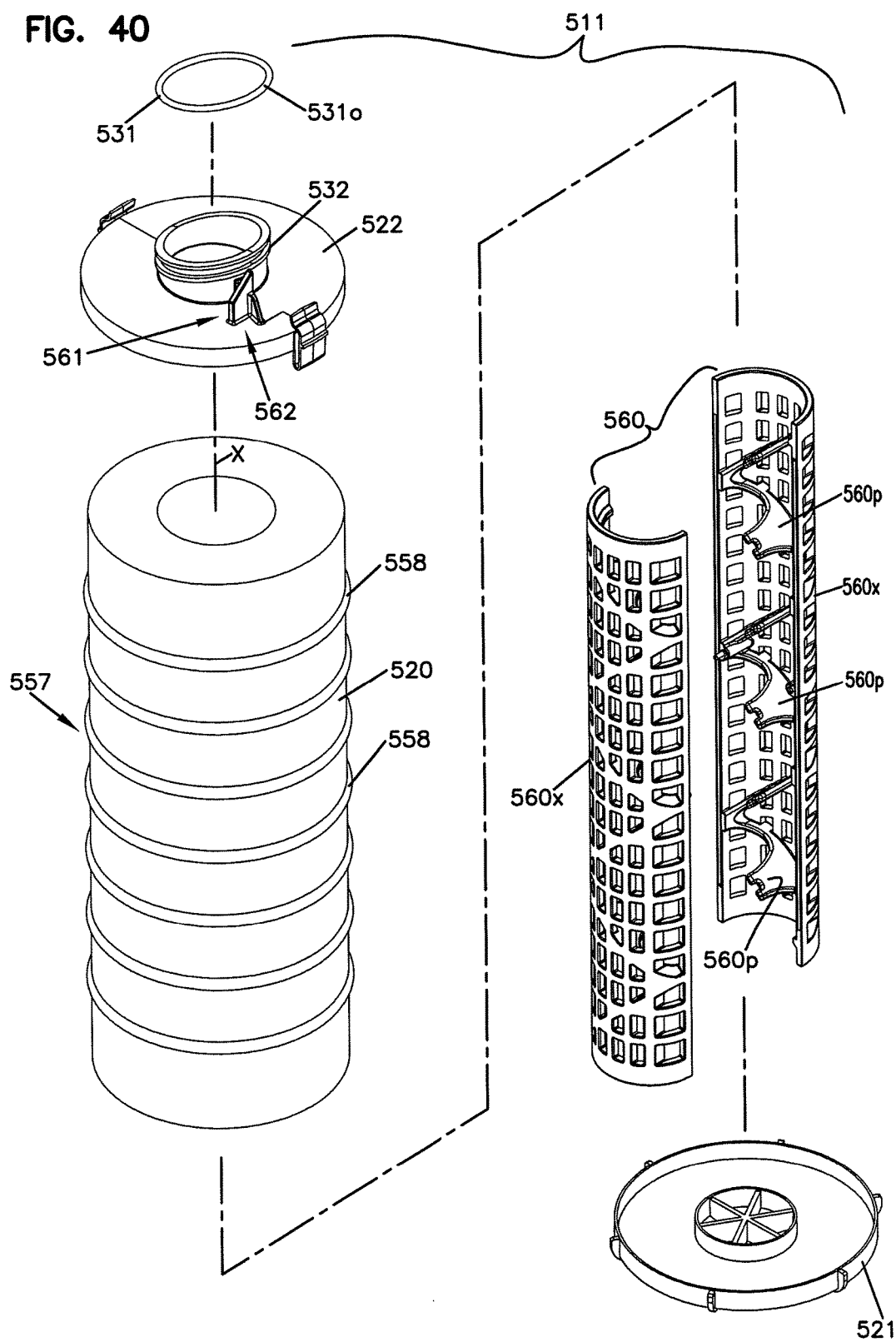
FIG. 40 is a schematic enlarged fragmentary exploded perspective view of the cartridge of FIG. 40.

Attention is now directed to FIG. 40, in which individual component parts to cartridge 511 are depicted in exploded view. At 557 a media pack is depicted, comprising media 520. Around an outside of the media 520, the media pack 557 includes adhesive 558 to help maintain media pack integrity. It is noted that the media 520 can be provided inside of an outer liner, if desired. Such a liner can comprise for example, a perforated structure as plastic or metal, or can comprise expanded metal. Further, the media 520, for example when pleated, can be positioned adjacent (pleated) sections of protective materials such as a plastic screen or net. (It is noted that in FIG. 40, optional projections 556, FIG. 39, are not shown).

Still referring to FIG. 40, when assembled the media pack 557 is positioned around an inner liner 560. The inner liner 560 depicted, comprises a pair of inner liner halves 560x, secured to one another. The halves 560x can be identical to one another, if desired. Referring to FIG. 40, within the liner segments 560x are provided cross-pieces 560p which provide radial strength.

In general terms, the inner liner 560 is a porous or perforated member, through which liquid can flow.

Still referring to FIG. 40, end constructions 521, 522 are viewable. The media pack 557 and inner liner 560 would typically be secured to the end constructions 521, 522, for example by potting or with adhesive.

Still referring to FIG. 40, attention is directed to a non-seal member 561 of a projection/receiver rotational alignment arrangement 562 positioned on the end cap or end construction 521. It is oriented to engage another member of the projection/receiver rotational alignment arrangement on a liquid flow collar, in use, to provide sealing engagement between the two at only selected (pre-selected) rotational alignment. This is described in further detail below.

Attention is now directed to FIGS. 41-45, in which end construction or end piece 522 is depicted. The end piece 522 can be preformed, for example from a plastic.

Referring to FIGS. 41-45, attention is directed to spigot or projection 530. The projection or spigot 530 includes an end 564 (sometimes called a free end) remote from the media pack 557 (FIG. 40) with which the end cap or end construction 522 is used. The end 564 does not include a surface that extends in a plane orthogonal to a central axis X of the cartridge 511 and aperture 524. In this manner, end 564 differs from ends of the projections or spigot 225, FIG. 22.

Referring to FIGS. 41-45, for the particular preferred example arrangement depicted, end 564 extends generally in a plane (Y) not orthogonal to central axis X, but rather extending at an acute angle to a plane orthogonal to axis X of at least 5°, typically at least 40°, and usually within the range of 5°-20°, inclusive, (typically 7°-15°, inclusive). The slant to surface 564 allows, among other things, for clearance of structure in which bypass valve 580, discussed below, is mounted.

Still referring to FIGS. 41-45, attention is now directed to the mount 532 for a seal member 531, in the example comprising o-ring 531o, FIG. 40. The seal member 531 extends at an angle non-orthogonal to central axis X. The particular example arrangement is depicted with the mount 532 for seal member 531 extending at an acute angle to a plane Y orthogonal to central axis X of at least 5°, typically not more than 40°, often within the range of 5°-20°, inclusive, and typically within the range of 7°-15°, inclusive.

It is noted that for the particular example arrangement depicted, the non-orthogonal angle of the seal 531 and mount 532 is the same as the non-orthogonal angle of the end 564, although alternatives are possible.

Referring still to FIGS. 41-45, attention is directed to a first member 561 of the projection/receiver rotational alignment arrangement 562, which is positioned on end member 522. Member 561 generally includes the following two portions or features: a first axial alignment interference portion 563 (FIG. 42) and a second radial alignment interference portion 564. Operation of these portions to achieve a desired alignment effect is discussed below in connection with FIGS. 46-49. In the example arrangement depicted, the axial alignment interference portion 563 can be characterized as a radial fin member, adjacent to and projecting radially outwardly from, spigot 530 in a direction toward an outer perimeter of end construction 522, typically only partially toward that outer perimeter.

Figure 46:
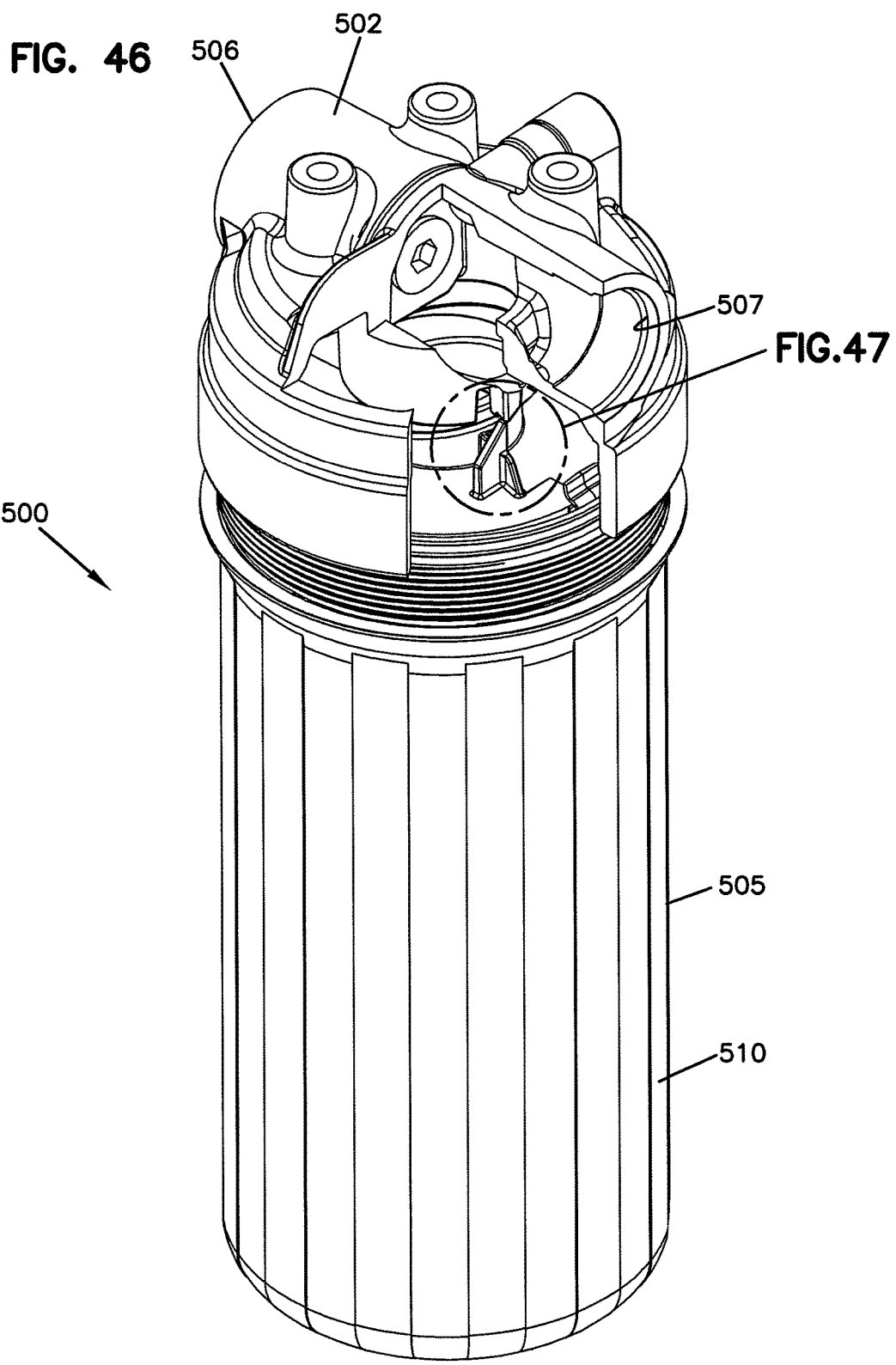
FIG. 46 is a schematic top perspective view of the assembly of FIG. 34, with selected portions broken away to show internal detail.

Attention is first directed to FIG. 46, a view generally analogous to FIG. 34, but with portions broken away to show internal detail. Also in FIG. 46, housing 510 is shown partially positioned on head 502, i.e. during a step of mounting housing 510 in place by engagement of the thread engagement between the two.

Figure 47:
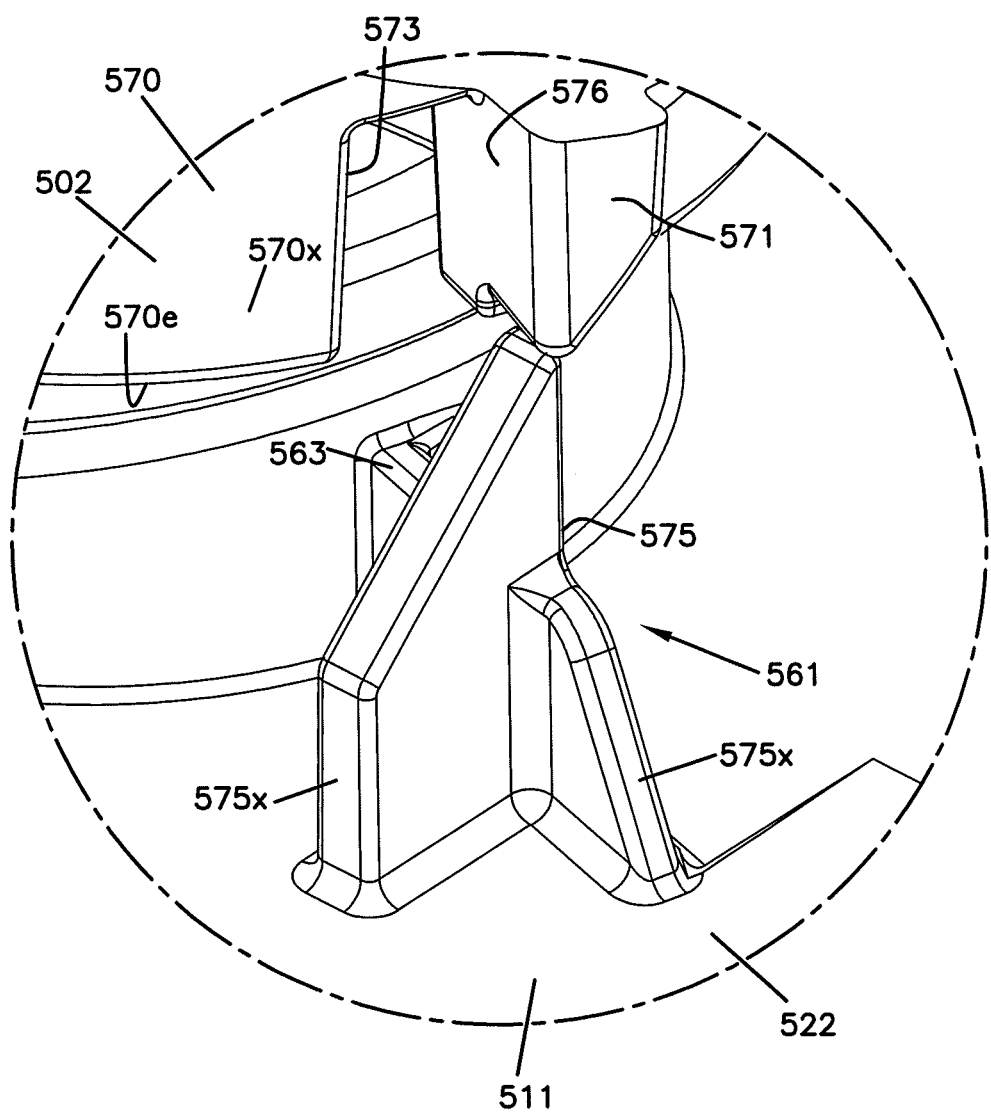
FIG. 47 is an enlarged, schematic, fragmentary view of a selected portion of FIG. 46.

In FIG. 47, an enlarged fragmentary view of a selected portion of FIG. 46 is provided. In the portion viewable in FIG. 47, member 561 on end piece 522 (of cartridge 511) is viewable. Also viewable is a portion of collar member (flow collar) 570 of filter head 502. Collar member 570 generally surrounds and defines a liquid flow passageway within the filter head 502. The particular liquid flow passageway defined by flow collar 570, is an outlet flow passageway through which filtered liquid is transported from cartridge interior 525 to liquid flow outlet 507. Further, member 570 defines an inner seal surface for engagement with seal arrangement 531, to provide for a seal between cartridge 511 and filter head 502, during mounting.

Referring again to FIG. 47, the inner ring or flow collar 570 has an outer surface 570x with a radial alignment (radially outwardly projecting) projection member 571 thereon. The radial alignment projection member 571 is configured to work in conjunction with radial alignment member 564, to ensure that the cartridge 511 is appropriately radially (rotationally) aligned relative to the filter head 502, in a selected rotational orientation, to allow preferred engagement. It is also noted that the flow collar 570 includes a receiver, notch or gap 573 therethrough, which operates as an axial alignment receiver member with axial alignment member 561, to facilitate alignment and engagement between the cartridge 510 and the conduit ring member 570.

In particular, and referring to FIGS. 46 and 47, as the housing 510 is rotated, to mount filter assembly 505 on filter head 502, the cartridge 511 is rotated and moved axially toward flow collar 570. As the cartridge 511 is moved toward flow collar 570, in due course, projection or spigot 530 begins to be inserted into flow collar 570. Eventually, the cartridge 511 will move axially sufficiently far for engagement between axial alignment portion 563 (on cartridge 511) and lower edge 570e of flow collar 570, unless portion 563 is aligned with receiver, or notch 573. Thus, unless axial alignment projection 563 is rotationally aligned with receiver 573, the cartridge 511 cannot be moved into a completely installed, sealed, engagement with the filter head 502. Also, once fully installed, the cartridge 511 cannot be rotated significantly, relative to the flow collar 570.

Proper alignment between the axial alignment projection 563 and receiver, notch or gap 573 will occur, when forward abutment surface 575 of radial alignment projection 562 (on cartridge 511) abuts or aligns with (i.e. moves into juxtaposition with) rear abutment alignment surface 576 of radial alignment projection alignment 571 (on conduit 570). In FIG. 47, surfaces 575, 576 are not shown in proper alignment Rather, surface 575 is shown rotated, counter-clockwise (when viewing down on cartridge 511) past surface 576. Cartridge 510 would have to be rotated nearly a complete rotation relative to the view shown in FIG. 47 (counter-clockwise when viewed downwardly) for alignment to occur, which rotation would occur during threading of housing 510 in place.

In FIG. 47, at 575x, buttresses to strengthen fin 563 and surfaces 575 are shown.

In general terms, the member 561 of a projection/receiver arrangement on the second end construction 522 can be characterized as including a radially directed fin member 563 positioned and extending in a direction between the central spigot 530 and an outer perimeter of the second end construction. This member of the projection/receiver arrangement can be characterized as having a radial alignment abutment member 564 having an abutment surface. The radial abutment member defines a collar receiving gap (to receive flow collar 570) between a portion of the radial abutment member and a portion of the spigot, the collar-receiving gap being traversed by the radial fin member at a location between the gap and the media pack. Further, the radial abutment member, in the example depicted, at least projects to a highest location above at least a lowest portion the seal arrangement 531.

Figure 48:
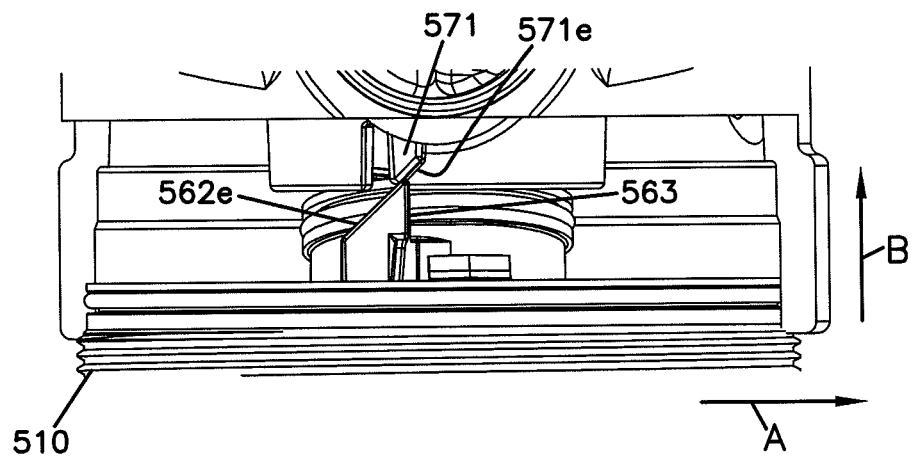
FIG. 48 is a fragmentary schematic depiction of a potential alignment step in the generation of the assembly of FIGS. 34 and 35.
Figure 49:
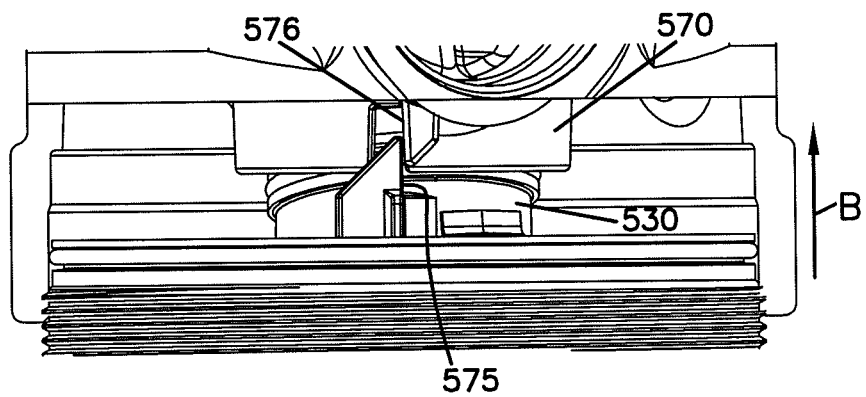
FIG. 49 is a fragmentary schematic depiction of a second alignment step in the generation of the assembly of FIGS. 34 and 35.

Attention is now directed to FIGS. 48 and 49, for further understanding of the alignment arrangement. In FIG. 48, a fragmentary schematic view showing approximately the same alignment as shown in FIG. 47 is depicted. Here, one can see that the tab or projection 563 is positioned just to the right of projection 571. It is noted that a lower end 571e of projection 571 tapers upwardly away from surface 576. It is also noted that an upper end 562e of projection 562 tapers downwardly away from surface 575; i.e. to need the media pack. Tapering of ends 571e and 562e for the example shown, is generally at the same angle, in each case an acute angle of about 30-60°, inclusive, usually 40-50°, inclusive, although alternatives are possible. Thus, as the housing 510 continues to rotate in the direction of arrow A, and to axially move in the direction of arrow B, surfaces 562e, 571e, if they engage, will tend to slide adjacent to one another, and avoid jamming. Eventually, the rotational alignment of FIG. 49 will occur, in which surface 575 (moves into juxtaposition with) abuts surface 576. At this point, the cartridge 511 will no longer rotate, as the housing 510 is rotated, due to the interference between surfaces 575 and 576. The interference to movement occurs right where projection 563 (FIG. 47) aligns with notch 573. Thus the cartridge 510 can continue to move in the direction of arrow B, upwardly moving projection 563 into notch 573, and in general moving conduit projection 530 into an interior of flow collar 570. This will move the seal arrangement on the projection 530 into sealing engagement with an seal inner surface of flow collar 570.

Figure 41:
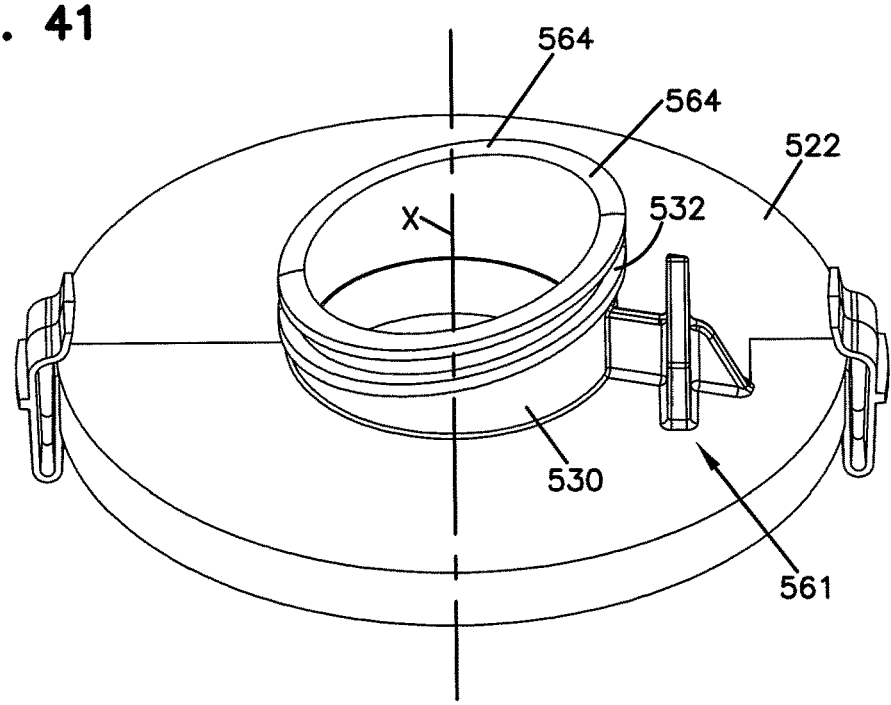
FIG. 41 is a schematic top perspective view of a second end construction component of the cartridge of FIGS. 39 and 40.
Figure 42:
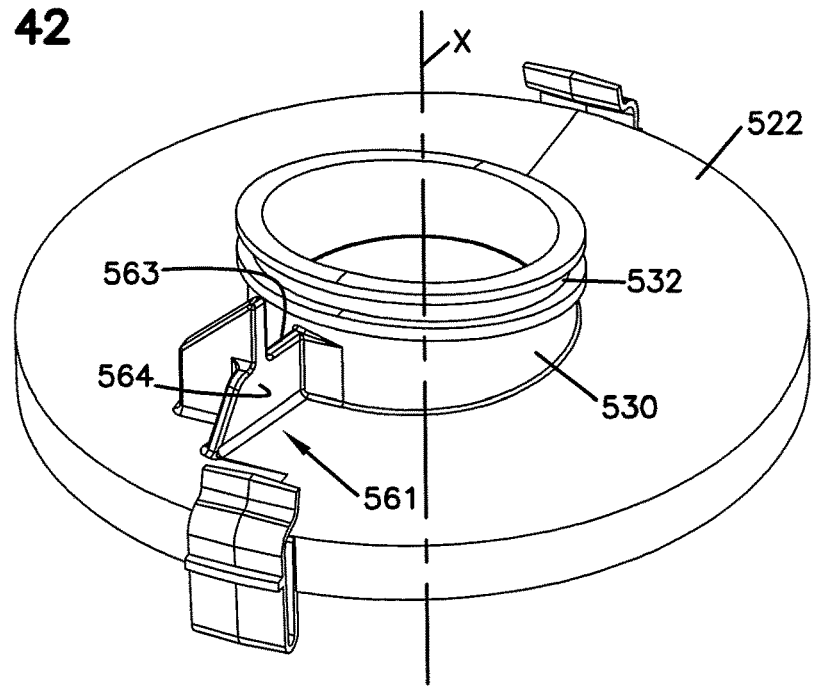
FIG. 42 is an alternate schematic top perspective view of the component of FIG. 41.
Figure 43:
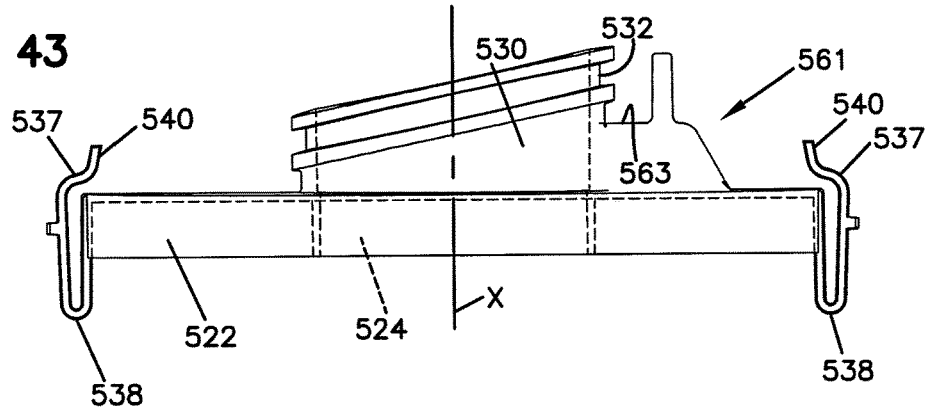
FIG. 43 is a schematic side elevational view of the component of FIGS. 41 and 42.
Figure 44:
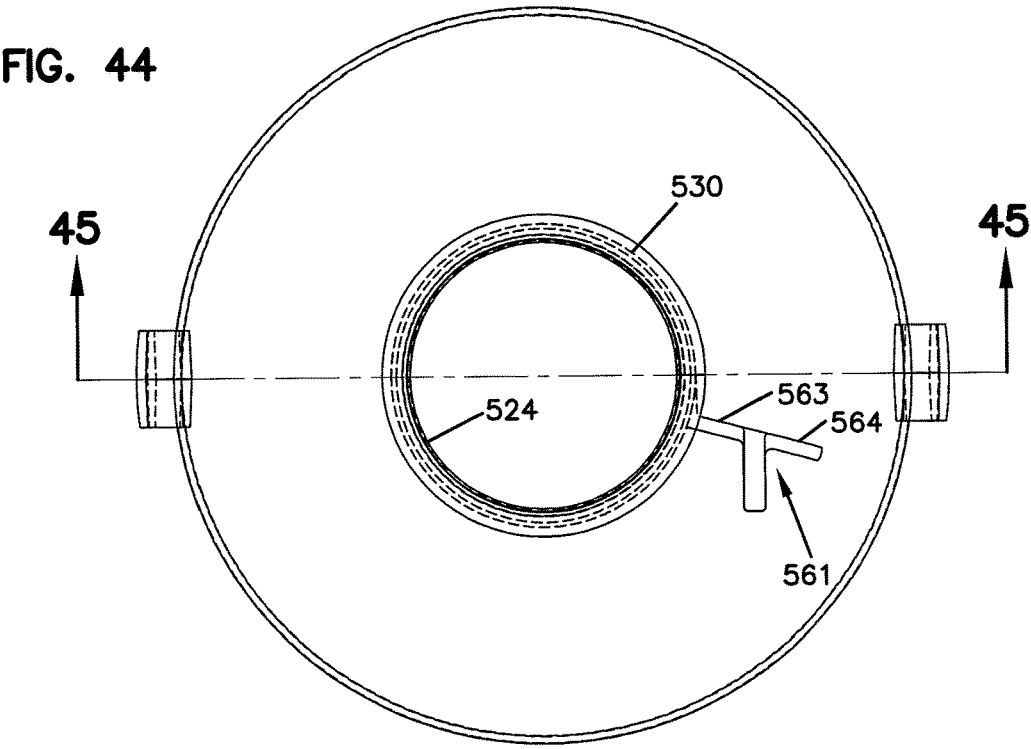
FIG. 44 is a schematic top plan view of the component of FIG. 43.
Figure 45:
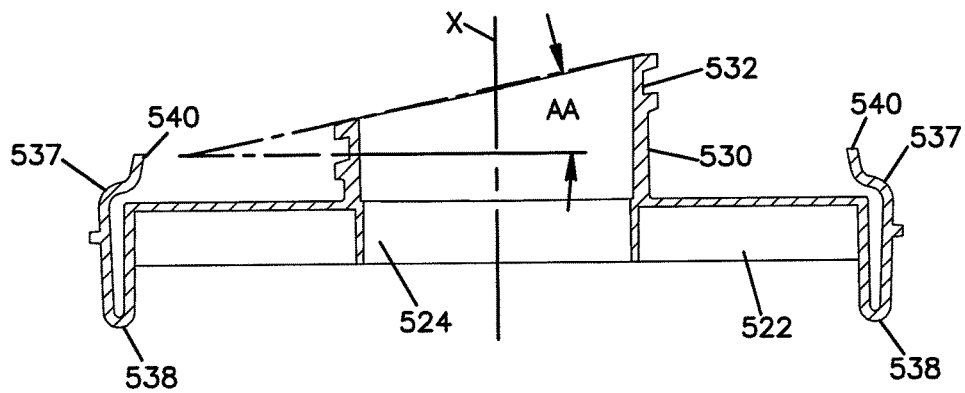
FIG. 45 is a schematic cross-sectional view taken along line 45-45, FIG. 44.

It is noted that within flow collar 570 there will typically be positioned a downwardly directed abutment shelf that is configured (slanted) to mate with surface 564, FIG. 41. Such a mating would only be possible when surface 564 is in a single accepted rotational alignment with respect to the abutment shelf within flow collar 570. This abutment shelf is described further below in connection with FIGS. 51-53.

Figure 50:
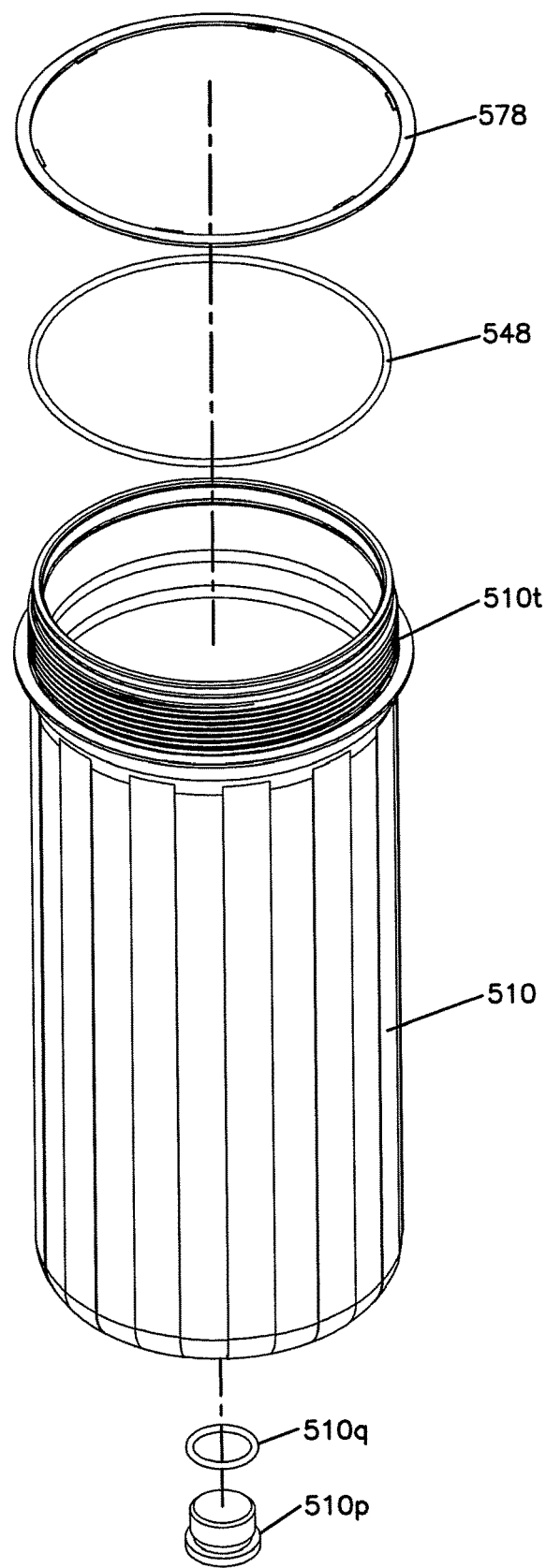
FIG. 50 is a schematic perspective enlarged exploded view of a housing component of the assembly of FIGS. 34 and 35.

Referring now to FIG. 50, an exploded view of housing 510 is depicted. Componentry viewable in FIG. 50 includes: housing 510; plug 510p; seal ring 510q; seal ring 548; and, dust seal 578. Threaded region 510t on housing 510 is viewable.

Figure 51:
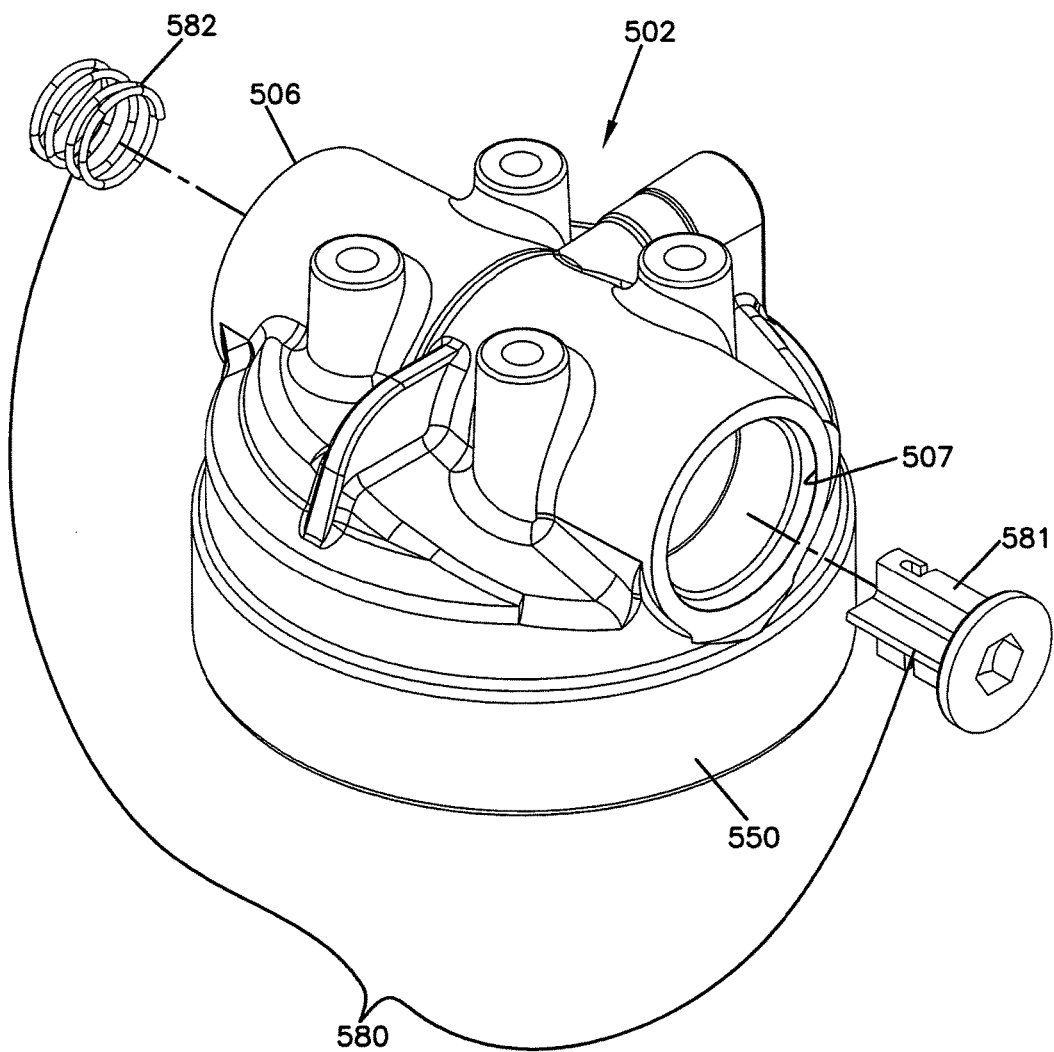
FIG. 51 is an exploded schematic perspective view of a filter head component of the assembly of FIGS. 34 and 35.

In FIG. 51, an exploded view of filter head 502 is depicted. In FIG. 51, components of a bypass valve arrangement 580 comprise valve member 581 and spring biasing member 582 are shown. The bypass valve arrangement 580 is positioned to allow direct flow from inlet arrangement 506 to outlet arrangement 507, when the control or biasing pressure valve arrangement 580 is overcome.

Figure 52:
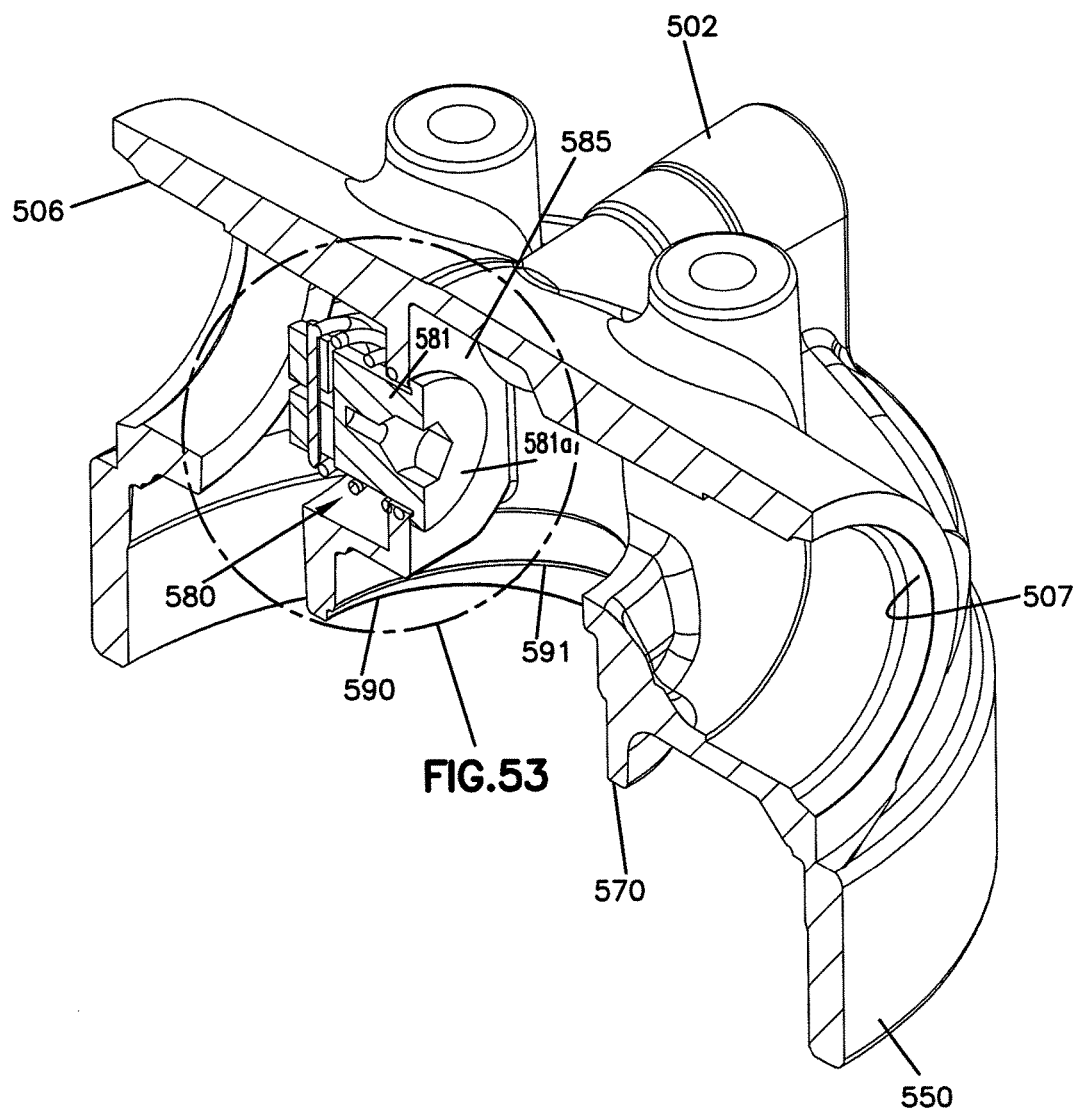
FIG. 52 is a schematic cross-sectional perspective view of the filter head of the FIG. 51.

In FIG. 52, a cross-sectional view of filter head 502 is viewable. Bypass valve 580 can be seen as providing for fluid flow communication between inlet 506 and 507, when the biasing pressure of spring 582 is overcome, by allowing head 581a of valve member 581 to bias away from surface 585.

Referring to FIG. 52, at 590 is provided the abutment or alignment surface which also slants at an acute angle to a plane orthogonal to central axis X, to align with end 564. In general at 591, is positioned a seal surface for seal member 531 on cartridge 511. It is noted that surface 591 is typically cylindrical and circular in a axial projection.

Figure 53:
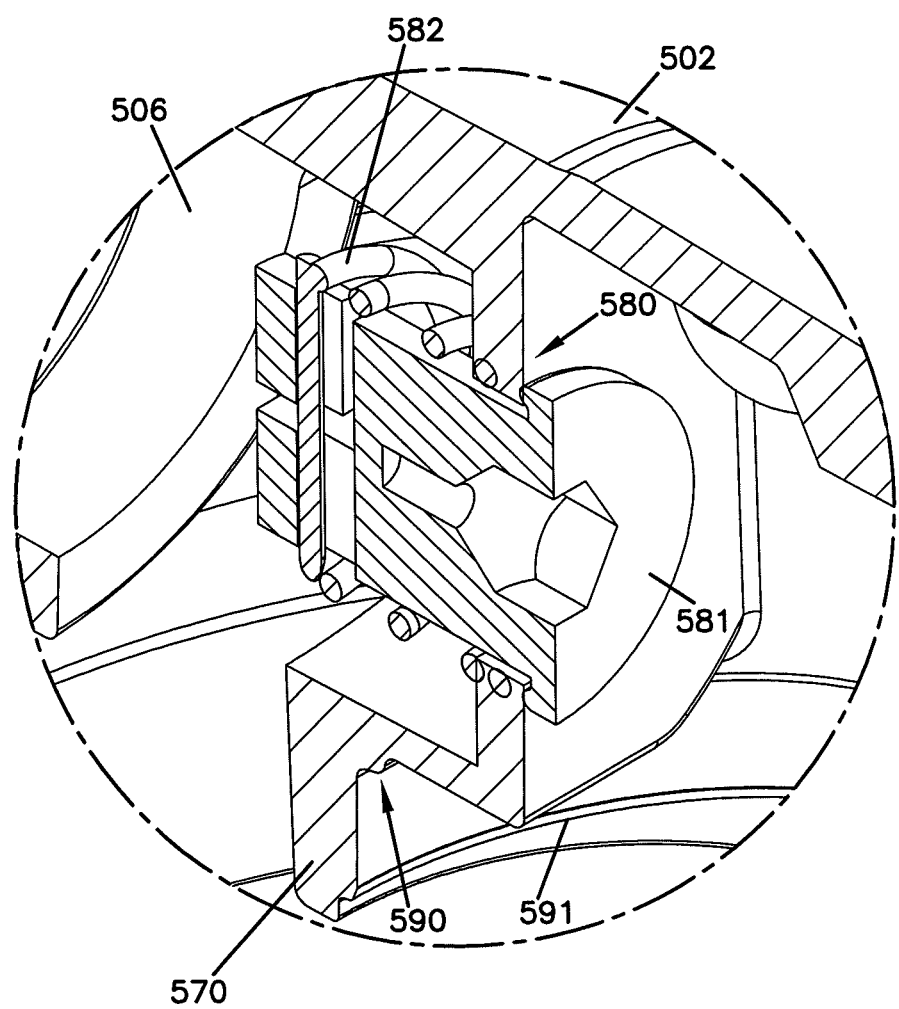
FIG. 53 is a schematic enlarged fragmentary view of a selected portion of FIG. 52.

In FIG. 53, an enlarged fragmentary view of a portion of FIG. 52 is shown. In general bypass valve 580 is viewable.

B. A Variation in Selected Seal Size Definition, to Advantage.

In U.S. 2005/0224407, incorporated herein by reference, principles described in which a seal member can be positioned preferably so that axial forces on an associated cartridge are modified to advantage. Indeed, in that reference, liquid forces on opposite sides of an end cap can be brought into a balance or approximate balance, by appropriately locating the seal. Such principles can be applied in connection with seal arrangements that are defined in plane that extend at an acute angle relative to a plane orthogonal to a central axis of the cartridge. An example of such an arrangement is depicted in FIGS. 54-56.

Figure 54:
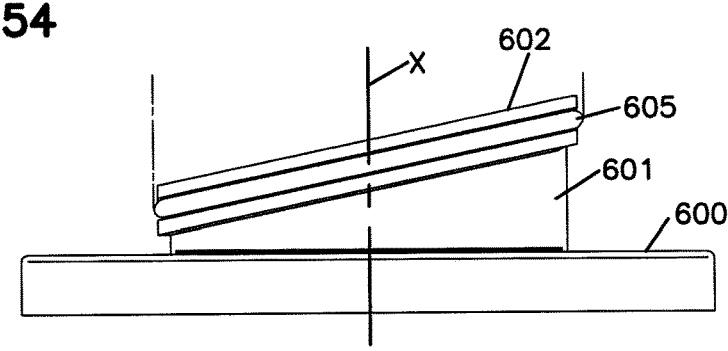
FIG. 54 is a schematic side elevational view of an alternate end construction component feature usable in arrangements in accord with present disclosure.

Attention is first directed to FIG. 54. Here, an end piece 600 is depicted having a projection or spigot 601 thereon terminating in an end 602. The depicted end 602 extends at an angle relative to a plane orthogonal to central axis X, generally analogous to surface 564 discussed above.

Seal member 605 is shown also extending at an angle relative to a plane orthogonal central axis X, generally analogously to seal member 531o.

Figure 55:
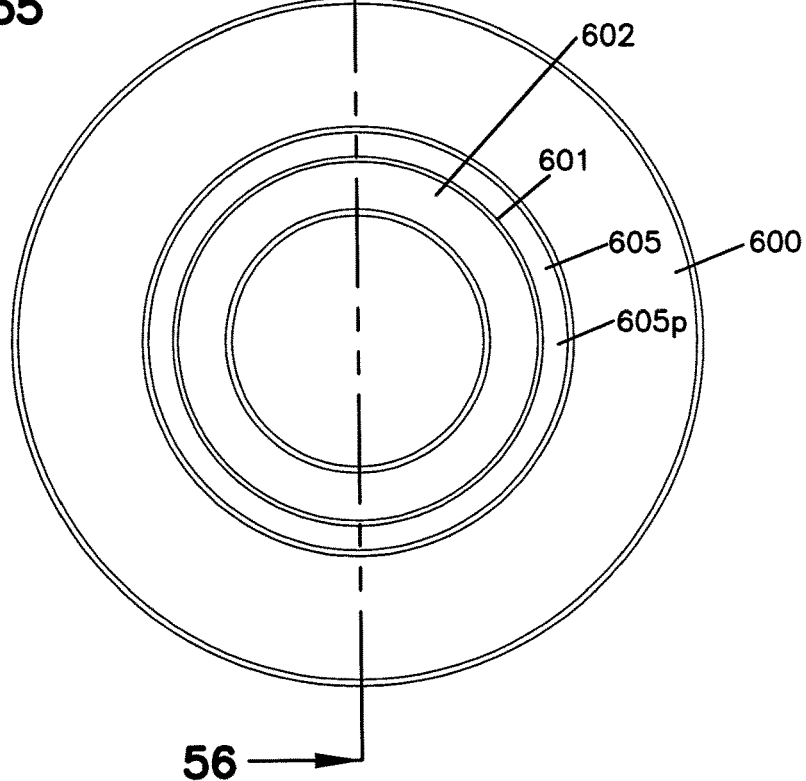
FIG. 55 is a schematic top plan view of the end construction feature of FIG. 54.
Figure 56:
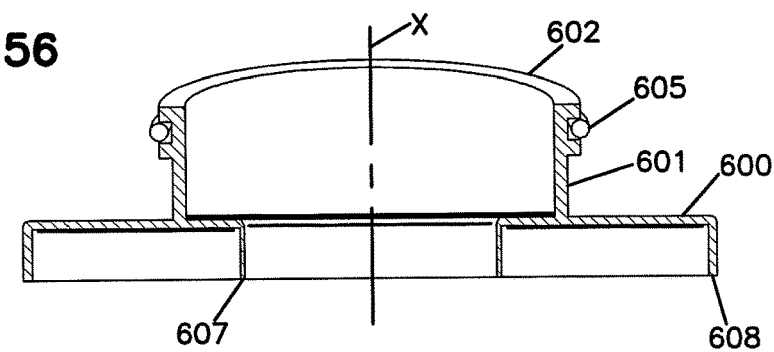
FIG. 56 is a schematic cross-sectional view of the end cap of FIGS. 54 and 55, taken generally along 56-56, FIG. 55.

In FIG. 55, a top plan view of the end member 600 is depicted. It can be seen that in plan view, the seal member 605 can be seen to define an outer perimeter 605p.

In the typical arrangement according to the present disclosure, as shown in the various examples depicted herein, an axial projection and outer perimeter of the seal member generally defines a circular pattern, to mate with a cylindrical service that in axial projection also defines a circular perimeter. This allows the seal member 605 on the spigot 601 to rotate in the flow collar, when needed, for example during installation. The circular seal perimeter 605p, for the various seals described herein, can be characterized as defining a seal diameter D.

In FIG. 56, seal member 605 is shown in cross-section, on spigot 601. It can be seen that the seal diameter for the example depicted, is larger than inner aperture or inner pleat diameter, indicated generally 607 and smaller than an outer end piece perimeter or pleat diameter indicated at a location generally 608. Typically, the seal diameter D when viewed in projection, FIG. 55, will be such that it is located at least 5% across the end construction 600 between an inner pleat diameter location 607 and an outer pleat diameter location 608 and preferably it is such that, in accord with the characterization of U.S. 2005/0224407, the seal diameter $D_s$ will be at a location corresponding to about 0.85-1.2 $D_b$, typically at least 0.9 $D_b$, usually at 0.95 $D_b$ and often 0.98 $D_b$ or larger. Herein, $D_b$ is meant to refer to a seal diameter at which liquid forces on opposite sides of end construction 600 are in balance, in accord with U.S. 2005/00224407.

It is noted that in construction 600 there is not shown a rotational alignment arrangement. Any of the arrangements described herein can be used in connection with the configuration of end construction 600. The schematic views of FIGS. 54-56, with respect to end construction 600, were primarily meant to indicate how with a slanted seal construction such as that defined herein, can be configured to use the force balancing principles described in U.S. 2005/0224407.

C. An Additional Inline Variation, FIGS. 57-66

Another variation in the application of the principles described herein, in an in-line filter assembly, is depicted herein in connection with FIGS. 57-66.

Figure 57:
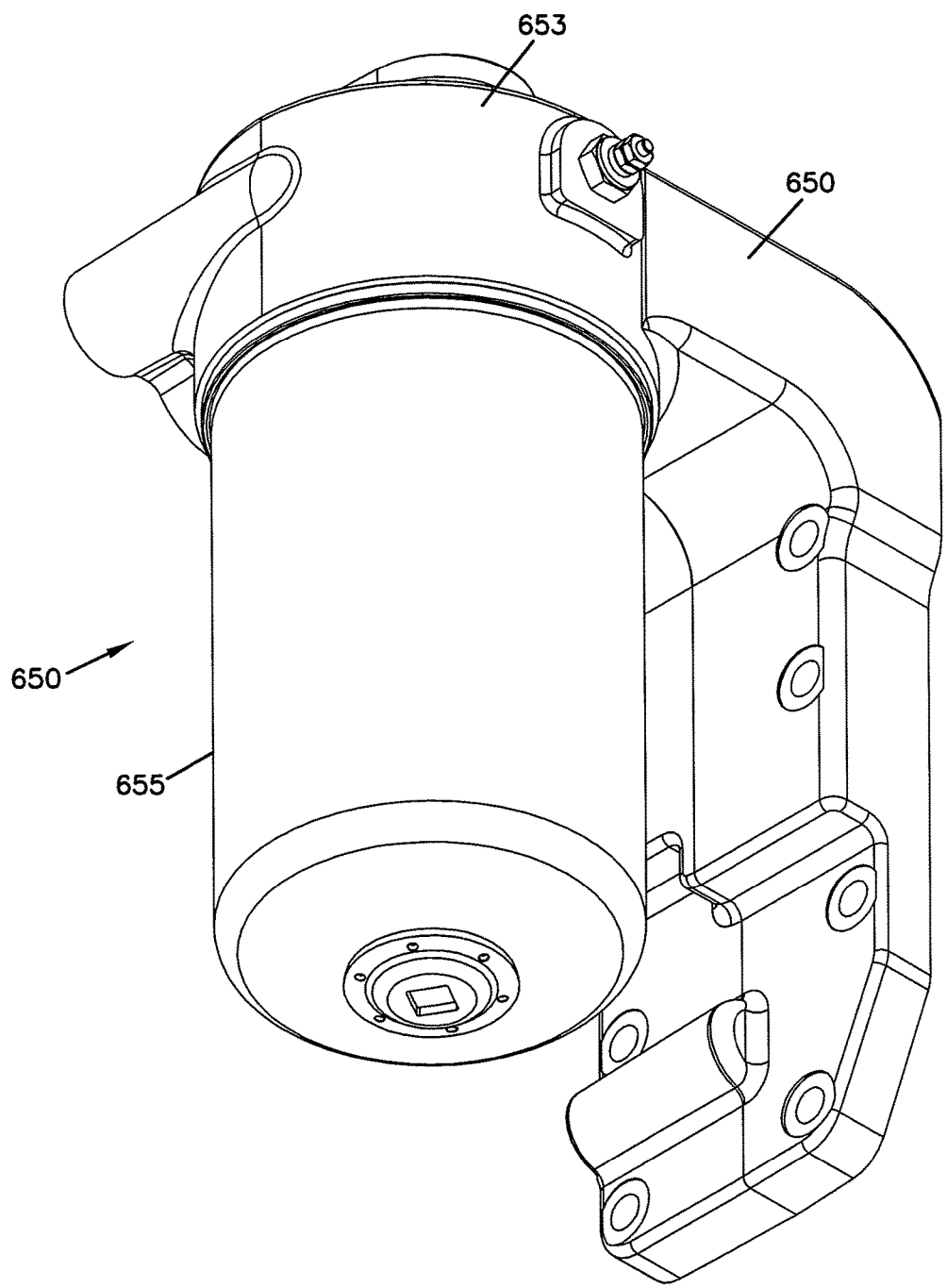
FIG. 57 is a schematic bottom perspective view of a sixth alternate embodiment of the present disclosure.

Referring first to FIG. 57, at 650, a liquid filter arrangement is depicted, in bottom perspective view. The arrangement 650 comprises a manifold 652 including a filter head 653; and, a separable liquid filter arrangement or assembly 655. The assembly 655 can be separated from the filter 653, for servicing.

Figure 58:
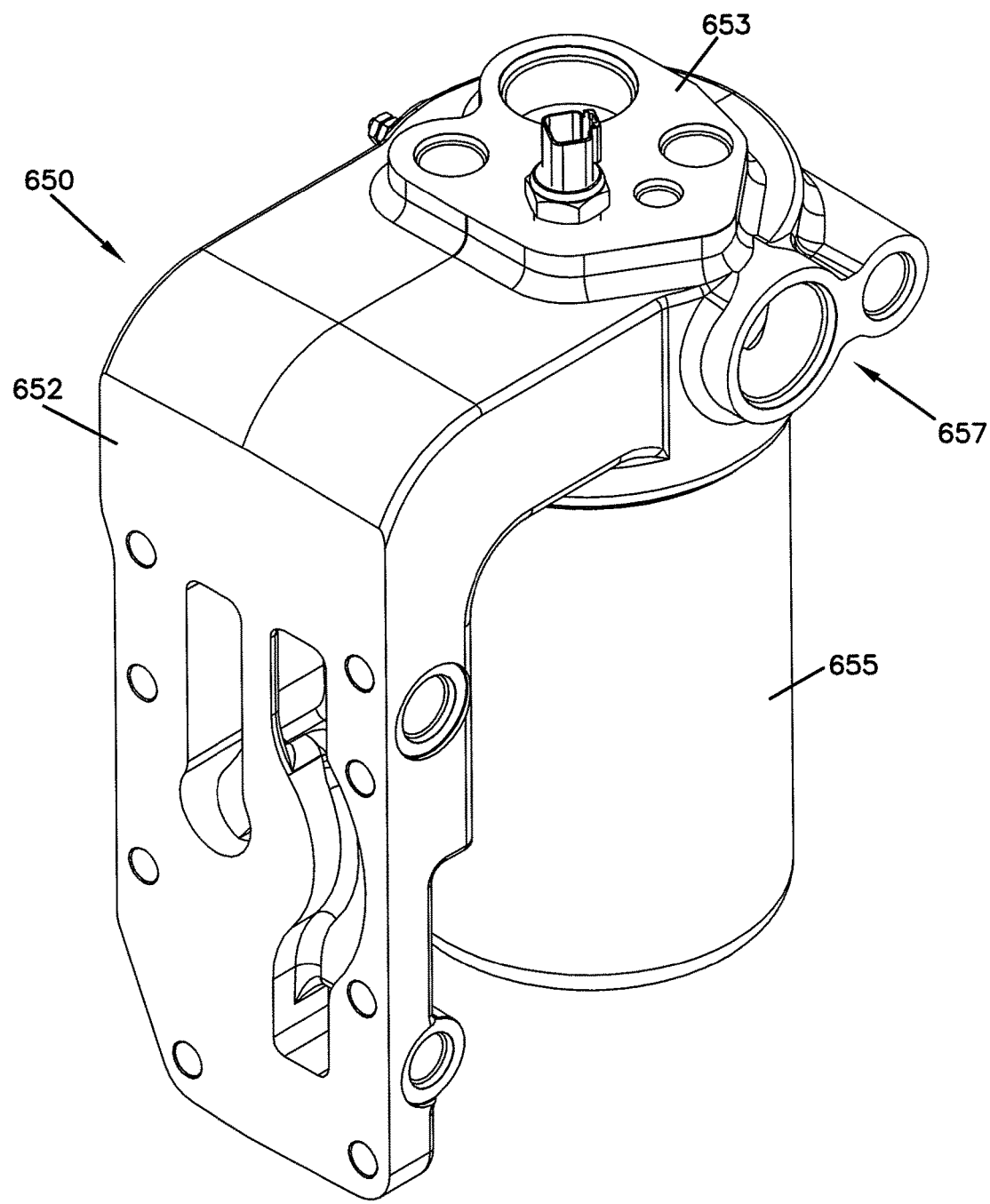
FIG. 58 is a schematic top perspective view of a componentry depicted in FIG. 57.

In FIG. 58, a top perspective view of arrangement 650 is depicted. Flow port arrangement 657 is viewable. Arrangement 657 indicates where liquid flow lines can be attached to the filter head 653.

Figure 59:
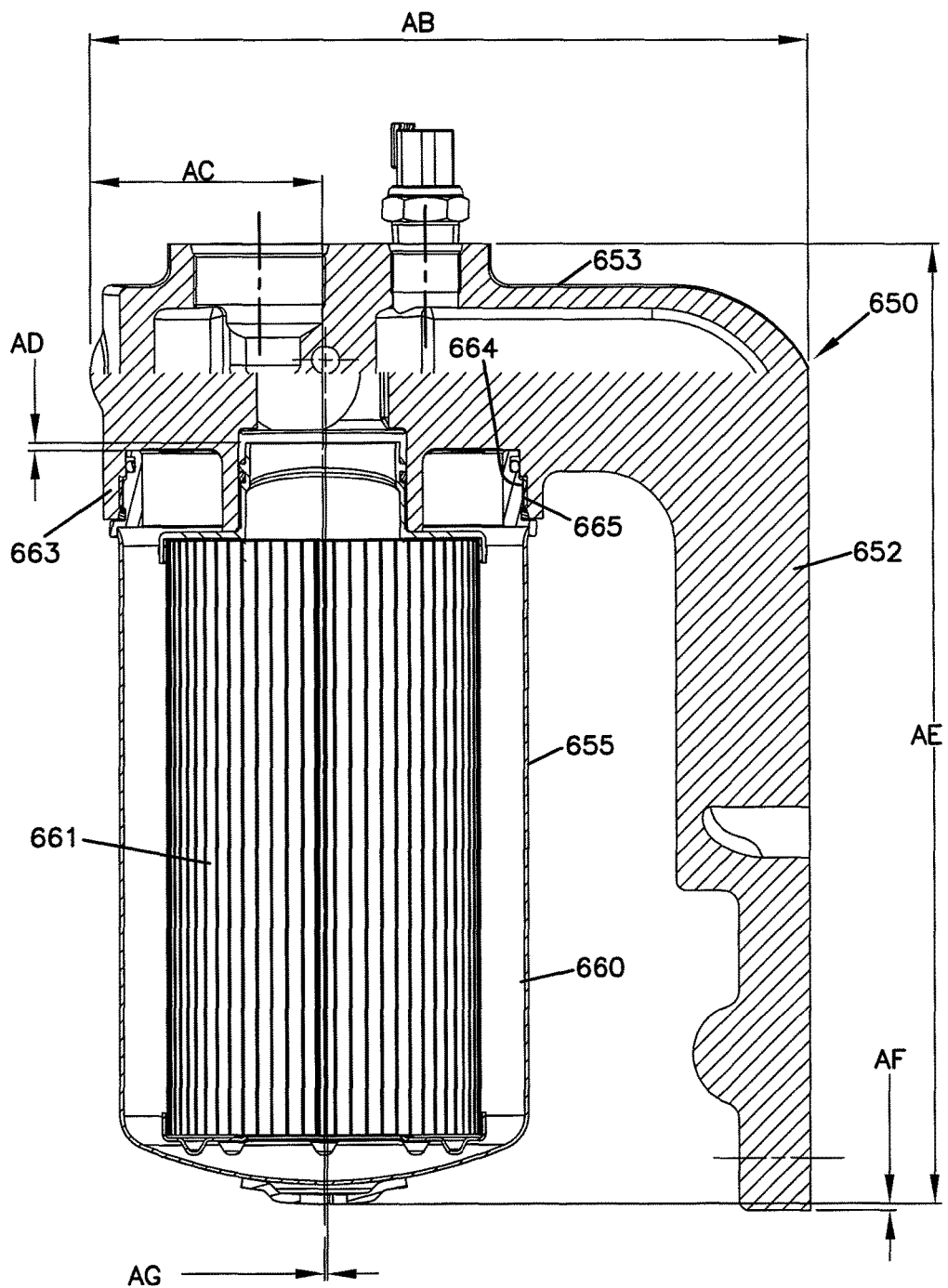
FIG. 59 is a schematic cross-sectional view of the componentry depicted in FIGS. 57 and 58.

In FIG. 59, a schematic cross-sectional view of the assembly 650 is provided. Upon examination of FIG. 59, one can see that liquid filter assembly 655 comprises housing 660 and internally received filter cartridge 661. The housing 660 is removably secured to mounting collar 663 on filter head 653. The mounting collar 653, for the arrangement depicted, has internal threads 664; and, the housing 660 has externally directed threads 665, for engagement. Alternate arrangements are possible.

Figure 60:
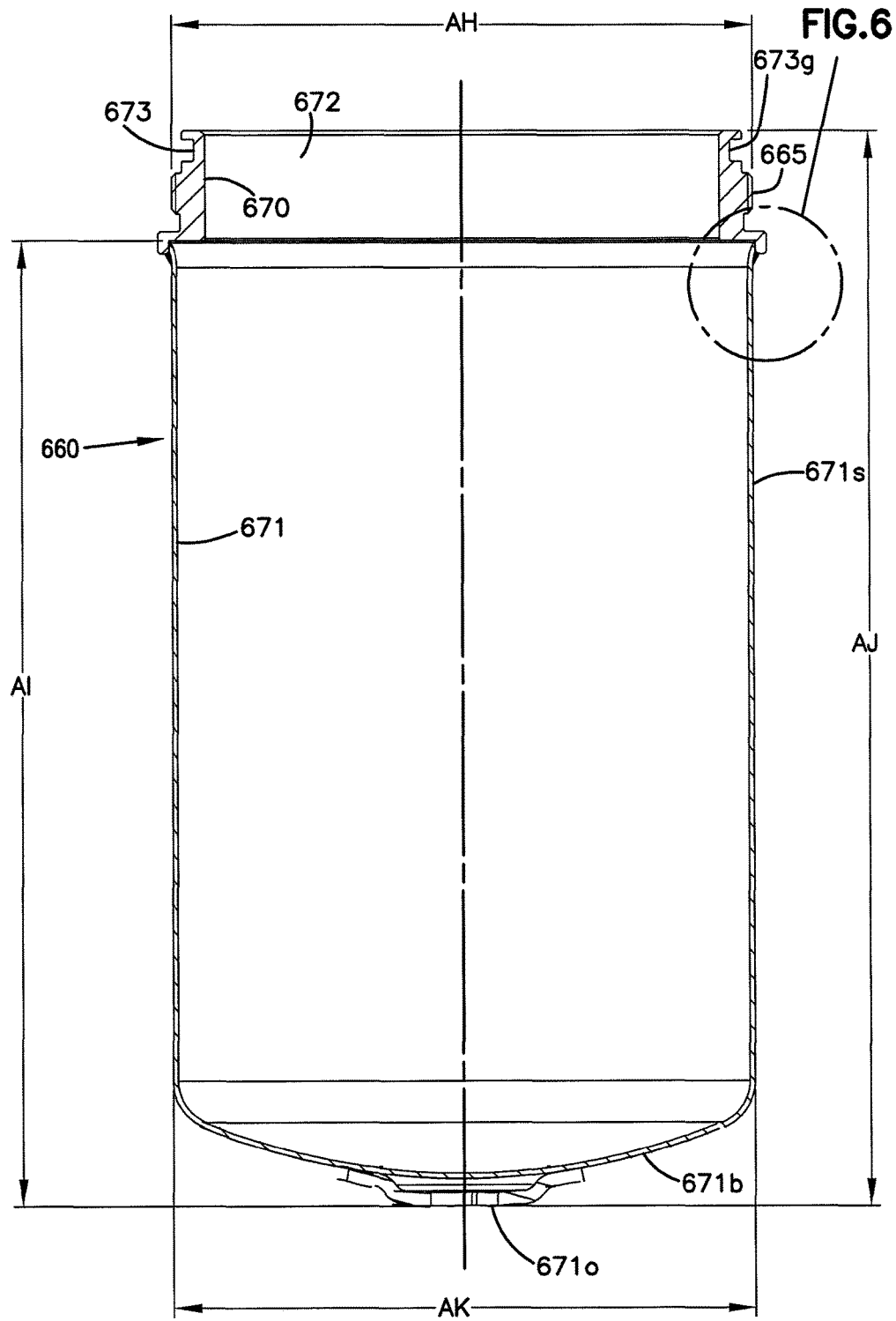
FIG. 60 is a schematic cross-sectional view of a housing component of the assembly of FIGS. 57-59.
Figure 61:
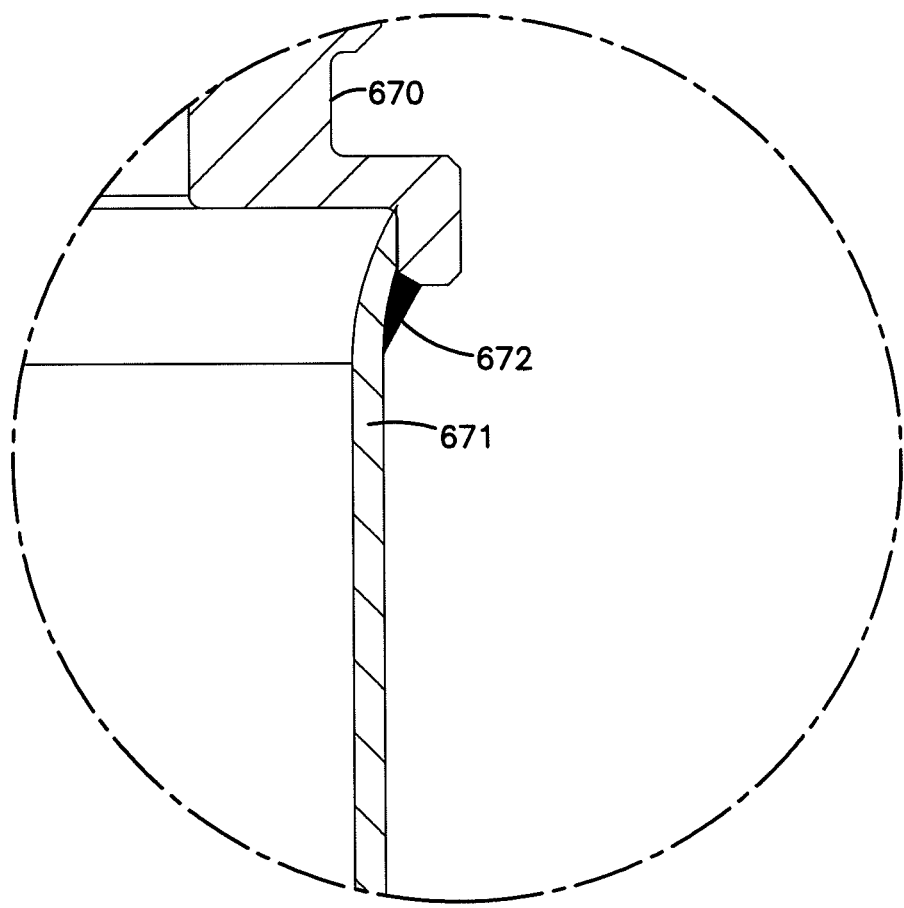
FIG. 61 is a schematic enlarged fragmentary view of a selected portion of FIG. 60.
Figure 62:
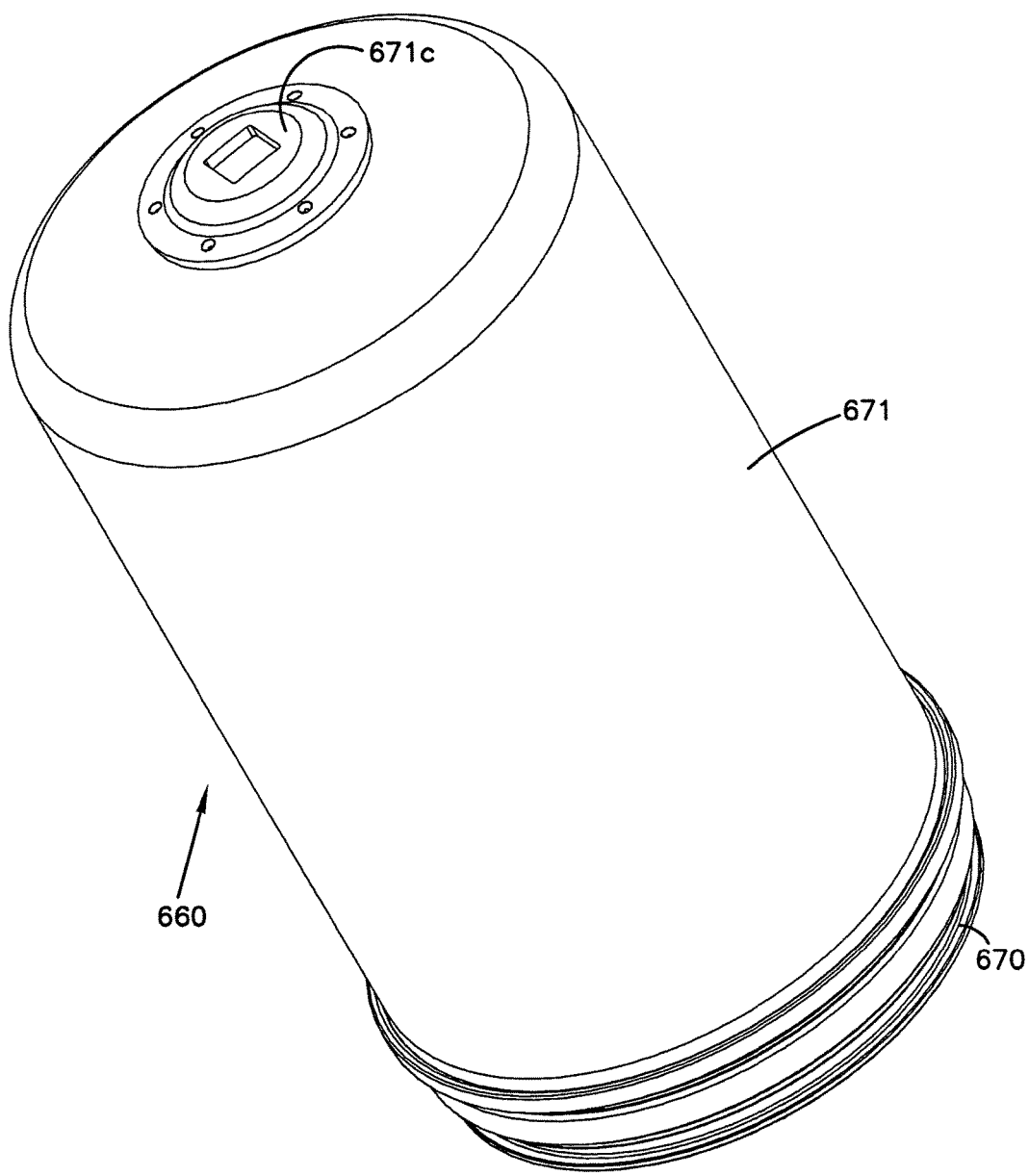
FIG. 62 is a schematic bottom perspective view of the housing component of FIG. 60.

Attention is now directed to FIGS. 60-62, in which the housing 660 is viewable. Referring first to FIG. 60, in which the housing 660 is shown in cross-sectional view, it can be seen that the housing 660 comprises mounting ring 670 and housing sidewall 671. The mounting ring 670 includes: external threads 665, central aperture 672; and, seal mount 673. For the example housing 660 depicted, the seal mount 673 comprises an o-ring receiving groove 673g. A seal positioned within the o-ring sealing groove 673g would be oriented to seal to mounting ring 663, FIG. 54, during mounting.

The housing sidewall 671 includes a side portion 671s and a bottom 671b. The sidewall 671 can be secured to the ring 670, for example, by welding.

In bottom 671b is provided a nut plate 671c engageable by a tool to facilitate mounting and dismounting housing 660 from filter head 653.

In FIG. 61, an enlarged fragmentary view, showing a joint between the sidewall 671 and the ring 670 is depicted.

In FIG. 62, a bottom perspective view of the housing 660 is provided. Along the bottom 671b, one can see nut plate 671c In FIGS. 63-66, filter cartridge 661 is viewable.

Figure 63:
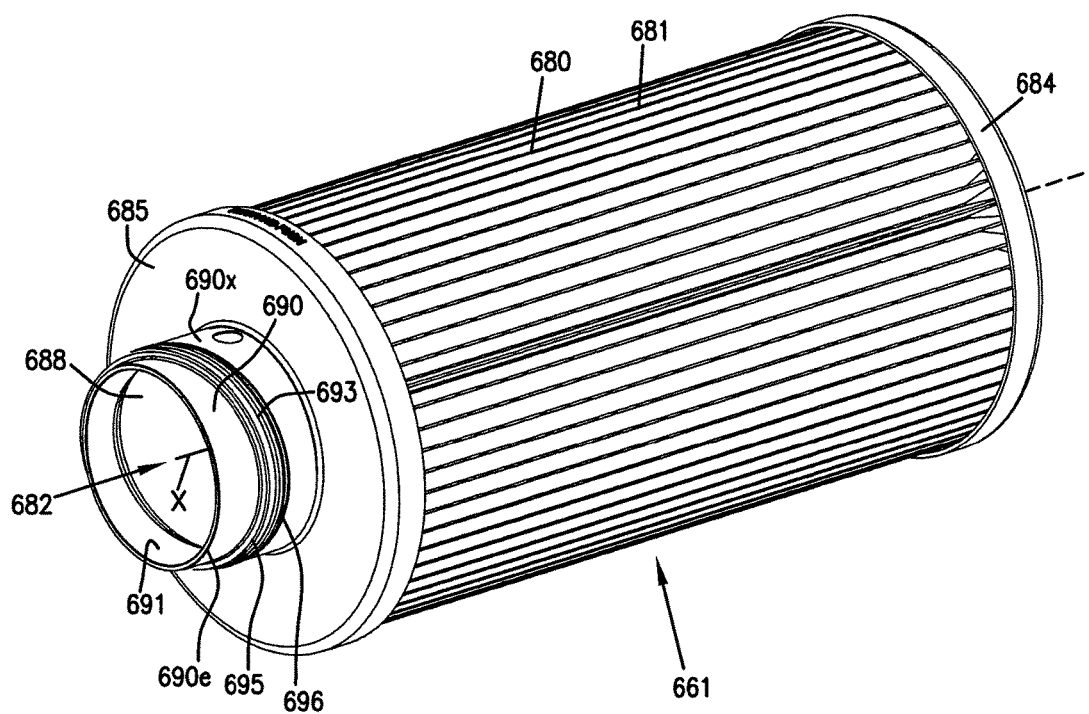
FIG. 63 is a schematic perspective view of a cartridge component usable in the assembly of FIGS. 57-59.

Attention is first directed to FIG. 63, in which an outlet end perspective view of cartridge 661 is provided. In general, the cartridge 661 comprises a media pack 680 including media 681 surrounding and defining an open filter interior 682. The media 681 is shown extending between first and second opposite end caps or end constructions 684, 685. For the example depicted, end construction 684 is closed, but includes a bypass valve arrangement therein, discussed below. End cap 685 is open, having central aperture 688 extending therethrough, in fluid flow communication with open interior 682.

Positioned on end cap 685, and extending in a direction away from end cap 684, is provided projection or spigot 690. Projection or spigot 690 surrounds and defines an open interior 691 in fluid flow communication with interior 682. On exterior surface 690x of spigot 690 is included a seal arrangement 693. A variety of arrangements can be used for seal arrangement 693. The particular seal arrangement 693 depicted, comprises an o-ring seal 695 positioned within a groove 696.

The o-ring 695, and in general with seal 693 is oriented in a plane extending generally at an acute angle to a plane orthogonal to central axis X of cartridge 661. The acute angle is typically at least 5°, usually not greater than 40°, and typically within the range of 5°-20°, inclusive, usually within the range of 7°-15°, inclusive.

It is noted that the projection or spigot 690 has an end 690e remote from the media pack 680 which in general defines a plane orthogonal to central axis X. In an alternative example, end 690e, for example can be provided with a beveled definition, for example, analogous to that for end 564, FIG. 41.

Figure 64:
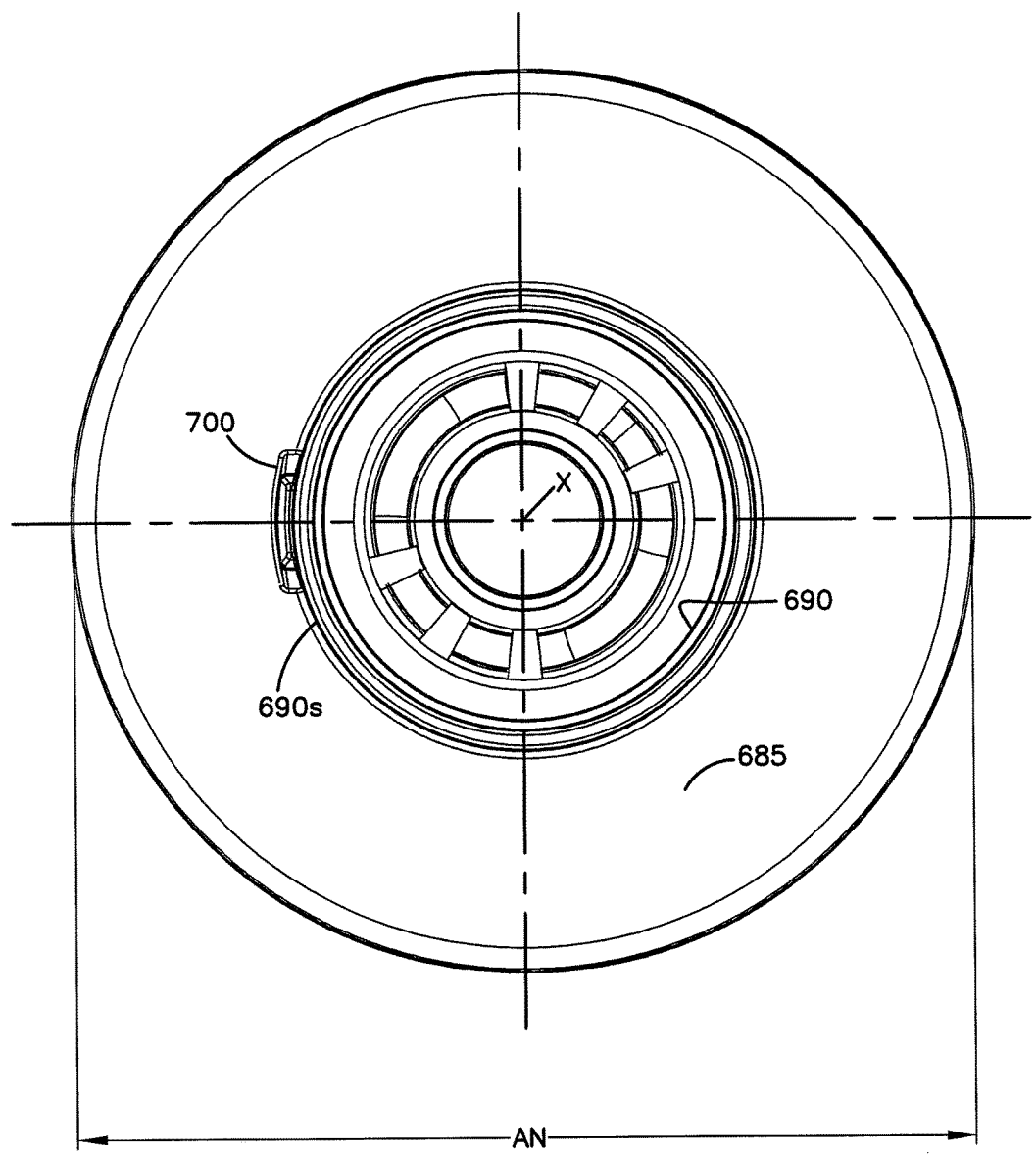
FIG. 64 is a schematic plan view of the cartridge component of FIG. 63.

Attention is now directed to FIG. 64, a plan view of cartridge 661 taken generally directed toward end construction 685. Here projection 700 projecting radially away from central axis X and surface 690s can be seen. The projection 700 operates as a first non-seal member of a projection/receiver rotational alignment arrangement for the assembly arrangement 655. A second member is positioned on the filter head 653. The second member, for example, can be generally as described and depicted herein above.

Figure 65:
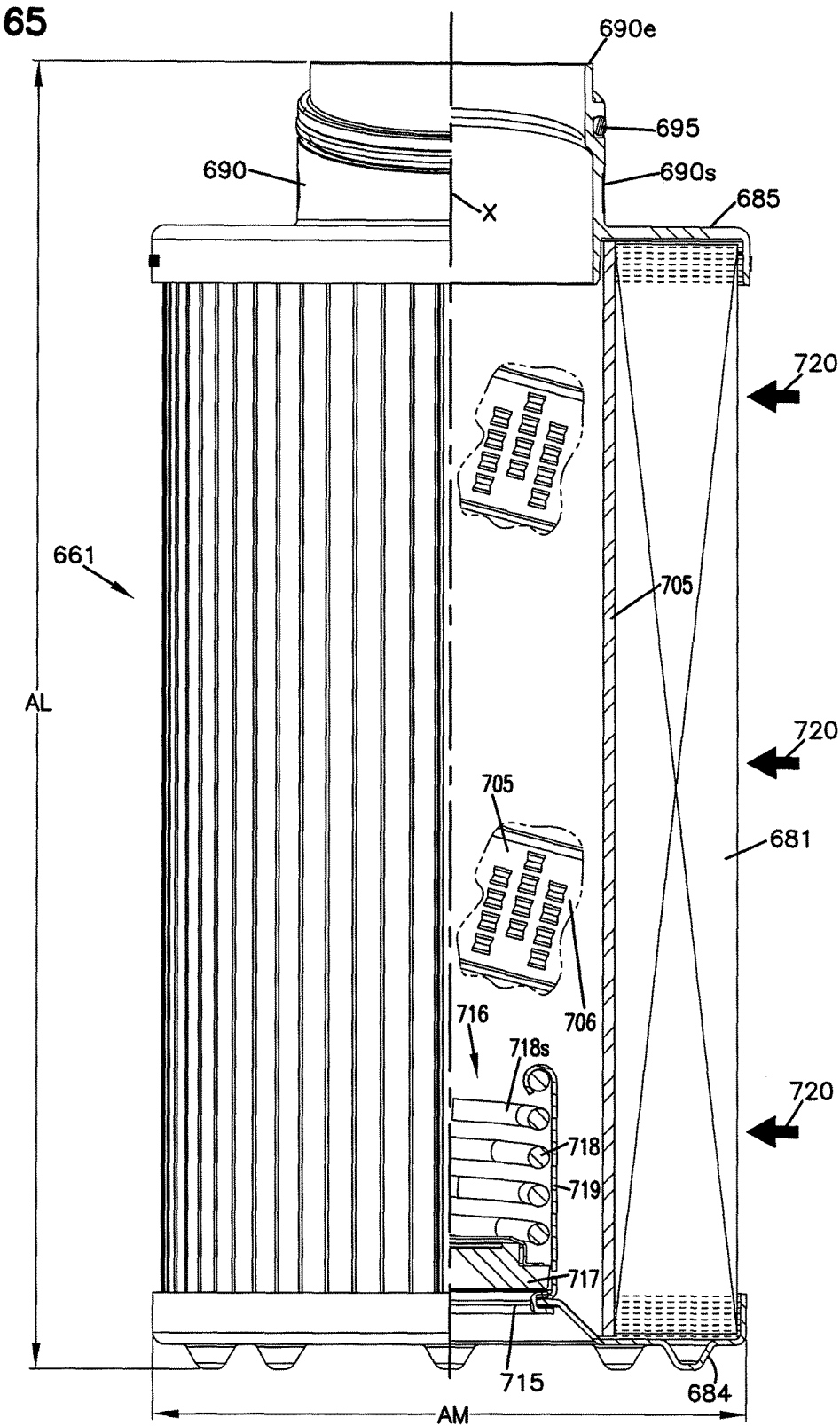
FIG. 65 is a schematic side elevational view of the cartridge component of FIG. 63 depicting selected portions shown in cross-section.

Attention is now directed to FIG. 65, a side elevational view of cartridge 661, with portions broken away to show internal detail and other portions depicted in fragmentary. Referring to FIG. 65, the media 681 can be seen surrounding inner liner 705. The inner liner 705 is a permeable or perforate member through which liquid cam flow. In the example depicted, the liner 705 comprises a spiral around perforated liner 706.

Referring to FIG. 63-65, it will be understood that the seal arrangement 695 is configured to pass above projection member 700, i.e. so that projection member 700 is positioned between the seal arrangement 695 and the media pack 681. This helps ensure that unless the projection member 700 is aligned appropriately with the receiver in the filter head, the cartridge 661 cannot be fully installed.

Figure 66:
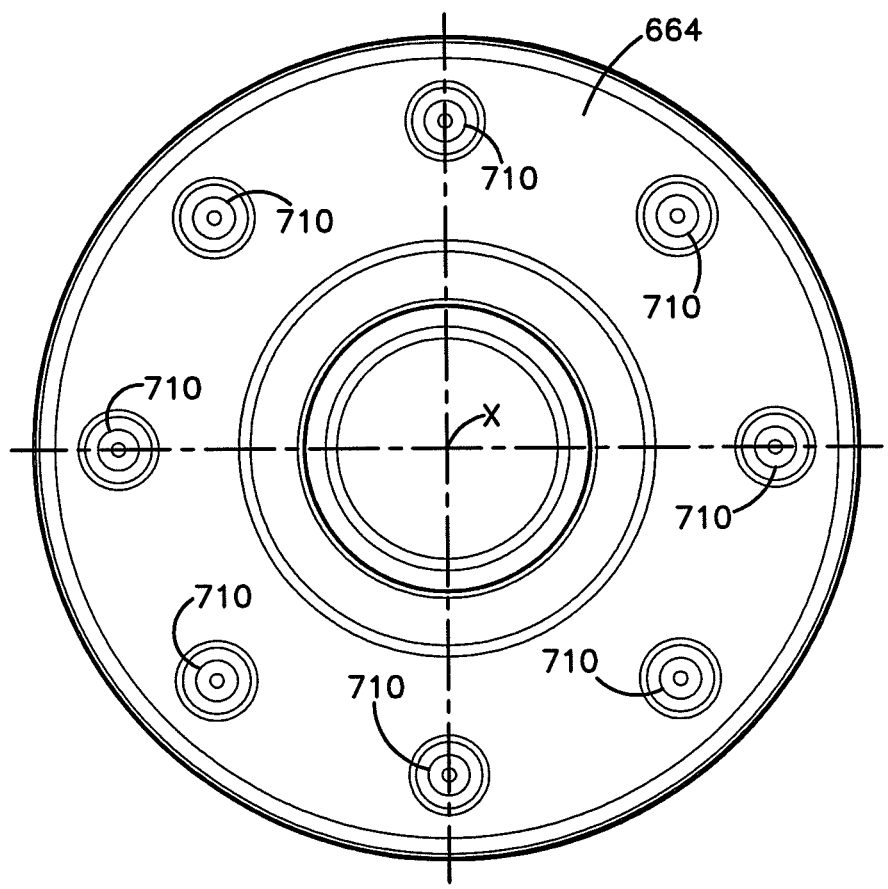
FIG. 66 is a schematic end view of the cartridge of FIG. 66.

In FIG. 66, a bottom plan view of cartridge 661 is provided. A plurality of axial spacers projections, radially spaced from one another is shown at 710. The projections 710 are also viewable in FIG. 65 and comprises spacers.

Referring again to FIG. 65, it can be seen that end cap 682 has an aperture 715 therethrough, closed by a bypass valve arrangement 716, comprising a valve head 717 biased in place by a biasing arrangement 718 surrounded by valve frame 719. For the example arrangement depicted, the bypass valve arrangement 716 uses, as a biasing member 718, spring 718s.

The cartridge 661 is generally configured for out-to-in flow during filtering, as shown by arrows 720. Thus, should the pressure outside of the cartridge reach a sufficiently high level, valve member 717 will be biased away from aperture 717 opening the aperture 715 to flow of liquid therethrough, bypassing the media 681. This could occur, for example, if the media 681 becomes sufficiently occluded.

D. An Additional Example of a Variation in an Intank Arrangement, FIGS. 67-73

Figure 67:
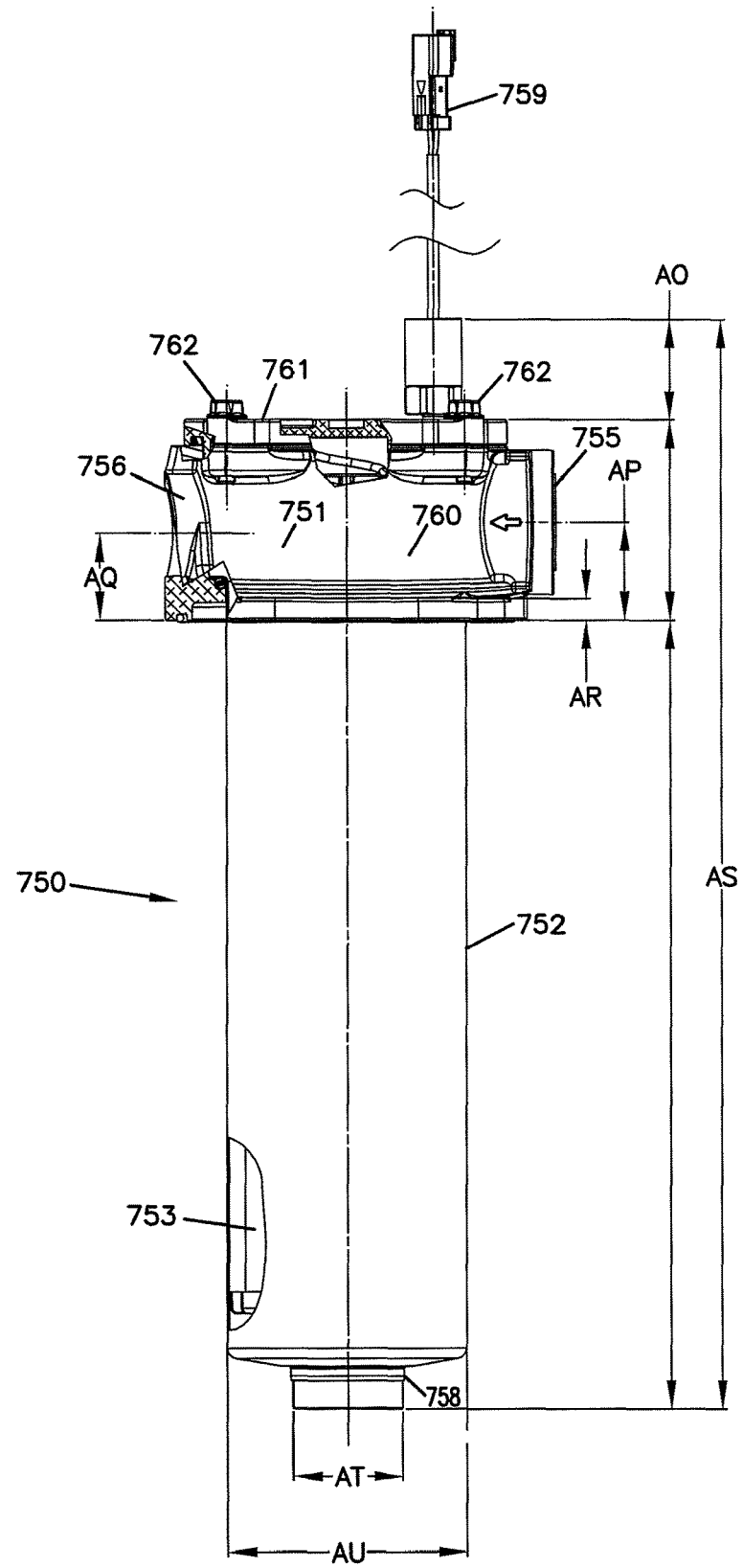
FIG. 67 is a schematic side elevational view of a seventh liquid filter assembly according to the present disclosure, with selected portions broken away or exploded to indicate detail.

Attention is first to FIG. 67. In FIG. 67 at 750 is depicted an intank liquid filter assembly. The intank liquid filter assembly 750 includes a filter head 751, a housing 752 and a filter cartridge 753 received within the housing.

The filter head 751 includes a liquid flow inlet arrangement 755 and a liquid flow outlet arrangement 756. Liquid to be filtered then enters through inlet arrangement 755 is directed into the housing 752, through filter cartridge 753; back into the liquid filter head 751 and outwardly through the liquid filter outlet arrangement 756. In this manner, the intank filter assembly 750 is analogous go the intank filter assemblies previously described.

The housing 752 includes a lower flow aperture 758 analogous to previously described in-tank assemblies.

In FIG. 67, at 759, is provided electrical communication between equipment such as a restriction pressure measurement device within filter head 751 and a remote location.

In general, liquid filter head 751 comprises a body 760 and a removable cover 761. When bolts 762 are loosened, cover 761, which serves as an access or service cover, can be removed from a remainder of filter head 751, allowing for access to the internally received cartridge 753.

Figure 68:
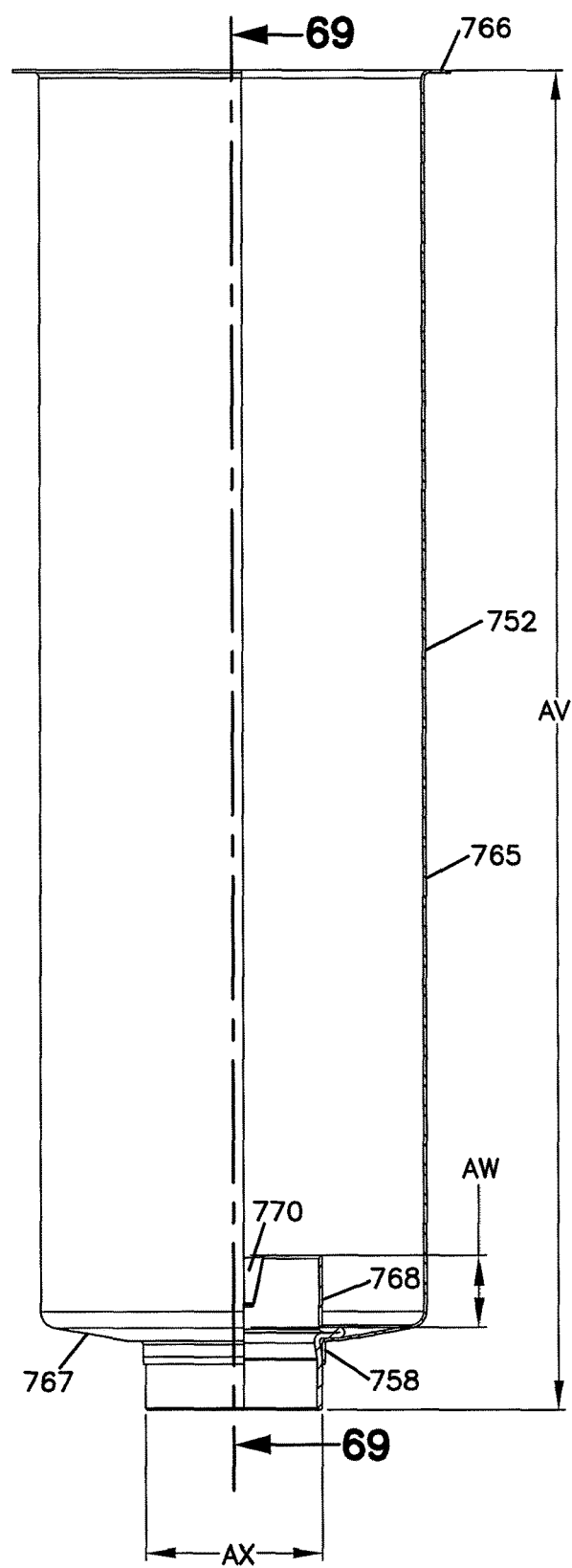
FIG. 68 is a schematic side elevational view of a housing component of the assembly of FIG. 67, with selected portions shown in cross-section.
Figure 69:
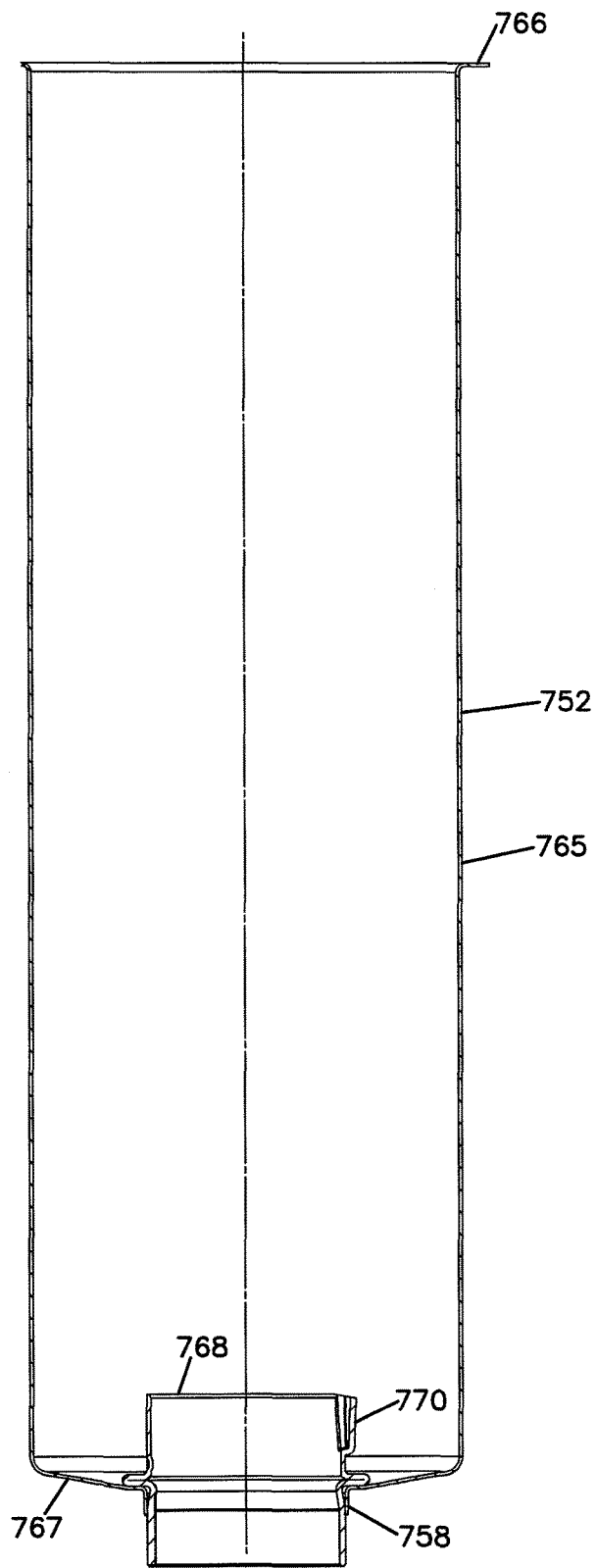
FIG. 69 is a schematic cross-sectional view of the component of FIG. 68 taken generally along line 69-69 thereof.
Figure 70:
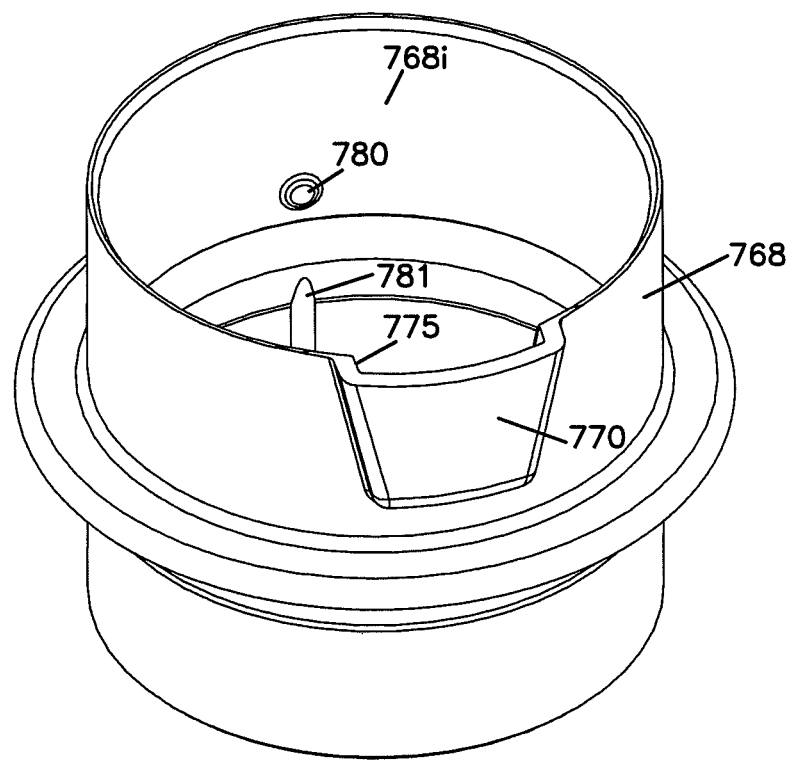
FIG. 70 is a schematic top perspective view of a flow collar member depicted in FIGS. 68 and 69.

In FIG. 68-70, housing 752 and components thereof are viewable.

Referring first to FIG. 68, the side elevational view is provided, with portions broken away and showing cross-sections. Housing 752 includes a body portion 765 defining an upper rim 766, surrounding an opening; and, a low housing bottom 767. Positioned within housing bottom 767 is a seal adapter or flow collar 768, analogous to flow collars previously described, except as detailed below.

In FIG. 69, a cross-sectional view is provided at right angles to the view of FIG. 68. Flow collar 768 can be seen as having an outward projection 770. The outward 770 can be generally analogous to that of the previously described in-tank assemblies.

Attention is now directed to FIG. 70, in which flow collar 768 is shown. It can be seen that projection 770 provides a receiver space 775 comprising a portion of a non-seal projection/receiver arrangement. Also along inner surface 768i member 768 defines a seal region or seal engagement region. It is noted that opposite projection 770 is provided member 780 (in this example a projection) which is positioned to inhibit sealing by a seal member at that location. The flow collar 768 can comprise a metal tube, machined where sealing is to occur. At 781, a weld seam is shown.

Figure 71:
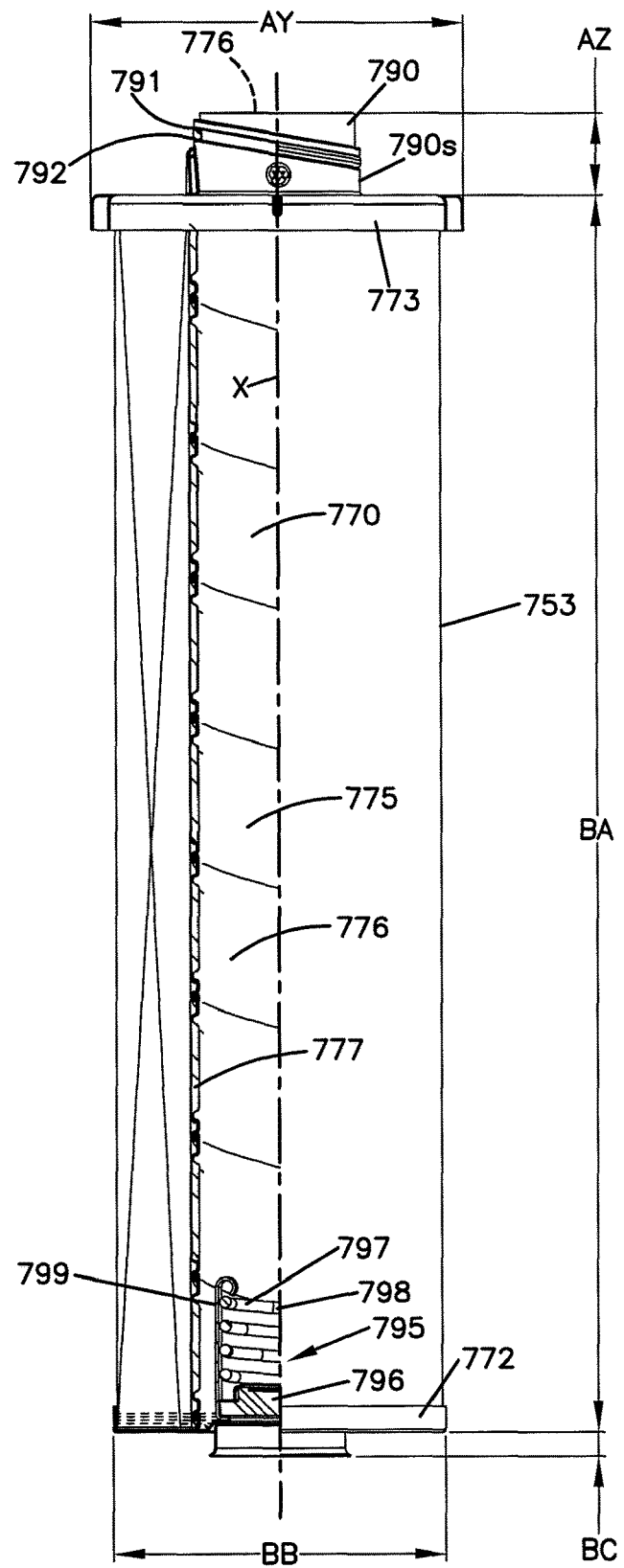
FIG. 71 is a schematic side elevational view of a filter cartridge usable in the assembly of FIG. 67.

Attention is now directed to FIG. 71, a side elevational view of cartridge 753 is provided with portions broken away to show internal detail.

Referring to FIG. 71, cartridge 753 includes a media pack 770 extending between first and second end construction 771, 772. The media pack 770 generally comprises media 775 for example pleated media, surrounding and defining an open filter interior 776. For the example depicted, the media 775 surrounds an inner liner 777 which is perforate or porous. The example liner depicted comprises a spiral around perforate member, although alternatives are possible.

It is noted that when cartridge 753 is installed, end cap 773 is directed downwardly and end cap 772 upwardly, i.e. the opposite orientation shown in FIG. 71. End construction 773 includes projection or spigot 790 which surrounds and defines a flow passageway with interior 776. The spigot 790 has an outer surface 790s on which is positioned a seal arrangement 791. In the example depicted the seal arrangement 791 comprises an o-ring positioned in receiving groove 792 and positioned in a plane generally not parallel to a plane orthogonal to central axis X. Typically, the acute angle of extension will be at least 5°, usually not more than 40°, typically within the range of 5°-20°, and usually 7°-15°, inclusive.

Attention is also directed to end cap 772, which is a closed end construction, closed by a bypass valve arrangement 795 which can be generally analogous to previously described bypass valve arrangements comprising valve member 796 secured in place by biasing arrangement 797, i.e. spring 798, mounted within frame 799.

Figure 72:
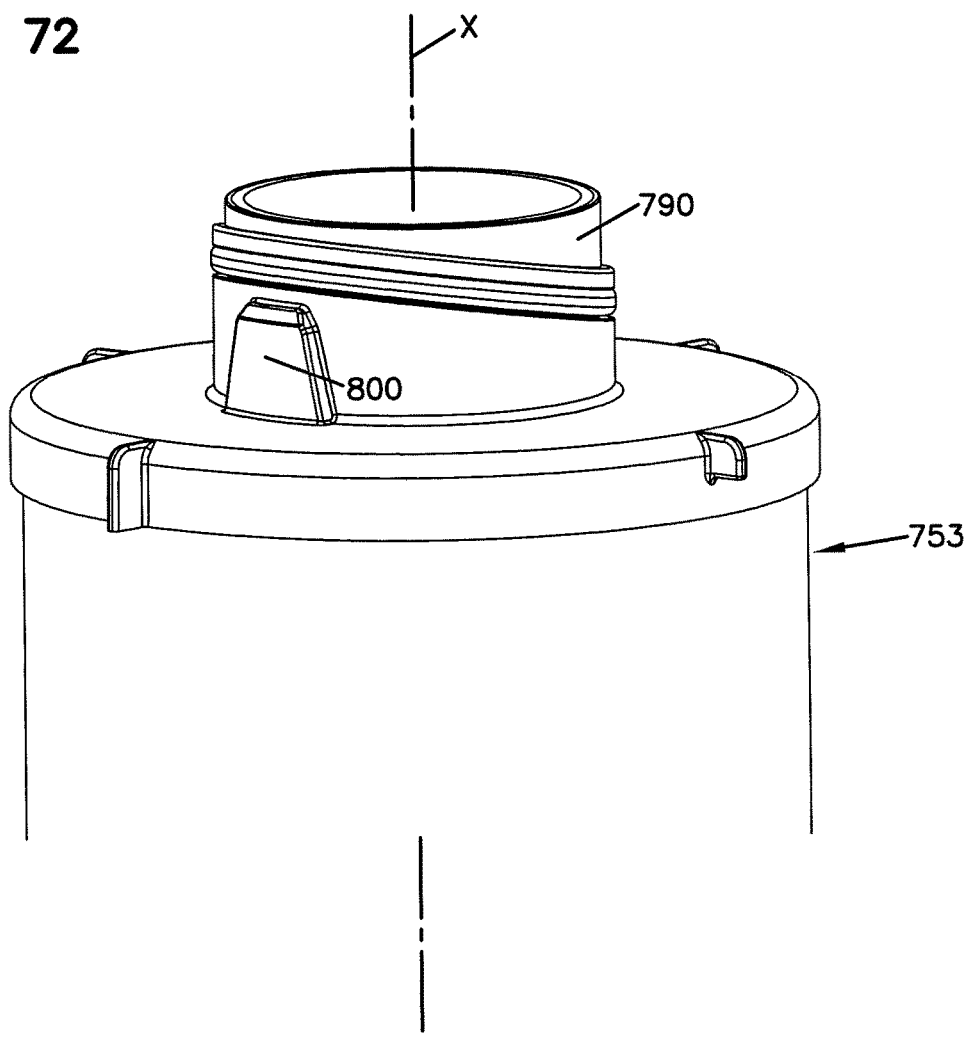
FIG. 72 is a schematic enlarged fragmentary perspective view of a portion of the cartridge component of FIG. 71.

Attention is now directed to FIG. 72, in which a fragmentary perspective view of a selected portion of cartridge 753 is provided. In FIG. 72, spigot or projection 790 can be seen as having a radial projection 800 thereon. The projection 800 comprises a second non-seal member of a radial alignment projection/receiver arrangement. It is sized and configured so that projection 790 can only be pushed into flow collar 768, when projection 800 is radially aligned with receiver 770, FIG. 70. When this occurs the seal arrangement 791 is appropriately aligned for sealing with surface 768. In general, then, the radial alignment projection/receiver arrangement is analogous to that described above in connection with previous embodiments.

Figure 73:
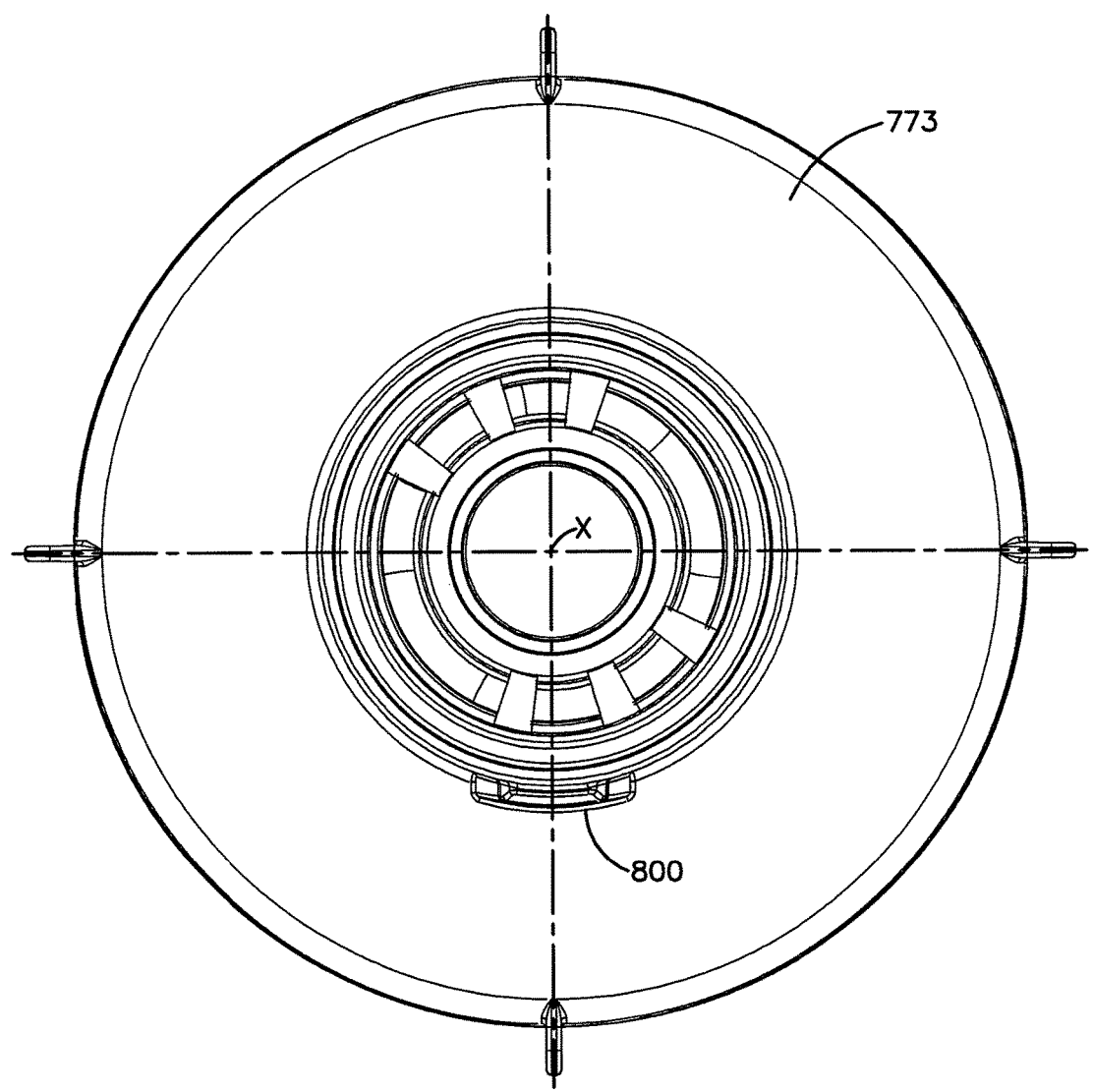
FIG. 73 is a schematic plan view of the cartridge component of FIG. 71.

In FIG. 73, a plan view of end member 772 is provided.

E. Selected Additional Variations, FIGS. 74, and 75

Figure 74:
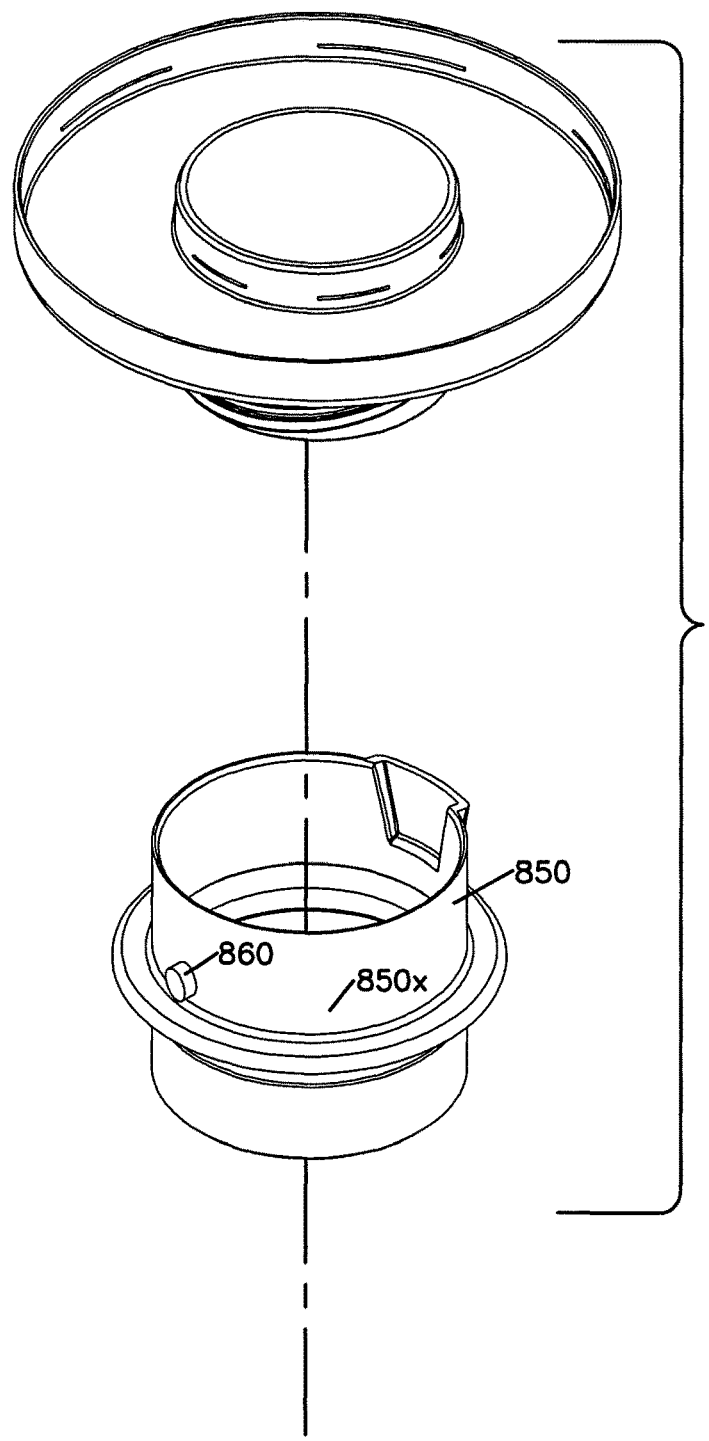
FIG. 74 is a schematic depiction analogous to FIG. 15, but showing a selected alternate feature.

In FIG. 74, a variation from the arrangement of FIG. 15 is depicted. Here, collar 850 has, an outer surface 850x with projection 860. The projection 860 helps ensure that a seal member cannot be positioned around outer surface 850x of collar 850. This helps ensure that the cartridge used with collar 850 is the appropriate cartridge. This variation then can be implemented with the embodiments other described squares.

Figure 75:
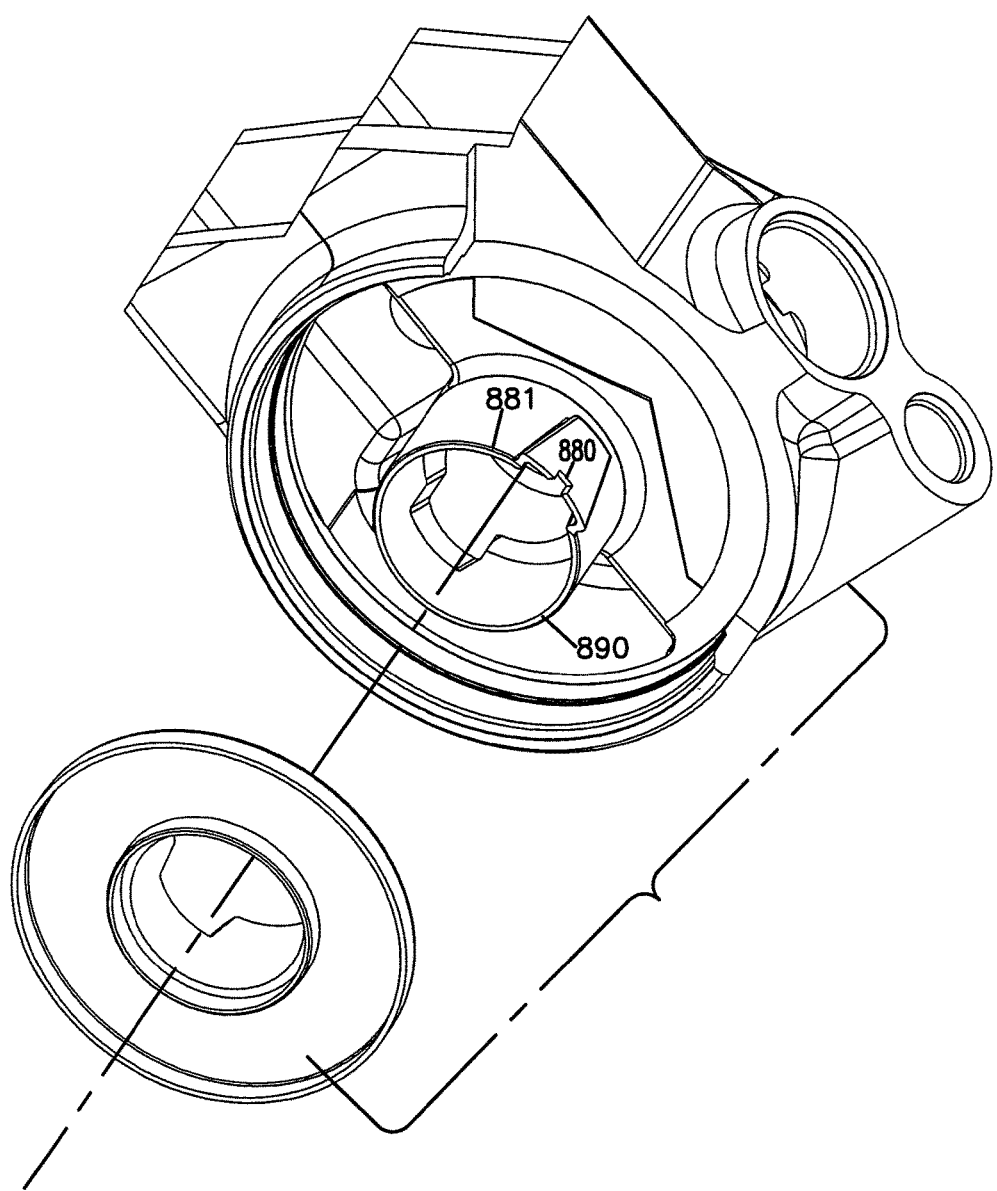
FIG. 75 is a schematic depiction analogous to FIG. 29, but depicting an alternate feature.

In FIG. 75, a variation of FIG. 29 is depicted, to advantage. In particular, and referring to FIG. 75, at conduit member or flow collar 881 are shown as having a notch, recess, or slot therein. This notch, recess, or slot prevents end surface 890 from being perceived as a surface against which a seal can be provided. This helps ensure that a cartridge used with the filter head depicted in FIG. 75 is an appropriate cartridge. This feature can be implemented with any of the configurations characterized herein, if the notch, slot, or recess is appropriately positioned.

F. Example Dimensions

It is noted that in selected ones of FIGS. 34-75, some dimensions are indicated. The example dimensions provided in this section, are meant to indicate example dimensions of a usable system. Of course, the techniques described herein can be applied in a wide variety of systems with alternate features and dimensions. The example dimensions are as follows: in FIG. 45, angle AA=at least 5°, typically at least 7°, usually not more than 40°, preferably not more than 20°, often no more than 15°, and in the example shown 12°; in FIG. 59, AB=229 mm; AC=74 mm; AD=2.5 mm; AE=306.8 mm; AF=2.3 mm; and, AG=1 mm; in FIG. 60 AI=216.1 mm; AJ=240.6 mm; and, AK=129.9 mm; in FIG. 64, AN=104 mm; in FIG. 65, AL=227 mm; and, AM=103 mm; in FIG. 67, AO=46.5 mm; AP=45 mm; AQ=40 mm; AR=10 mm; AS=501 mm; AT=50 mm; and, AU=110 mm; in FIG. 68, AV=382 mm; and, AX=50 mm; in FIG. 71, AY=106.5 mm; AZ=23.5 mm; BA=354 mm; BB=95 mm; and, BC=7 mm.

V. Some General Comments and Observations

According to the present disclosure: liquid filter assemblies; features thereof; components for use in liquid filter assemblies; and, methods for assembly and use are described. In specific examples described herein, example such componentry and features are described and depicted in detail. It is noted that there is no requirement that an assembly, method, feature or component include all of the features characterized herein, in order to obtain some benefit in accord with the present disclosure. In addition, variations from the specific configurations described can be practiced, while obtaining at least some of the benefits described herein.

According to first aspect of the present disclosure, a liquid filter cartridge is provided. The cartridge is generally configured for use, in installation, in removable sealing engagement with a liquid flow collar of a liquid filter assembly. By the term "removable sealing engagement" in this context, and variants thereof, it is meant that the filter cartridge is configured to engage the liquid filter collar with sealing therebetween, but is also configured to be removed (separated) from the liquid flow collar, for example during a servicing operation, without damage to either the liquid filter cartridge or the liquid flow collar. As will be understood from detailed descriptions presented herein with respect to the examples, the liquid flow collar can be positioned in a variety of liquid filter systems, at a variety of locations.

In general terms, the liquid filter cartridge includes filter media surrounding an open filter interior. The filter media generally: defines first and second opposite ends; and, surrounds and defines a central axis. The filter media can be configured with a variety of perimeter shapes, an example perimeter shape depicted herein being generally cylindrical. However, alternate shapes, for example conical or shapes of non-circular cross-section can be used with principles according to the present disclosure. The term "central axis" in this context, is generally meant to indicate an axis extending through the open filter interior, and also through a housing with which the cartridge is used, in a direction between the opposite ends of the filter media.

The media can be a variety of types usable with liquid filter operations. The media can be pleated or non-pleated. The media can be positioned around a central support core, typically a perforated or perforate core for liquid flow therethrough, if desired. The media can be provided with an outer liner if desired.

In general, the liquid filter cartridge includes a first end construction at the first end of the filter media. The first end construction can be configured, for example, as an end cap over the first end of filter media. The first end cap will typically be closed. The first end construction can include a bypass valve assembly thereon configured to selectively open to allow liquid flow into the open filter interior, through the end construction, without passage through the filter media, when a selected bypass condition is met. A typical selected bypass condition, for example, would be when the pressure differential across the media is sufficiently great, so that bypass flow (around the media) is desired. The bypass may be desirable, for example, during over-pressurization across the media normally caused by cold starts or excessive contaminant. The bypass protects the media against damage, and also protects the equipment involved.

A second end construction is positioned at the second end of the media. The second end construction can also be configured as an end cap, sealingly secured to the second end of the media.

The second end construction is generally open. By this it is meant that the second end construction includes a liquid flow passageway therethrough, providing for liquid flow communication between the open filter interior and an exterior environment, without passage through the media. In general, the second end construction includes a central spigot or projection projecting away from the media and surrounding and defining a central liquid flow aperture in liquid flow communication with the open filter interior.

A seal member is positioned on the spigot. Preferably the seal member is a radial seal that defines a seal pattern non-orthogonal to a central axis of the media. By the term "seal pattern non-orthogonal to the central axis of the media" and similar terms, it is meant that the seal member does not provide for radial sealing in a shape that can be defined by a plane orthogonal to the central axis. For example when the seal pattern is planar, the plane defined by the seal would be generally extend at an angle to a plane orthogonal to the central axis. Although alternatives are possible, that angle typically is at least 5° usually at least 7° and is typically not more than 40° and usually not more than 20°. The seal member will typically be a radial seal, and can either be inwardly or outwardly directed. In examples depicted, the seal is outwardly directed, i.e. configured so that it forms a radial seal with a structure, when inserted inside of that structure. Alternates are possible.

A variety of arrangements can be used to form the seal. Example assemblies described herein are configured with a seal comprising an o-ring. However alternatives, for example molded-in-place seals, are possible. O-rings are convenient, for ease of assembly and use.

Typically, the seal arrangement or seal member on the spigot is configured to define a circular perimeter definition in (axial) projection. By this it is meant that a projected perimeter of the seal member, when viewed in the direction of a central axis, is circular.

In general terms, the second end construction includes a member of a projection/receiver rotational alignment arrangement positioned on the second end construction at a location to engage another member of the projection/receiver rotational alignment arrangement on a liquid flow collar, in selected rotational alignment, in use. By these terms, reference is made to a projection/receiver rotational alignment arrangement in an overall assembly in which the liquid filter cartridge is used. A member of that projection/receiver arrangement (i.e. a projection member or a receiver member) is provided on the second end construction of the cartridge. The other member of the projection/receiver arrangement (i.e. the receiver member or the projection member) is included in liquid flow collar of the assembly in which the liquid filter cartridge is used. In general terms, the projection/receiver rotational alignment arrangement is an arrangement that allows for engagement of the projection/receiver, only when the rotational orientation of the cartridge relative to the liquid filter cartridge is in a selected (i.e. preselected) orientation; i.e. the projection/receiver members interfere and do not allow sealing engagement until selected rotational orientation occurs. Typically, the projection/receiver rotational alignment arrangement is configured to allow sealing engagement only at one selected rotational orientation, however alternatives are possible.

It is noted that in an example, the projection/receiver rotational alignment arrangement can include both a projection member and a receiver member on the spigot, matable with a receiver member and a projection member, respectively, on the liquid flow collar.

Typically, the member of the projection/receiver rotational alignment arrangement on the second end construction is a "non-seal member." By this, it is meant the projection member is not part of the seal member itself, or the pattern defined by the seal member, but rather is another structure on the second end construction, for example a projection or receiver.

Example liquid filter cartridges are described and depicted in which the seal member defines a maximum extent of projection radially outwardly from the central axis that is no more than the maximum extent of the media radially outwardly from the central axis, and typically is no more than 80% of a maximum extent of projection of the media radially outwardly from the central axis. This term is generally meant to indicate that the seal in any direction does not projection outwardly from the central axis (in a direction perpendicular to the axis) further than the media, typically no more than 80% of a distance in which the media extends. Often the amount of this seal extension is no more than 60% of this amount of media extension. A similar observation is made for the typical spigot, including any projection thereon. This means that the radial extensions of the spigot and seal can be small relative to the cartridge media radial extension, and provide for advantageous use in a variety of equipment including in-tank assemblies and in-line assemblies involving housing secured to filter heads. Such arrangements are also convenient to manufacture.

The member of the projection/receiver arrangement on the central spigot, can be provided in a variety of configurations. One example configuration depicted, is an arrangement in which the member, sometimes characterized as a bump-out or projection, is a radially outwardly projecting projection positioned on an exterior surface of the central spigot. In an example depicted, a single such projection is used as the member. The projection is configured to inhibit insertion of the spigot into the liquid flow collar, unless the spigot (and thus the cartridge) is rotated into an orientation in which the projection (bump-out) on the spigot is properly rotationally aligned with a receiver recess on the liquid flow collar. An example such (bump-out) projection is depicted, which is positioned spaced from an end of the central spigot. With such an arrangement, the seal member can be configured with a portion extending across a portion of the spigot located between the (bump-out) projection and the end tip of the central spigot. Thus, a good seal is ensured even in the presence of the (bump out) projection.

In an example depicted, the (bump-out) projection defines a perimeter with two opposite sides that converge in extension toward the end tip of the central spigot. A particular example is depicted, in which these two opposite sides extend between a base directed toward the media and an end, opposite the base, directed toward the end tip of the central spigot. An example such perimeter shape is configured as a trapezoid or trapezoidally-shaped member, wherein the base is wider than the end. Such features in the shape facilitate sliding engagement between the spigot and a liquid flow collar and a filter assembly.

An example alternate member of a projection/receiver on the second end construction is described and depicted. This example alternate comprises a radial positioning collar positioned on the second end construction, which is oriented around the liquid flow collar, when the spigot is projected into the liquid flow collar. The radial positioning collar in the second flow construction includes a receiver gap therein, of appropriate size to allow for radial alignment with a projection on an exterior of the liquid flow collar. Typically the receiver gap in the collar on the second filter construction extends over a radial arc of at least 30°, and typically not greater than 180°, although alternatives are possible.

A third example configuration of a member of a projection/receiver arrangement that can be positioned on the second end construction, is a receiver notch in the spigot positioned to extend from engagement (intersection) with an end tip on the spigot in a direction toward the media. Such a notch can be used, for example, as a receiver to only receive therein a projection member on the liquid flow collar, when the notch is rotated into appropriate radial alignment therewith. It is noted that the second end construction on the filter cartridge can include more than one member of a projection/receiver arrangement, if desired. Thus, some of the variations described can be used together in a single cartridge if desired.

Yet another example configuration of a member (of a projection/receiver arrangement) that can be positioned on the second end construction, is a radially directed fin member on the second end construction positioned extending in a direction between the central spigot and an outer perimeter of the second end construction. Typically, such a radially directed fin member would be secured to, and engage, the spigot, would be directed toward the outer perimeter of the second end construction, but would not reach the outer perimeter of the second end construction. An example of such an arrangement is described, in which the member of the projection/receiver arrangement on the second end construction includes a radial alignment abutment member having an abutment surface. Further, the abutment in an example depicted, projects away from the media pack a distance further than at least a portion of the seal member closest to the media pack, leaving a collar-receiving gap between a portion of the radial abutment member and a portion of the spigot, the collar receiving gap being traversed by the radial fin member at a location between the gap and the media pack.

Further, in an example depicted, the radial abutment member defines a cam end remote from the media pack which is slanted from a peak, adjacent the abutment surface, toward the media pack; a cam end in an example depicted slanting at an acute angle of at least 30° and not more than 60°, and typically within the range of 40°-50°, inclusive.

In some example arrangements described herein, the central spigot includes an end tip having an end surface non-orthogonal to the central axis of the media. In an example depicted, the end tip generally defines an abutment peak which extends at an acute angle to a plane orthogonal to the central axis. In examples described, the abutment plane of such an arrangement extends at an abutment angle of at least 5° and not more than 40°, relative to the plane orthogonal to the central axis, typically at an abutment within the range of 5°-20°, inclusive, and often within the range of 7°-15°, inclusive.

Herein, an example second end construction is described which includes an outer perimeter having a housing-engagement radial projection arrangement thereon. This arrangement can be used with other features described herein, but is also suitable for the variety of types of cartridges including ones not having may of the above described features. The housing-engagement radial projection arrangement comprises a pair of spaced radially flexible tabs each having a radially outwardly-directing projection arrangement thereon. Further, typically each radially flexible tab has an upwardly directed, free, handle or manipulation end positioned to be manipulable to retract the projection arrangement radially inwardly. This can be used as a snap-fit engagement arrangement, between the liquid filter cartridge and a receiver recess arrangement in a housing, which the snap-fit arrangement can be readily disengaged or released, by biasing the handle or free end radially inwardly.

In some assemblies, the spigot includes a free or remote end from the media, which is not smooth and planar, for example which includes a notch therein.

In some assemblies, the filter cartridge can be used with a biasing member such as a coiled spring, engaging the first end construction on an exterior thereof. Such an arrangement can be used as an alignment or locator arrangement, to help ensure that the cartridge is properly oriented when installed, and also as a biasing member to ensure that the cartridge remains in its intended use orientation within an assembly in which it is used. Further, in some instances such a member can be used to provide an interference with closing of a liquid filter assembly, when the cartridge has not been rotated and sealed properly within the assembly.

Example filter cartridges are described, in which the first end construction includes a biasing member-receiving collar projecting in a direction away from the media and the second end construction. This collar is oriented for receipt therein of a portion of the biasing member. The collar can be configured with a end remote from the media flared outwardly, i.e. provided with a flare or flared and, to facilitate receipt of a coiled spring biasing or locator member therein, when used.

In some instances, the biasing member, for example a coiled spring, can be secured to the filter cartridge.

According to the present disclosure, a liquid filter assembly is provided which includes a liquid filter cartridge, for example having selected features described, and a liquid flow collar. The liquid flow collar defines a central liquid flow passageway with a central axis, and has a first member of a projection/receiver rotational alignment arrangement positioned thereon. The liquid flow collar also includes or defines a seal surface orientated to be sealingly engaged by the seal on the liquid filter cartridge. The seal surface is generally configured to define a seal pattern non-orthogonal to a central axis of the liquid flow collar. By this, an analogous definition to that used above to describe the seal member itself, is meant. For example, the seal surface, when configured to receive a radial seal, is oriented so that the seal pattern defined by that seal does not rest in a plane orthogonal to the central axis of the collar, but rather extends at an angle thereto, typically an angle with respect to a plane orthogonal to the central axis of at least 5° typically at least 7°, usually no more than 40° and typically no more than 20°. The seal surface is typically cylindrical, with a circular definition in axial projection.

A liquid filter cartridge is installed in the liquid filter assembly in operational engagement with the open filter interior of the filter cartridge, in liquid flow communication through the spigot on the second seal construction, with the liquid flow collar central liquid flow passageway; the seal member on the spigot in releasable sealing engagement with a seal engagement surface on a liquid flow collar; and, with the first member of the projection/receiver rotational alignment arrangement on the liquid flow collar engaged with a member on the projection/receiver rotational alignment arrangement on the second end construction, in selected rotational alignment between the cartridge and the liquid flow collar. The configuration can be such that there is only one rotational alignment in which the sealing can occur, although alternatives, i.e. arrangements allowing for more than one possible rotational alignment are possible with techniques described herein.

It is noted that the filter cartridge, and the overall assembly, can be configured for out-to-in flow during filtering. By this it is meant that the configuration is such that during filtering, the liquid to be filtered passes from outside the filter cartridge through the media to the interior of the filter cartridge, with the aperture in the second end construction being a filtered liquid flow outlet aperture. It is, however, noted that principles in accord with descriptions herein can be applied in arrangements configured for "in-to-out" flow during filtering, in which case the liquid to be filtered flows from interior of the cartridge through the media to the exterior of the cartridge during filtering, with the aperture or opening in the second end construction being a unfiltered liquid flow inlet aperture.

An assembly is described herein, in which the filter assembly includes a housing, which has a receiver recess arrangement therein, and the cartridge is provided with the radial projection arrangement positioned at an outer periphery of the second end construction, comprising a flexible tab arrangement, for example at least two (spaced) radially flexible tabs, the tabs being snap-fit to the receiver recess and being releasable therefrom by manipulation of a free or handle end of the tabs. A typical receiver recess would be a continuous groove in a sidewall of the housing, although alternatives are possible. These features can be used in conjunction with other components described herein, or can be separately used with alternate configurations of cartridges, housings, and flow collars. Methods of assembly and use of such snap-fit arrangement are also described.

As described herein above, principles described herein can be applied in an assembly in which the liquid flow collar is positioned on the housing of an in-tank filter assembly. By the term "in-tank filter assembly" and variants thereof, reference is meant to an assembly in which filter head is mounted on an exterior of a reservoir tank, with a portion of the housing projecting into the reservoir tank and allowing for liquid flow communication therewith.

It is also noted that the principles described herein can be applied in in-line filter assemblies (which are not in-tank filter assemblies), in which the assembly includes a liquid flow collar comprising a portion of a liquid filter head that is not the filter head of an in-tank filter assembly, and the liquid filter cartridge is positioned in the housing of a filter arrangement removably secured to the liquid filter head, for example by threaded engagement. Example such in-line assemblies include bowl/cartridge assemblies, in which the liquid filter cartridge is removably positioned in a housing or bowl.

Variations described herein include: providing the seal member on an exterior surface of the spigot; providing that the spigot is sized to project into the liquid flow collar; providing that the spigot includes a (bump-out) projection member on an outer surface thereof; providing that the spigot is joined by a radial seal providing that the liquid flow collar includes a recess (for example an internal (bump-out) receiver recess) into which the (bump-out) projection member is received. The (bump-out) projection on the spigot can be as generally characterized as above with respect to size and overall shape. Also, a radial alignment arrangement comprising an abutment surface on each of the spigot and flow collar, is described; the surfaces being juxtaposed when selected radial alignment occurs.

In an example system descried herein, the assembly includes: a service access cover; and, a biasing member positioned in extension between the first end construction on the filter cartridge and the service access cover. The biasing member can be a coiled spring secured to one of the access cover on the filter cartridge and biased against the other. An advantage can be obtained when the coiled spring is selected to be of sufficient length and compression resistance, to inhibit closing of the access cover unless the seal on the spigot is properly sealed to the liquid flow collar. The biasing member can also be used as an alignment member to help maintain cartridge portion and alignment.

Certain specific overall assemblies, with advantageous features, are depicted. For example a liquid filter cartridge configured for engagement and use with a liquid flow collar is described in which the liquid filter cartridge includes filter media surrounding an open filter interior and a central perforate core. The filter media has first and second, opposite, ends and defines a central axis. The media can be pleated.

A first closed end construction is provided at the first end of the media and a second open end construction is provided at the second end of the media, the second end construction comprising a central spigot projecting away from the media and surrounding and defining a central flow aperture in flow communication with the open filter interior. A radial seal member is positioned on the central spigot defining a seal pattern around the spigot that is non-orthogonal to the central axis of the media. The seal member typically defines a maximum extent of radial outward extension from the central axis that is no greater than, and typically no more than 80% of, the maximum extent of the media radially outwardly from the central axis; and, a (bump-out) projection member on the an exterior of the spigot is configured to engage the liquid flow collar in selected rational orientation between the cartridge and the liquid flow collar, in use.

An example liquid filter assembly is provided which includes such a cartridge, and also a filter head assembly including a base and removable access cover, the base having a lower aperture therein; and, the assembly including a housing sealed to the filter head and depending downwardly from the base, and through the lower aperture. The housing includes a sidewall and an open end remote from the filter head assembly. A liquid flow collar is positioned at the open end of the housing remote from the filter head assembly. The liquid flow collar includes an inner surface defining a seal surface configured for removable sealing with a seal on a filter cartridge defining a seal pattern non-orthogonal to a central axis in the housing. The liquid flow collar also includes a (bump-out) receiver recess in the inner surface. The filter cartridge is operably positioned in the housing with a spigot projecting into the liquid flow collar and in removable sealing engagement therewith and with a (bump-out) projection on the exterior of the spigot received in the (bump-out) receiver recess in the liquid flow collar. Such an assembly is an in-tank assembly, and can be provided with a coiled spring under compression in extension between the access cover and the first closed end of the liquid filter cartridge. Further, the cartridge can include a bypass valve assembly on the first closed end construction.

In an alternative application the liquid filter assembly comprises an in-line assembly having a filter head including an outer mounting ring and a central liquid flow collar. The central liquid flow collar includes an inner surface defining a liquid flow conduit and a (bump-out) receiver recess region; and, further defining a seal surface for releasable engagement by a seal defining a seal pattern non-orthogonal to a central axis of the cartridge and liquid flow collar. The assembly also includes a housing secured to the outer mounting ring, for example by threadable engagement. A filter cartridge, as generally characterized above, is positioned in the housing with a spigot projecting into the liquid flow collar and in removable seal engagement therewith and with a (bump-out) projection on an exterior of the spigot received in the (bump-out) receiver recess in the liquid flow collar. Typically, the filter cartridge is a service part removable from the housing.

Also according to the present disclosure a method of installing a liquid filter cartridge in sealing relation to the liquid flow collar of a liquid filtration assembly is provided. The method generally includes a step of pushing a spigot on a filter cartridge partly into a liquid flow collar. For example, this would be conducted with the arrangements previously described, until interference to further insertion is provided by a projection/receiver rotational alignment arrangement.

After the initial pushing, the cartridge would be rotated relative to the liquid flow collar to align a member of the projection/receiver rotational alignment arrangement on the filter cartridge with a member of the projection/receiver rotational alignment arrangement on the liquid flow collar. When this alignment occurs, a further pushing on the spigot into the liquid flow collar can be conducted until the projection/receiver rotational alignment arrangement is fully engaged. By "fully engaged" it is meant that the projection is fully received in the receiver (or the receiver fully engages the projection). Further, the pushing will have occurred until a seal member on the spigot is sealed to the liquid flow collar, typically along an interior, to a fully sealed orientation. By the term "fully sealed orientation" it is meant that the spigot has been moved appropriately until the sealing is a 360° seal, completely around the spigot or the collar. Generally, this is conducted to define a seal pattern non-orthogonal to a central axis of the filter cartridge and liquid flow collar. Specific examples of the method can be practiced with the features characterized herein above. Preferably the member of the projection/receiver rotational alignment arrangement on the spigot is a non-seal member.

According to another aspect of the disclosure, liquid filter cartridge configured for use, in installation, with a liquid filter assembly described. The filter cartridge comprises filter media surrounding an open filter interior; the filter media having first and second, opposite, ends. The first end construction is positioned at the first end of the media. The first end construction can be opened or closed and can include features described herein above. A second end construction is positioned at the second end of the media. The second end construction is open and defines a central liquid flow aperture in liquid flow communication with the open filter material. A radial projection arrangement is positioned at an outer periphery of the second end construction. It comprises a radially flexible tab arrangement, typically including at least two, spaced, radially flexible tabs. Each of the radially flexible tabs in the example depicted, includes a radially outwardly directed projection arrangement and an upwardly directed, free, handle end manipulable to retract the projection arrangement radially inwardly. In an example described, the radially outwardly directed projection arrangement and upwardly directed free handle end are each mounted on a portion of the flexible tab with a living hinge between the handle and a remainder of the end construction. The radial projection arrangement can be used in coordination with end constructions having other features described herein above, but this is not required to obtain some advantage.

Also according to the present disclosure, a liquid filter assembly is provided comprising a housing having a sidewall with a receiver recess arrangement therein. A liquid filter cartridge having a radial projection arrangement described above is positioned within the sidewall, with a radially outwardly directed projection arrangement projecting into the receiver recess arrangement and with the upwardly directed, free, handle end of each flexible tab is posed for manipulation. The receiver recess arrangement can be a continuous groove in the sidewall of the housing, which would provide that the cartridge can be rotated independently of the housing.

Also according to the present disclosure, a method of installing a liquid filter cartridge in a housing is provided. The method comprises a step of inserting a cartridge having a radial projection arrangement as described, into a housing having a sidewall with a receiver recess arrangement therein, while flexing radially flexible tabs inwardly until the radially outwardly directed projection arrangement of the flexible tab(s) aligns with the receiver recess arrangement and project therein. Also a method of separating a liquid filter cartridge from the liquid filter assembly is provided, the method including a step of biasing exposed upwardly directed free handle ends of each flexible tab radially inwardly, to retract the radially outwardly directed projection arrangement of each tab from the receiver recess arrangement, allowing removal of the cartridge from the housing.

From the examples described herein, a variety of specific configurations for application of the principles described herein, to obtain some or all of the advantages described, can be understood. There is again, no specific requirement that all applications of features according to the present disclosure include each and every feature defined herein, in order to obtain some advantage. Also, the various features depicted and described for selected embodiments can be used with alternate embodiments depicted and described.

What is claimed:

1. A liquid filter cartridge configured for use, in installation, in removable sealing engagement with a liquid flow collar of a liquid filter assembly; the liquid filter cartridge comprising:
   (a) a filter media pack comprising filter media surrounding an open filter interior;
      (i) the filter media having first and second, opposite, ends; and, defining a central axis;
   (b) a first end construction positioned at the first end of the filter media; and,
   (c) a second end construction positioned at the second end of the filter media;
      (i) the second end construction being open, and including a central spigot projecting away from the filter media and surrounding and defining a central liquid flow aperture in liquid flow communication with the open filter interior;
      (ii) a seal member positioned on the spigot to define a seal pattern non-orthogonal to the central axis of the filter media; and,
      (iii) a non-seal member of a projection/receiver rotational alignment arrangement positioned on the second end construction at a location to engage another member of the projection/receiver rotational alignment arrangement on the liquid flow collar, in selected rotational alignment, in use;
         (A) the non-seal member of the projection/receiver rotational alignment arrangement on the second end construction includes a radial abutment member having an abutment surface; and,
         (B) the radial abutment member defining a gap between a portion of the radial abutment member and a portion of the central spigot.

2. A liquid filter cartridge according to claim 1 wherein:
   (a) the seal member is configured to define a circular perimeter definition in projection.

3. A liquid filter cartridge according to claim 1 wherein:
   (a) the first end construction is a closed end construction.

4. A liquid filter cartridge according to claim 3 wherein:
   (a) the first end construction is closed by a bypass valve arrangement.

5. A liquid filter cartridge according to claim 1 wherein:
   (a) the seal member is positioned radially outwardly from the central axis no more than a maximum extent of projection of the media from the central axis.

6. A liquid filter cartridge according to claim 5 wherein:
   (a) the seal member is positioned radially outwardly from the central axis no more than 80% of a maximum extent of projection of the media from the central axis.

7. A liquid filter cartridge according to claim 1 wherein:
   (a) the seal member extends at an angle of at least 5° and not more than 40° to a plane orthogonal to the central axis.

8. A liquid filter cartridge according to claim 1 wherein:
   (a) the abutment surface of the radial alignment abutment member projects in a direction away from the media pack a distance further than at least a portion of the seal member closest to the media pack.

9. A liquid filter cartridge according to claim 1 wherein:
   (a) the radial abutment member defines a collar receiving gap between a portion of the radial abutment member and a portion of the spigot;
      (i) the collar-receiving gap being traversed by a radial fin member at a location between the gap and the media pack.

10. A liquid filter cartridge according to claim 1 wherein:
    (a) the radial abutment member defines a cam end remote from the media pack which is slanted from a peak, adjacent the abutment surface, toward the media pack.

11. A liquid filter cartridge according to claim 1 wherein:
    (a) the central spigot includes an end tip having an end surface non-orthogonal to the central axis of the media.

12. A liquid filter cartridge according to claim 1 wherein:
    (a) the second end construction includes an outer perimeter with a housing-engagement radial projection arrangement thereon comprising a pair of spaced radially flexible tabs each having a radially outwardly direction projection arrangement thereon.

13. A liquid filter according to claim 1 wherein:
    (a) the spigot includes a notch therein positioned to extend from engagement with an end tip of the spigot, in a direction toward the media.

14. A liquid filter cartridge according to claim 1 wherein:
    (a) the spigot has a maximum extension radially from the central axis that is not greater than 80% of a maximum radial extension of the media from the central axis.

15. A liquid filter assembly including:
    (a) a liquid flow collar defining a central liquid flow passageway therethrough with a central axis and having a first member of a projection/receiver rotational alignment arrangement positioned thereon;
       (i) the liquid flow collar including a seal surface oriented to be sealingly engaged by a seal, the seal surface defining a seal pattern non-orthogonal to a central axis of the liquid flow collar; and,
    (b) a liquid filter cartridge oriented in releasable, sealed, liquid flow engagement with the liquid flow collar, the liquid filter cartridge comprising:
       (i) a filter media pack comprising filter media surrounding an open filter interior;
          (A) the filter media having first and second, opposite, ends; and, defining a central axis;
       (ii) a first end construction positioned at the first end of the filter media; and,
       (iii) a second end construction positioned at the second end of the filter media;
          (A) the second end construction being open, and including a central spigot projecting away from the filter media and surrounding and defining a central liquid flow aperture in liquid flow communication with the open filter interior;

(B) a seal member positioned on the spigot to define a seal pattern non-orthogonal to the central axis of the filter media; and, (C) a non-seal member of a projection/receiver rotational alignment arrangement positioned on the second end construction at a location to engage another member of the projection/receiver rotational alignment arrangement on a liquid flow collar, in selected rotational alignment, in use;

(1) the non-seal member of the projection/receiver rotational alignment arrangement on the second end construction includes a radial abutment member having an abutment surface; and, (2) the radial abutment member defines a gap between a portion of the radial abutment member and a portion of the central spigot;

(c) the liquid filter cartridge being positioned with:

(i) the open filter interior of the filter cartridge in liquid flow communication, through the spigot on the second seal construction, with the liquid flow collar central liquid flow passageway;

(ii) the seal member on the spigot in sealing engagement with the seal engagement surface on the liquid flow collar; and, (iii) the first member of a projection/receiver rotational alignment arrangement on the liquid flow collar engaged with the non-seal member of the projection/receiver rotational alignment arrangement on the second end construction in selected rotational alignment between the cartridge and the liquid flow collar.

16. A liquid filter assembly according to claim 15 wherein:
(a) the liquid flow collar is secured to a housing of an in-tank filter assembly.

17. A liquid filter assembly according to claim 15 wherein:
(a) the liquid flow collar comprises a portion of a liquid filter head for an in-line filter assembly; and,
(b) the liquid filter cartridge is positioned in a housing of a filter arrangement removably secured to the liquid filter head.

18. A liquid filter cartridge configured for use, in installation, in removable sealing engagement with a liquid flow collar of a liquid filter assembly; the liquid filter cartridge comprising:
(a) a filter media pack comprising filter media surrounding an open filter interior;

(i) the filter media having first and second, opposite, ends; and, defining a central axis;

(b) a first end construction positioned at the first end of the filter media; and, (c) a second end construction positioned at the second end of the filter media;

(i) the second end construction being open, and including a central spigot projecting away from the filter media and surrounding and defining a central liquid flow aperture in liquid flow communication with the open filter interior;

(ii) a seal member positioned on the spigot to define a seal pattern non-orthogonal to the central axis of the filter media; and, (iii) a non-seal member of a projection/receiver rotational alignment arrangement positioned on the second end construction at a location to engage another member of the projection/receiver rotational alignment arrangement on the liquid flow collar, in selected rotational alignment, in use;

(A) the non-seal member of the projection/receiver rotational alignment arrangement on the second end construction includes a radial abutment member having an abutment surface;

(B) the radial abutment member defining a gap between a portion of the radial abutment member and a portion of the central spigot; and (iv) the second end construction including an outer perimeter with a housing-engagement radial projection arrangement thereon.

19. A liquid filter according to claim 18 wherein:
(a) the spigot includes a notch therein positioned to extend from engagement with an end tip of the spigot, in a direction toward the media.

20. A liquid filter cartridge according to claim 18 wherein:
(a) the spigot has a maximum extension radially from the central axis that is not greater than 80% of a maximum radial extension of the media from the central axis.

21. A liquid filter cartridge according to claim 18 wherein:
(a) the seal member is positioned radially outwardly from the central axis no more than a maximum extent of projection of the media from the central axis.

22. A liquid filter cartridge according to claim 21 wherein:
(a) the seal member is positioned radially outwardly from the central axis no more than 80% of a maximum extent of projection of the media from the central axis.

23. A liquid filter cartridge according to claim 18 wherein:
(a) the seal member extends at an angle of at least 5° and not more than 40° to a plane orthogonal to the central axis.

* * * * *